United States Patent [19]
Kawana et al.

[11] Patent Number: 5,696,853
[45] Date of Patent: Dec. 9, 1997

[54] IMAGE PROCESSING SYSTEM HAVING VARIABLY CONTROLLABLE PIXEL DENSITY PATTERNS

[75] Inventors: Takashi Kawana, Yokohama; Kaoru Seto, Chigasaki; Manabu Sakakibara; Shinichiro Maekawa, both of Kawasaki; Toru Kosaka, Machida, all of Japan

[73] Assignee: Canon Kabushiki Kaisha, Tokyo, Japan

[21] Appl. No.: 23,360

[22] Filed: Feb. 26, 1993

[30] Foreign Application Priority Data

Feb. 28, 1992 [JP] Japan .................... 4-043895
Mar. 2, 1992 [JP] Japan .................... 4-044846

[51] Int. Cl.[6] ............................ G06K 9/42; H04N 1/40
[52] U.S. Cl. ............................ 382/299; 358/459
[58] Field of Search .................... 358/296, 298, 358/451, 458, 459, 461, 467, 456; 382/54, 299; 235/432

[56] References Cited

U.S. PATENT DOCUMENTS

| | | | |
|---|---|---|---|
| 4,873,537 | 10/1989 | Ohta | 358/296 |
| 4,884,080 | 11/1989 | Hirahara et al. | 346/46 |
| 5,075,780 | 12/1991 | Shibahara | 358/296 |
| 5,109,436 | 4/1992 | Machida et al. | 382/173 |
| 5,124,802 | 6/1992 | Ito et al. | 358/298 |
| 5,134,495 | 7/1992 | Frazier et al. | 358/298 |
| 5,270,827 | 12/1993 | Kobayashi et al. | 358/298 |
| 5,276,531 | 1/1994 | Chen et al. | 358/443 |
| 5,307,426 | 4/1994 | Kanno et al. | 382/232 |
| 5,386,302 | 1/1995 | Kashihara et al. | 358/400 |

Primary Examiner—Jose L. Couso
Assistant Examiner—Matthew C. Bella
Attorney, Agent, or Firm—Fitzpatrick, Cella, Harper & Scinto

[57] ABSTRACT

On the basis of inputted multivalued image data, direction of growth is decided from a density pattern having a plurality of growth directions and a density pattern is caused to grow based upon the growth direction that has been decided. As a result, character images are formed sharply and high-quality half-tone images exhibiting reduced density irregularity can be produced.

16 Claims, 84 Drawing Sheets

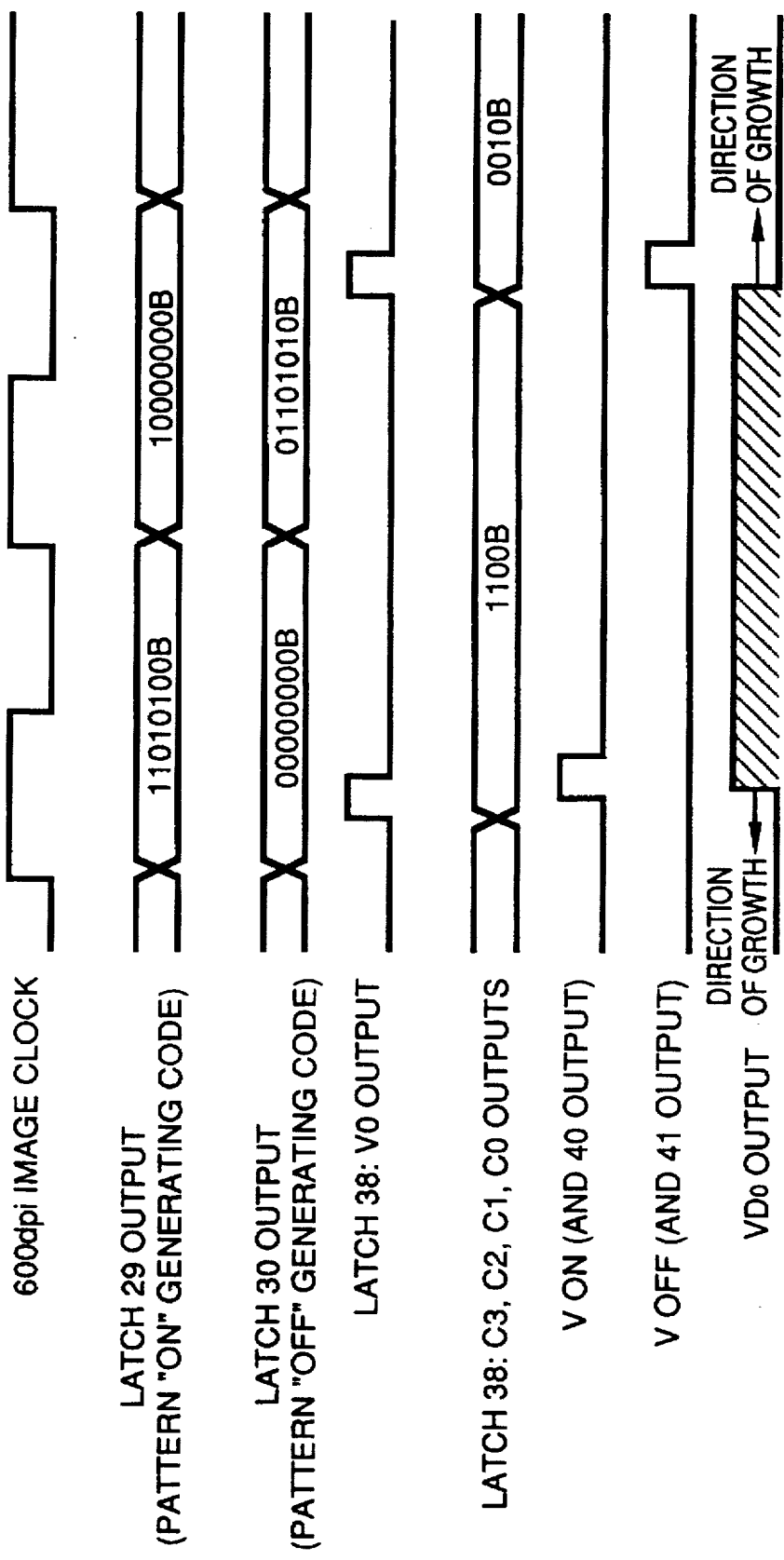

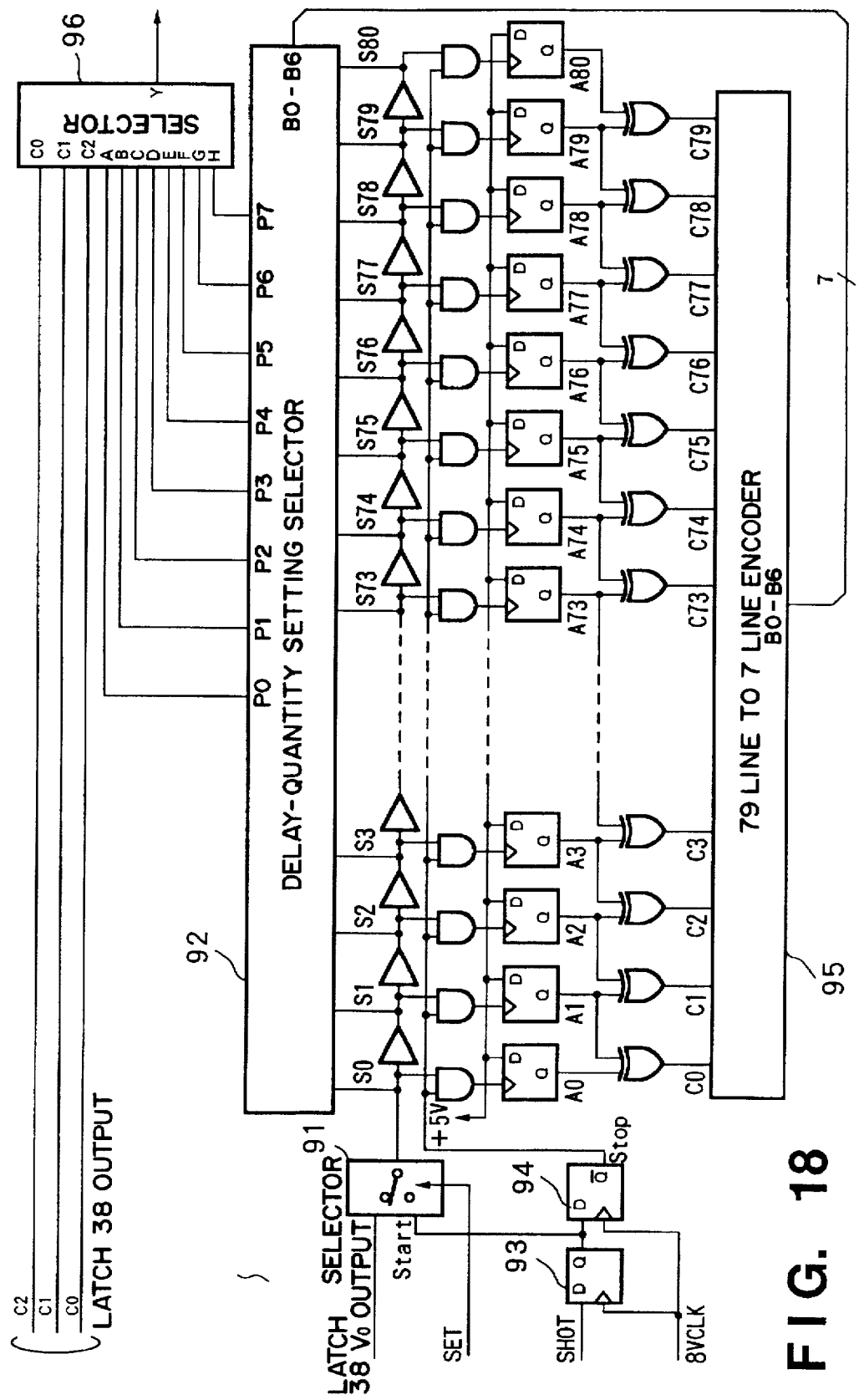
F I G. 18

FIG. 20

| ENCODER INPUT SIGNAL "HIGH" SIGNAL | CONTROL SIGNAL |||||||  OUTPUT SIGNAL ||||||||
|---|---|---|---|---|---|---|---|---|---|---|---|---|---|---|---|
| | B6 | B5 | B4 | B3 | B2 | B1 | B0 | P0 | P1 | P2 | P3 | P4 | P5 | P6 | P7 |
| C8  | 0 | 0 | 0 | 1 | 0 | 0 | 0 | S0 | S1 | S2 | S3 | S4 | S5 | S6 | S7 |
| C9  | 0 | 0 | 0 | 1 | 0 | 0 | 1 | S0 | S1 | S2 | S3 | S4 | S5 | S6 | S8 |
| ∫   | | ∫ | | | | | | | | ∫ | | | | | |
| C55 | 0 | 1 | 1 | 0 | 1 | 1 | 1 | S0 | S7 | S14 | S21 | S28 | S35 | S41 | S49 |
| C56 | 0 | 1 | 1 | 1 | 0 | 0 | 0 | S0 | S7 | S14 | S21 | S28 | S35 | S42 | S49 |
| C57 | 0 | 1 | 1 | 1 | 0 | 0 | 1 | S0 | S8 | S15 | S22 | S29 | S36 | S43 | S50 |
| C58 | 0 | 1 | 1 | 1 | 0 | 1 | 0 | S0 | S8 | S15 | S22 | S29 | S36 | S44 | S51 |
| C59 | 0 | 1 | 1 | 1 | 0 | 1 | 1 | S0 | S8 | S15 | S22 | S30 | S37 | S44 | S52 |
| C60 | 0 | 1 | 1 | 1 | 1 | 0 | 0 | S0 | S8 | S15 | S23 | S30 | S38 | S45 | S53 |
| C61 | 0 | 1 | 1 | 1 | 1 | 0 | 1 | S0 | S8 | S16 | S23 | S31 | S38 | S46 | S54 |
| C62 | 0 | 1 | 1 | 1 | 1 | 1 | 0 | S0 | S8 | S16 | S24 | S31 | S39 | S46 | S55 |
| C63 | 0 | 1 | 1 | 1 | 1 | 1 | 1 | S0 | S8 | S16 | S24 | S32 | S40 | S47 | S56 |
| C64 | 1 | 0 | 0 | 0 | 0 | 0 | 0 | S0 | S8 | S16 | S24 | S32 | S40 | S48 | S56 |
| C65 | 1 | 0 | 0 | 0 | 0 | 0 | 1 | S0 | S9 | S17 | S25 | S33 | S41 | S49 | S57 |
| C66 | 1 | 0 | 0 | 0 | 0 | 1 | 0 | S0 | S9 | S17 | S25 | S33 | S41 | S50 | S58 |
| C67 | 1 | 0 | 0 | 0 | 0 | 1 | 1 | S0 | S9 | S17 | S25 | S34 | S42 | S50 | S59 |
| C68 | 1 | 0 | 0 | 0 | 1 | 0 | 0 | S0 | S9 | S17 | S26 | S34 | S43 | S51 | S60 |
| C69 | 1 | 0 | 0 | 0 | 1 | 0 | 1 | S0 | S9 | S18 | S26 | S35 | S43 | S52 | S61 |
| C70 | 1 | 0 | 0 | 0 | 1 | 1 | 0 | S0 | S9 | S18 | S27 | S35 | S44 | S52 | S62 |
| C71 | 1 | 0 | 0 | 0 | 1 | 1 | 1 | S0 | S9 | S18 | S27 | S36 | S45 | S53 | S63 |
| C72 | 1 | 0 | 0 | 1 | 0 | 0 | 0 | S0 | S9 | S18 | S27 | S36 | S45 | S54 | S63 |
| C73 | 1 | 0 | 0 | 1 | 0 | 0 | 1 | S0 | S10 | S19 | S28 | S37 | S46 | S55 | S64 |
| C74 | 1 | 0 | 0 | 1 | 0 | 1 | 0 | S0 | S10 | S19 | S28 | S37 | S46 | S56 | S65 |
| C75 | 1 | 0 | 0 | 1 | 0 | 1 | 1 | S0 | S10 | S19 | S28 | S38 | S47 | S57 | S66 |
| C76 | 1 | 0 | 0 | 1 | 1 | 0 | 0 | S0 | S10 | S19 | S29 | S38 | S48 | S57 | S67 |
| C77 | 1 | 0 | 0 | 1 | 1 | 0 | 1 | S0 | S10 | S20 | S29 | S39 | S48 | S58 | S68 |
| C78 | 1 | 0 | 0 | 1 | 1 | 1 | 0 | S0 | S10 | S20 | S30 | S39 | S49 | S59 | S69 |
| C79 | 1 | 0 | 0 | 1 | 1 | 1 | 1 | S0 | S10 | S20 | S30 | S40 | S50 | S60 | S70 |

FIG. 22

| |
|---|
| 1 |
| 1 |
| 1 |
| 1 |
| 1 |
| 1 |
| 1 |
| 1 |
| 1 |
| 1 |
| 1 |
| 1 |
| 1 |
| 1 |
| 1 |
| 1 |
| 1 |
| 1 |
| 1 |
| 1 |
| 1 |
| 1 |
| 1 |
| 1 |
| 1 |
| 2 |
| 2 |
| 2 |
| 2 |
| 3 |
| 3 |
| 3 |
| 3 |
| 4 |
| 4 |
| 5 |
| 5 |
| 6 |
| 6 |
| 7 |
| 8 |
| 8 |
| 9 |
| 10 |
| 10 |
| 11 |
| 12 |
| 12 |
| 13 |
| 14 |
| 14 |
| 15 |
| 16 |
| 17 |
| 18 |
| 19 |
| 20 |
| 21 |
| 22 |
| 23 |
| 24 |
| 25 |
| 26 |
| 27 |
| 28 |

| |
|---|
| 29 |
| 30 |
| 31 |
| 32 |
| 33 |
| 34 |
| 35 |
| 36 |
| 37 |
| 38 |
| 39 |
| 40 |
| 41 |
| 42 |
| 43 |
| 44 |
| 45 |
| 46 |
| 47 |
| 47 |
| 48 |
| 49 |
| 49 |
| 50 |
| 50 |
| 51 |
| 51 |
| 52 |
| 52 |
| 53 |
| 53 |
| 54 |
| 54 |
| 55 |
| 55 |
| 56 |
| 56 |
| 57 |
| 57 |
| 57 |
| 58 |
| 58 |
| 58 |
| 58 |
| 59 |
| 59 |
| 59 |
| 59 |
| 59 |
| 59 |
| 60 |
| 60 |
| 60 |
| 60 |
| 60 |
| 60 |
| 60 |
| 60 |
| 60 |
| 60 |
| 60 |
| 60 |
| 60 |

A PATTERN

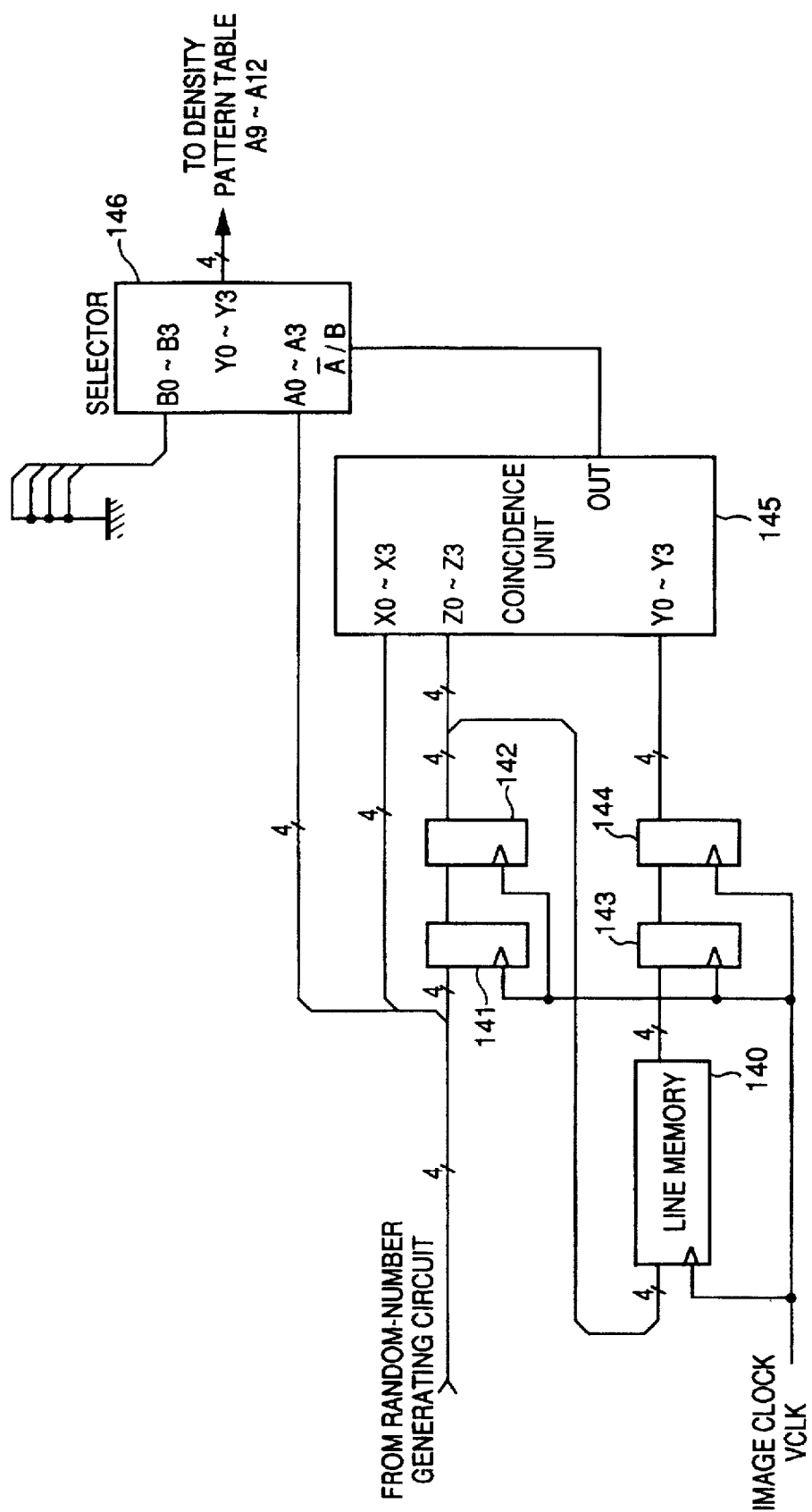

PIXEL OF INTEREST OR PERIPHERAL PIXEL

* DON'T CARE

| | COINCIDENCE CONDITIONS | | |
|---|---|---|---|
| | I | II | III |
| Y | E | * | G |
| Z | * | C | H |
| X | D | B | F |

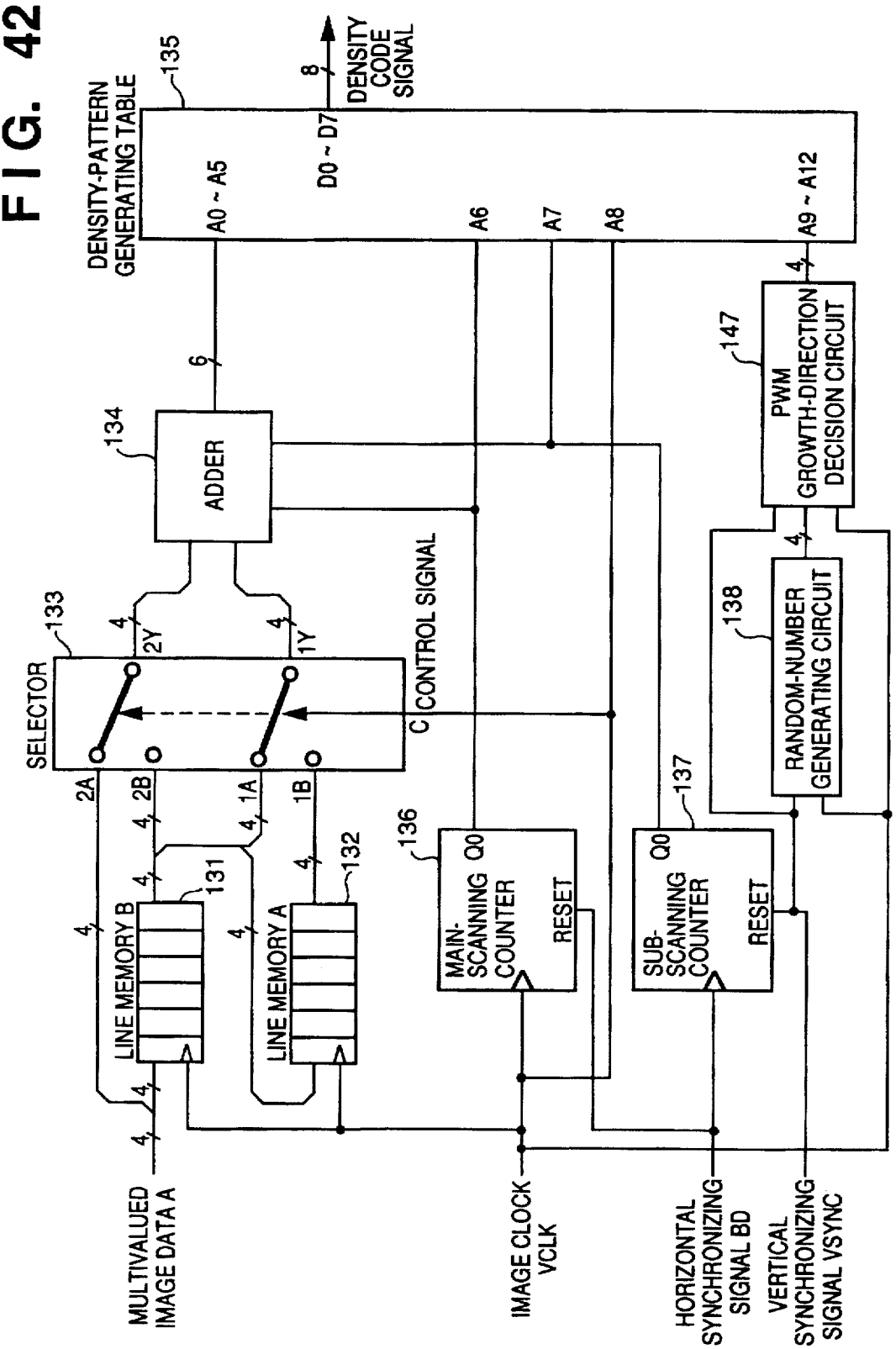

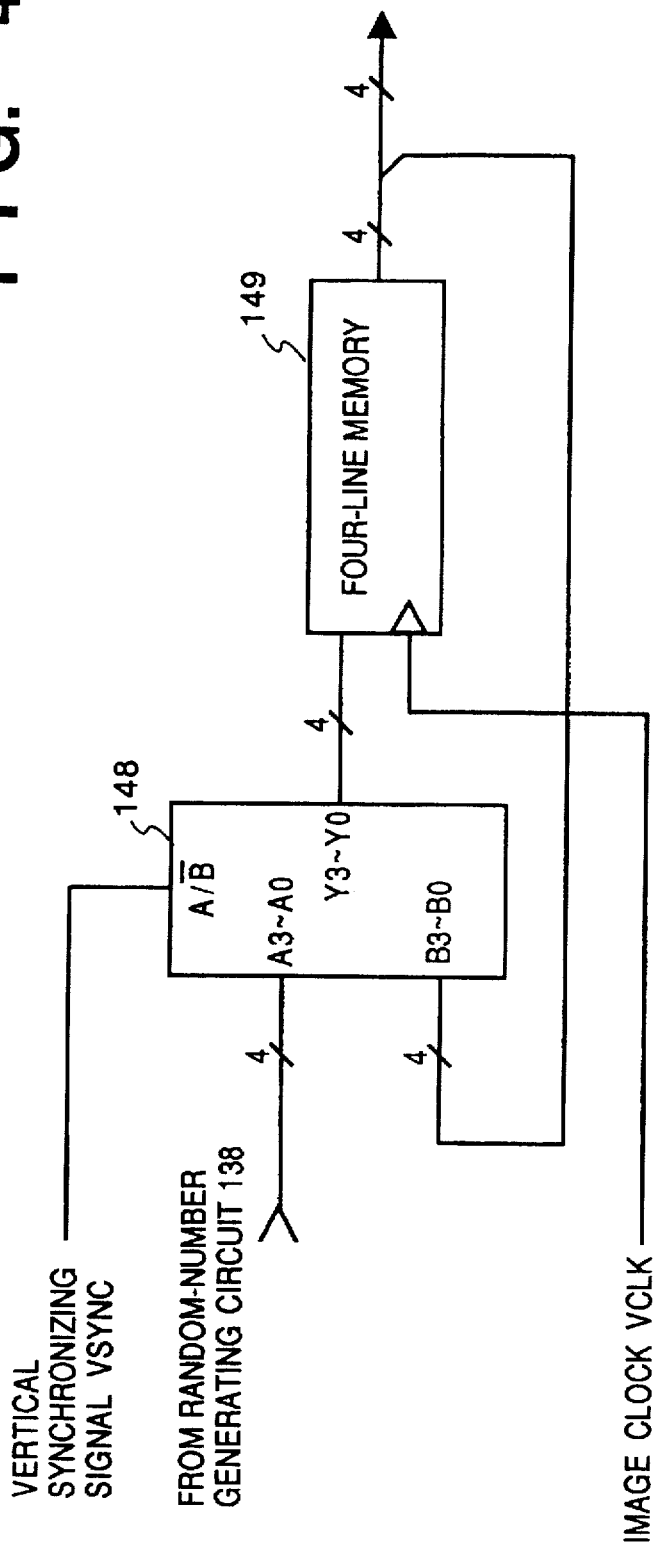

| |
|---|
| 60 |
| 60 |
| 60 |
| 59 |
| 59 |
| 59 |
| 58 |
| 58 |
| 57 |
| 57 |
| 56 |
| 56 |
| 55 |
| 55 |
| 54 |
| 53 |
| 53 |
| 52 |
| 51 |
| 51 |
| 50 |
| 49 |
| 48 |
| 48 |
| 47 |
| 46 |
| 45 |
| 44 |
| 43 |
| 42 |
| 41 |
| 40 |
| 19 |
| 19 |
| 19 |
| 19 |
| 20 |
| 20 |
| 20 |
| 20 |
| 21 |
| 21 |
| 21 |
| 22 |
| 22 |
| 22 |
| 23 |
| 23 |
| 23 |
| 24 |
| 24 |
| 24 |
| 25 |
| 25 |
| 25 |
| 26 |
| 26 |
| 26 |
| 27 |
| 27 |
| 27 |
| 28 |
| 28 |
| 28 |

FIG. 62  IN CASE WHERE MULTIVALUED IMAGE DATA INDICATES DENSITY OF 9/32

| A10 A9 A8 A7 A6 A5 A4 A3 A2 A1 A0 | D7 D6 D5 D4 D3 D2 D1 D0 |
|---|---|
| 0 0 0 0 0 0 0 0 0 0 0 ⌇ | 150dpi × 300dpi EVEN-NUMBERED LINE PATTERN |
| 0 1 0 0 0 0 0 0 0 0 0 ⌇ | 150dpi × 300dpi ODD-NUMBERED LINE PATTERN |
| 1 0 0 0 0 0 0 0 0 0 0 ⌇ | 300dpi × 300dpi EVEN-NUMBERED LINE PATTERN |
| 1 1 0 0 0 0 0 0 0 0 0 ⌇ | 300dpi × 300dpi ODD-NUMBERED LINE PATTERN |

PATTERN GENERATING CODE

- FINE PWM CODE
- COARSE PWM CODE
- "0 0" : "OFF" GENERATING CODE
- "0 1" : "ON" GENERATING CODE
- "1 0" : WHITE CODE
- "1 1" : BLACK CODE

POSITION OF "OFF" INDICATED
BY D5 - D6

600dpi

INCASE OF D7, D6 = 0, 0

POSITION OF "ON" INDICATED
BY D5 - D0

600dpi

INCASE OF D7, D6 = 0, 1

600dpi

INCASE OF D7, D6 = 1, 0

600dpi

INCASE OF D7, D6 = 1, 1

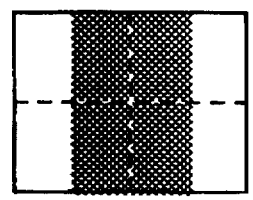
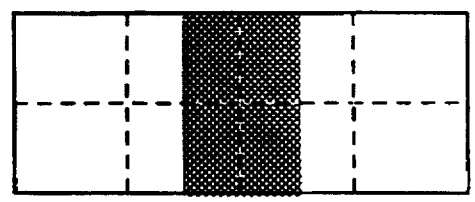
FIG. 78A  MULTIVALUED IMAGE DATA MVDO INPUT
FIG. 78B  SELECTOR 307 OUTPUT
FIG. 78C  RESULT OF PRINTING
FIG. 78D  MULTIVALUED IMAGE DATA MVDO INPUT
FIG. 78E  SELECTOR 307 OUTPUT
FIG. 78F  RESULT OF PRINTING

IMAGE CLOCK

CVDO

PRINT
PTTERN

IMAGE PROCESSING SYSTEM HAVING VARIABLY CONTROLLABLE PIXEL DENSITY PATTERNS

BACKGROUND OF THE INVENTION

This invention relates to an image processing method and apparatus, such as an image processing method and apparatus for subjecting input image data to tone processing.

A method of printing out multivalued image data by a laser-beam printer generally involves combining several of the smallest dots possessed by the printer to obtain the smallest unit (pixel) that represents density, and expressing tone in one pixel by the painted pattern.

FIG. 59 is a block diagram showing a host computer 201 and a printer 202.

The printer 202 has a printer controller 203 that receives image data (inclusive of photographic images and character images) from the host computer 201, which is an external device, and converts a character image into a prescribed bit-map signal (1F[Hex] if black and 00[Hex] if white). With regard to a photographic image, the controller 203 sends five-bit image data to an image processor 204 as a code signal indicative of density (white is 00[Hex], and the numerical value is enlarged as density increases, with 1F[Hex] representing black). A semiconductor laser 205 is modulated in dependence upon an output signal from the image processor 204.

FIG. 60 is a block diagram showing the image processor 204, which prints a half-tone image. Numeral 206 denotes a γ-correction table, which is constituted by a ROM or the like. Numeral 207 denotes a two-bit main-scanning counter, 208 a sub-scanning counter and 209 a density-pattern generating table constituted by a ROM or RAM.

Numeral 210 denotes a parallel/serial converter which, in accordance with a clock having a frequency that is eight times that of an image clock VCLK, delivers eight-bit data outputted by the density-pattern generating table 209.

The operation of the printer 202 constructed as set forth above will now be described. In this example, it will be assumed that the printer has a resolution of 600 dpi (dots per inch).

The printer controller 203 sends the image processor 204 the image clock VCLK, which is transmitted every dot of the 600 dpi, as well as five-bit multivalued image data transmitted in synchronization with the clock VCLK. The multivalued image data is subjected to an γ correction by the γ-correction table 206 and is converted to five-bit image data, which enters addresses A0~A4 of the density-pattern generating table 209.

Meanwhile, the image clock VCLK is counted by the main-scanning counter 207, the one-bit output whereof enters address A5 of the table 209. Further, a horizontal synchronizing signal BD, which is sent from a printer engine (not shown) whenever the semiconductor laser 205 makes a single scan, is counted by the sub-scanning counter 208, the one-bit output whereof enters address A6 of the table 209. When the above-mentioned address enters the density-pattern generating table 209, data eight bits of D0~D7, which have been loaded at this address in advance, are delivered by the table and then successively outputted, starting from the MSB, by the parallel/serial converter 210 in accordance with a clock VCLK×8, which has a frequency eight times that of an image clock VCLK.

As a result of the foregoing operation, a total of four dots, in which one dot of the 600 dpi becomes two dots in the main scan and two dots in the sub-scan, are formed as the smallest unit (pixel) representing density. Furthermore, as illustrated in FIG. 61, one pixel has 32 subdivisions since one dot of 600 dpi is partitioned into eight parts. In other words, density is expressed by painting a certain number of the 32 subdivisions of one pixel in black.

With the prior-art example described above, however, pulse-width modulation is performed with a 300 dpi unit serving as one pixel. Consequently, owing to irregularities in the speeds of the paper conveyance system and drive system of the photosensitive drum in the printer (these irregularities will be referred to as "pitch irregularity" hereinafter), an irregularity in printing density becomes pronounced and a high-quality half-tone image cannot be obtained. The principle of density irregularity caused by pitch irregularity will be described.

FIG. 63 is a diagram illustrating a printing state for a case in which laser irradiation time is 50% in PWM performed in units of 300 dpi mentioned above. If the intervals between scanning lines of the laser are reduced owing to pitch irregularity in the printer, there is a rise in the energy distribution, which is the total irradiation energy at each dot. At the same time, the energy that exceeds a development threshold value (namely the energy at which toner is capable of being affixed to the recording medium) spreads over a wider range, thereby broadening the area to which the toner is affixed and producing an increase in density. As a result, mutually adjacent pixels become connected in the main-scanning direction, as shown at portion A in FIG. 63, thereby causing a further increase in density.

If the intervals between scanning lines of the laser are increased owing to pitch irregularity in the printer, on the other hand, gaps are produced in the energy and the area to which the toner is affixed is reduced, thereby producing a decrease in density.

FIG. 64 is a diagram illustrating a printing state for a case in which laser irradiation time is 50% in PWM performed in units of 150 dpi. This diagram illustrates that an irregularity in printing density does not readily occur in PWM in units of 150 dpi even if the intervals between the laser scanning lines changes owing to pitch irregularity in the printer.

More specifically, a density pattern readily susceptible to the effects of pitch irregularity occurs in a case where pixel interval L and laser irradiation length w are small. Further, in half-tone processing by modulation of laser luminous intensity, a case in which laser luminous intensity is low so as to produce a low laser energy distribution and result in a reduced area of toner fixation per pixel is the equivalent of a reduction in the laser irradiation length w.

Thus, in a case where 150 dpi is adopted as one pixel, there tends to be little influence from pitch irregularity. However, resolution is low and character images do not appear sharp. If 300 dpi is adopted as one pixel, on the other hand, resolution is improved and character images are sharpened but the effects of pitch irregularity become a problem.

SUMMARY OF THE INVENTION

An object of the present invention is to provide an image processing method and apparatus through which character images can be made sharp while half-tone images can be formed to have a high quality with reduced irregularity in density.

Another object of the present invention is to provide an image processing method and apparatus through which the pixel units of a formed image may be changed in conformity with the density of the image, thereby suppressing density irregularity and making it possible to obtain a stabilized half-tone image.

According to the present invention, the foregoing objects are attained by providing an image processing apparatus for subjecting image data to tone processing and forming an image, comprising density-pattern generating means for generating a density pattern having a plurality of growth directions, and growth-direction deciding means for deciding growth direction of a density pattern generated by the density-pattern generating means, whereby an image is formed by causing the density pattern to grow based upon the growth direction decided by the growth direction deciding means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 18 is a circuit diagram showing the configuration of a variable delay circuit shown in FIG. 15;

FIG. 20 is a diagram showing the logic table of delay-quantity setting selector shown in FIG. 18;

FIG. 22 is a diagram illustrating a growth matrix of B-pattern PWM;

FIG. 23 is a diagram illustrating a growth matrix of B-pattern PWM;

FIG. 24 is a diagram illustrating a growth matrix of B-pattern PWM;

FIG. 25 is a diagram illustrating a growth matrix of B-pattern PWM;

FIG. 26 is a diagram illustrating a growth matrix of F-pattern PWM;

FIG. 27 is a diagram illustrating a growth matrix of F-pattern PWM;

FIG. 28 is a diagram illustrating a growth matrix of F-pattern PWM;

FIG. 29 is a diagram illustrating a growth matrix of F-pattern PWM;

FIG. 40 is a circuit diagram illustrating a growth-direction decision circuit shown in FIG. 39;

FIG. 42 is a block diagram illustrating the configuration of a data generator in a fifth embodiment of the invention;

FIG. 43 is a circuit diagram illustrating the configuration of a PWM growth-direction decision unit shown in FIG. 42;

Figure 47:
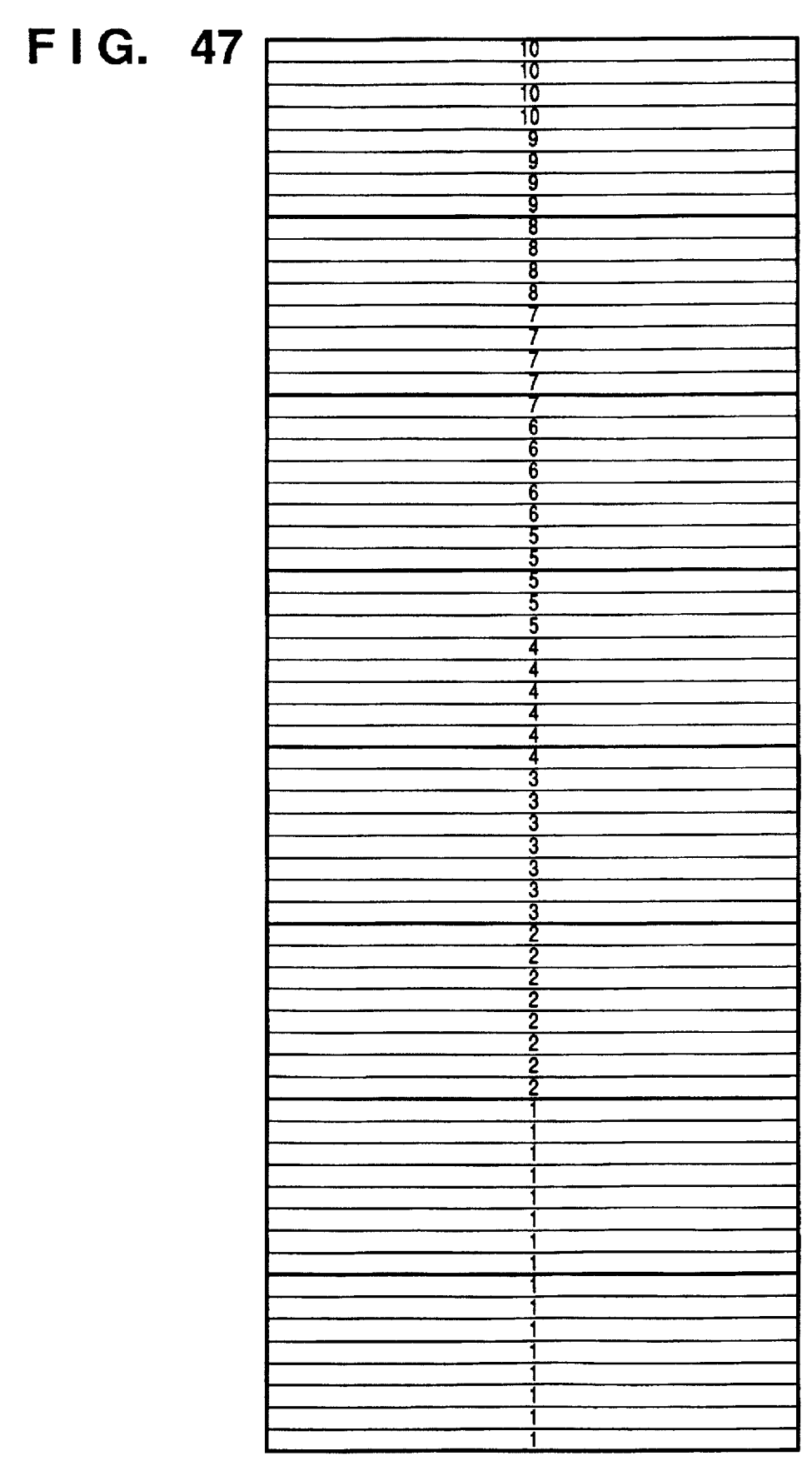

FIG. 47 is a diagram showing threshold values of growth ranking of D pixels shown in FIG. 46;

Figure 48:
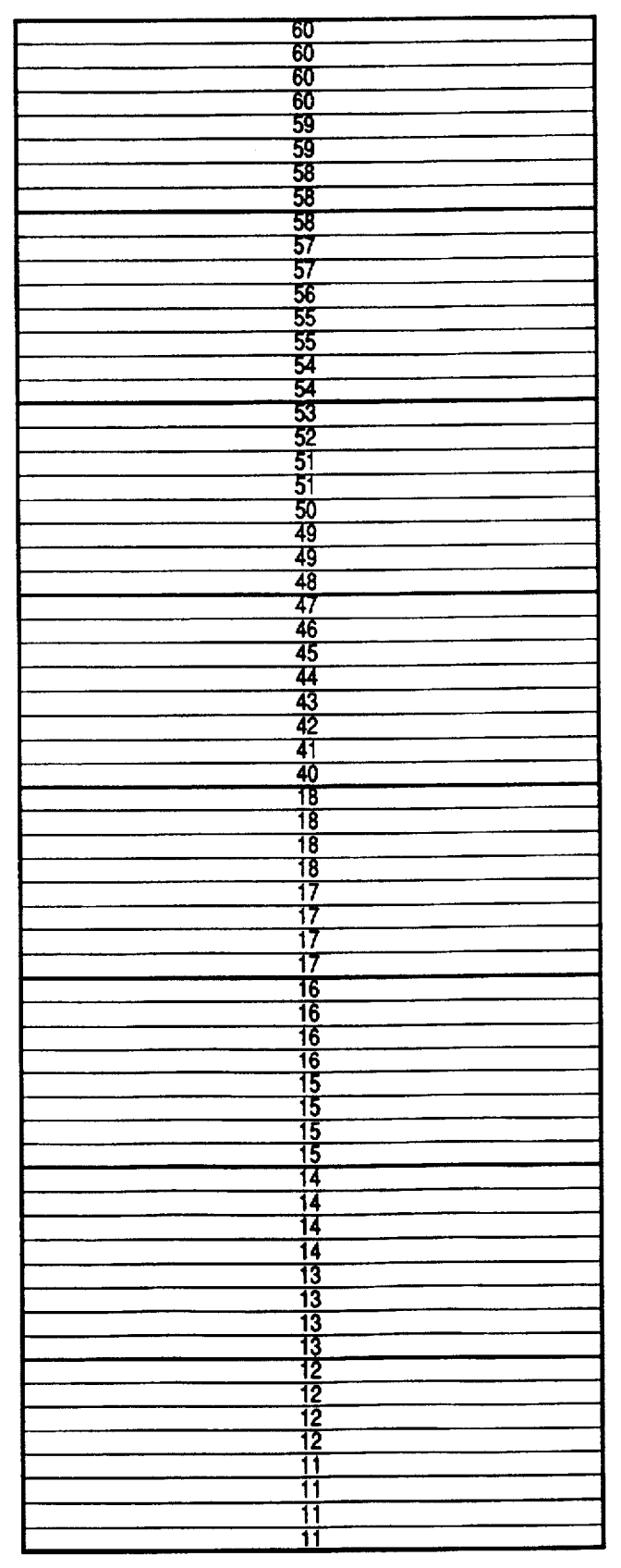

FIG. 48 is a diagram showing threshold values of growth ranking of D pixels shown in FIG. 46;

Figure 49:
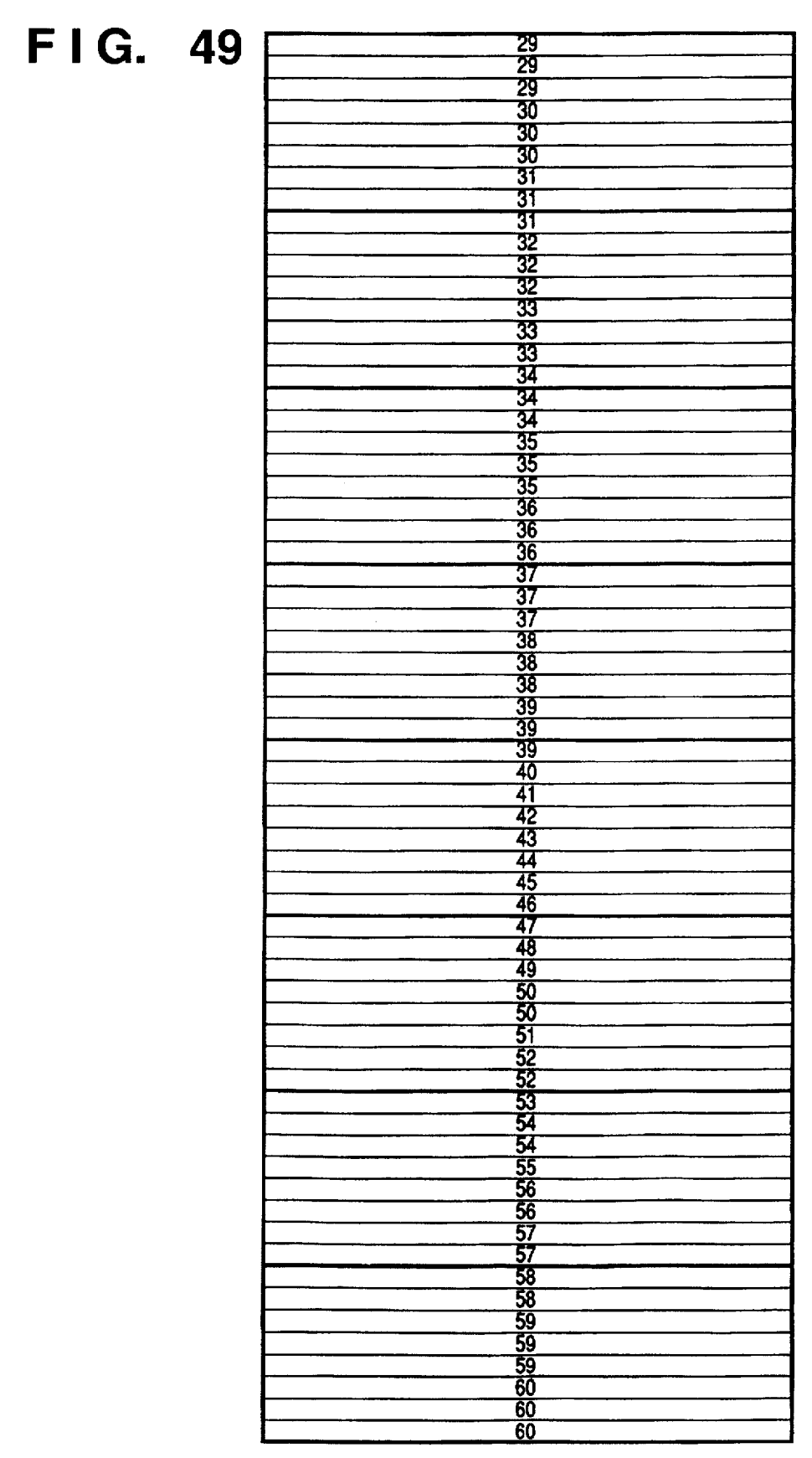

FIG. 49 is a diagram showing threshold values of growth ranking of D pixels shown in FIG. 46;

FIG. 50 is a diagram showing threshold values of growth ranking of D pixels shown in FIG. 46;

FIG. 78 is a diagram for describing block processing according to the eighth embodiment;

DESCRIPTION OF THE PREFERRED EMBODIMENTS

Preferred embodiments of the present invention will now be described in detail with reference to the drawings.

Figure 1:
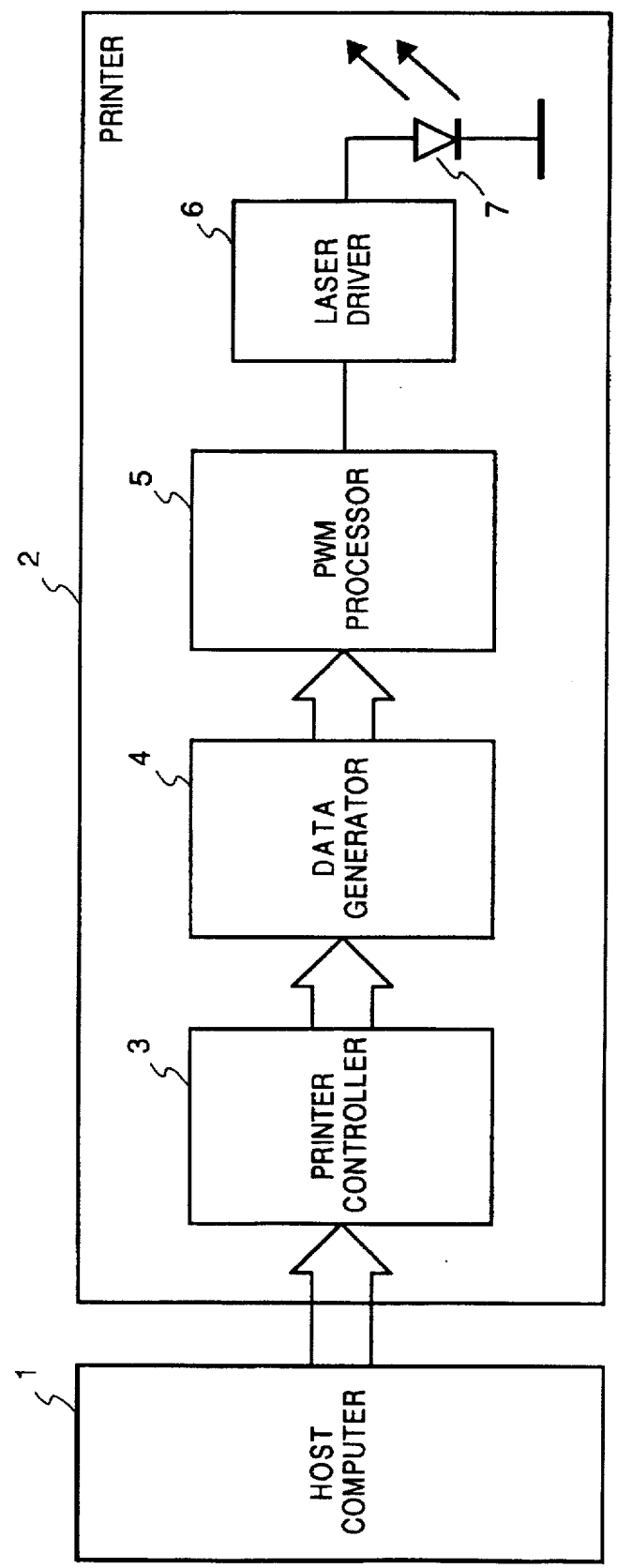
FIG. 1 is a block diagram illustrating the configuration of an image processing apparatus according to an embodiment of the present invention.

FIG. 1 is a block diagram showing the configuration of an image processing apparatus according to an embodiment of the present invention. Numeral 1 denotes a host computer that transmits multivalued image data to a printer 2. The printer 2 includes a printer controller 3 that receives the above-mentioned multivalued image data, subjects it to predetermined processing and delivers the processed data to a data generator 4, described later. The data generator 4 then generates a density pattern of the multivalued image data, and a PWM processor 5 generates a pulse-width modulated (PWM) signal based upon the density pattern. A laser driver 6 causes a semiconductor laser 7 to flash in accordance with the PWM signal. The semiconductor laser 7 irradiates a photosensitive drum, which is part of a printer engine (not shown), thereby performing printing by electrophotography.

[First Embodiment]

The data generator 4 and PWM processor 5 in accordance with a first embodiment of the invention will be described below. It will be assumed in the description that the printer engine performs printing at a printing density of 600 dots per inch (dpi).

Figure 2:
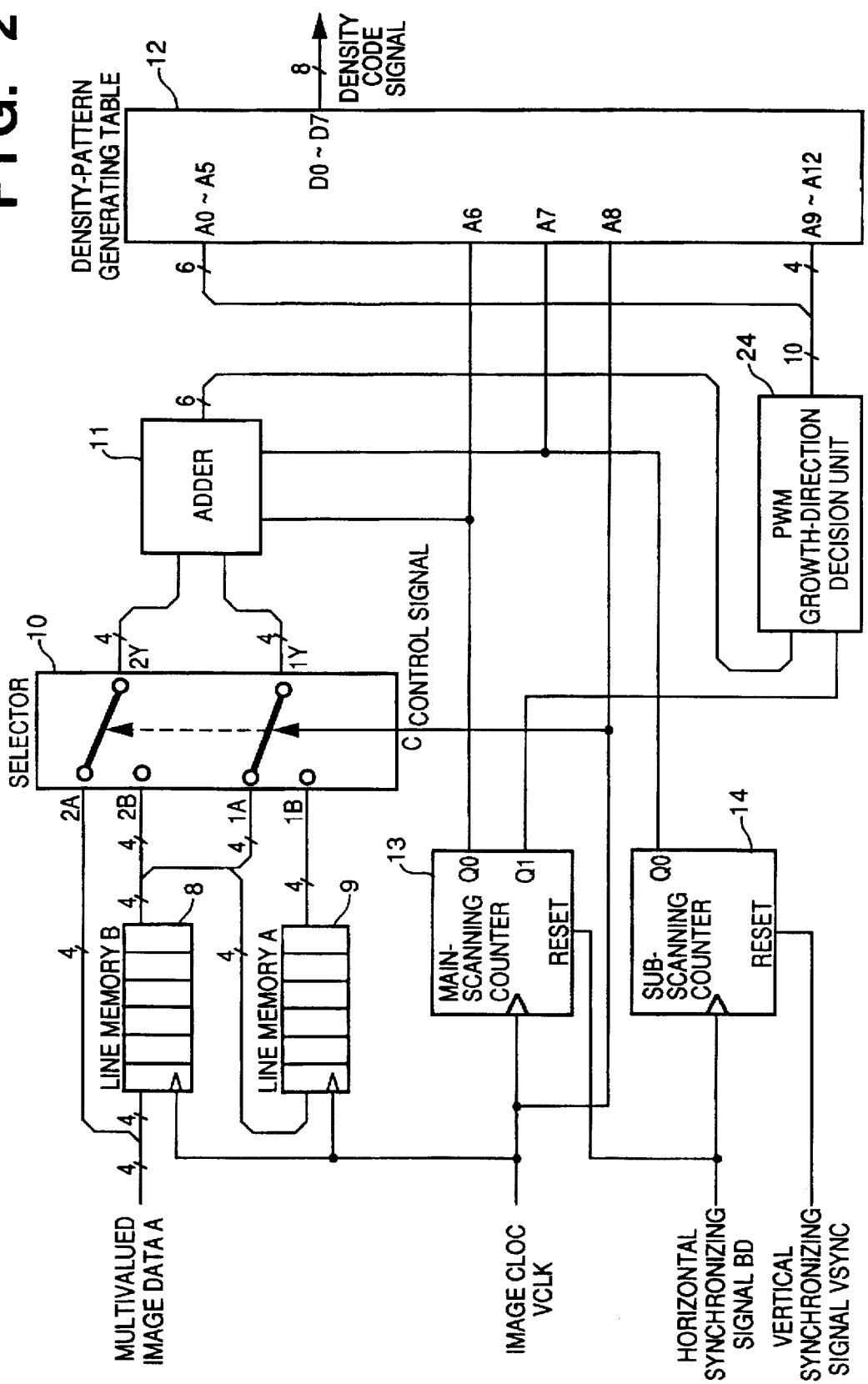
FIG. 2 is a block diagram showing the configuration of a data generator in a first embodiment.
Figure 3:
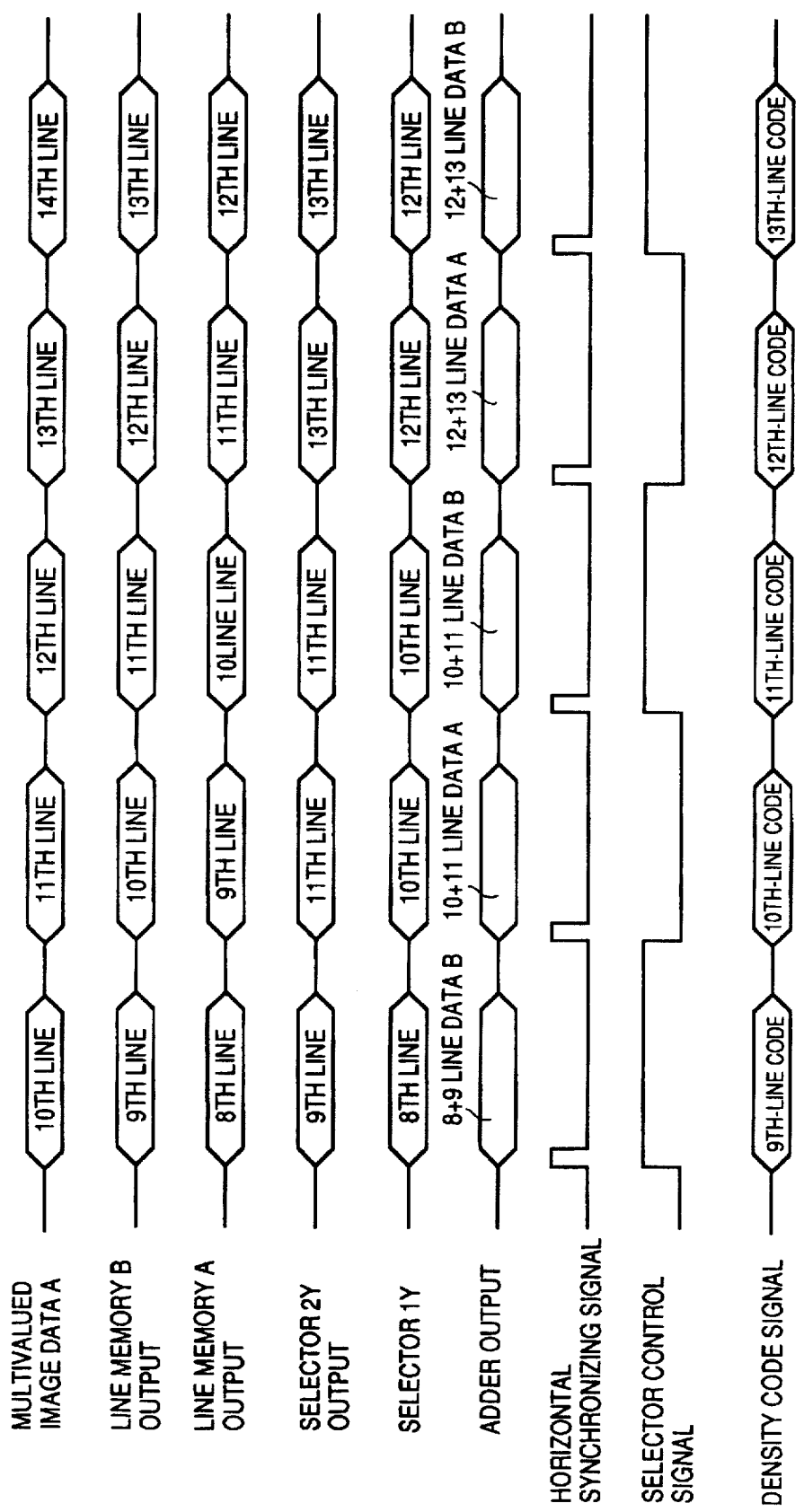
FIG. 3 is a time chart showing the operation of the data generator depicted in FIG. 2.

FIG. 2 is block diagram illustrating the details of the data generator 4, and FIG. 3 is a time chart associated with the data generator 4. The operation of the data generator 4 in the first embodiment will be described first.

The data generator 4 is adapted to add two dots of the multivalued image data, which is outputted by the printer controller 3, in the main scanning direction and two dots of the multivalued image data in the sub-scanning, for a total of four dots, and generate multivalued data (six bits), which represents the density pattern, based upon the results of addition. The arrangement shown in FIG. 2 includes a line memory (B) 8, a line memory (A) 9, a selector 10, an adder 11, a density-pattern generating table 12, main- and sub-scanning counters 13, 14, respectively, and a PWM growth-direction decision unit 24.

The printer controller 3 transmits four-bit multivalued image data A in units of 600 dpi. Data F[H] indicates printing in black, and data 0[H]~E[H] indicated printing in half-tones. It is possible to express 16 tones of 0[H]~F[H] in units of 600 dpi, as well as 61 tones of 0[H]~3C[H] (F[H]+F[H]+F[H]+F[H]=3C[H]) in units of 300 dpi, which is an assemblage of four dots. First, the memory (B) 8 receives the multivalued image data A from the controller 3, and data that has accumulated in the line memory (A) 9 is transmitted at the same time that the next is accepted. In other words, one line of the immediately preceding data is always stored in the line memory (A) 9. On the basis of a signal that is the result of a horizontal synchronizing signal being frequency-divided by the sub-scanning counter 14, the selector 10 selects and outputs either a set of input signals 1A, 2A or a set of input signals 1B, 2B. Outputs 1Y, 2Y of the selector 10 are outputted to the adder 11, within which two dots are generated also in the main scanning direction so that items of four-bit image data of a total of four dots are added to produce six-bit image data.

Figure 4:
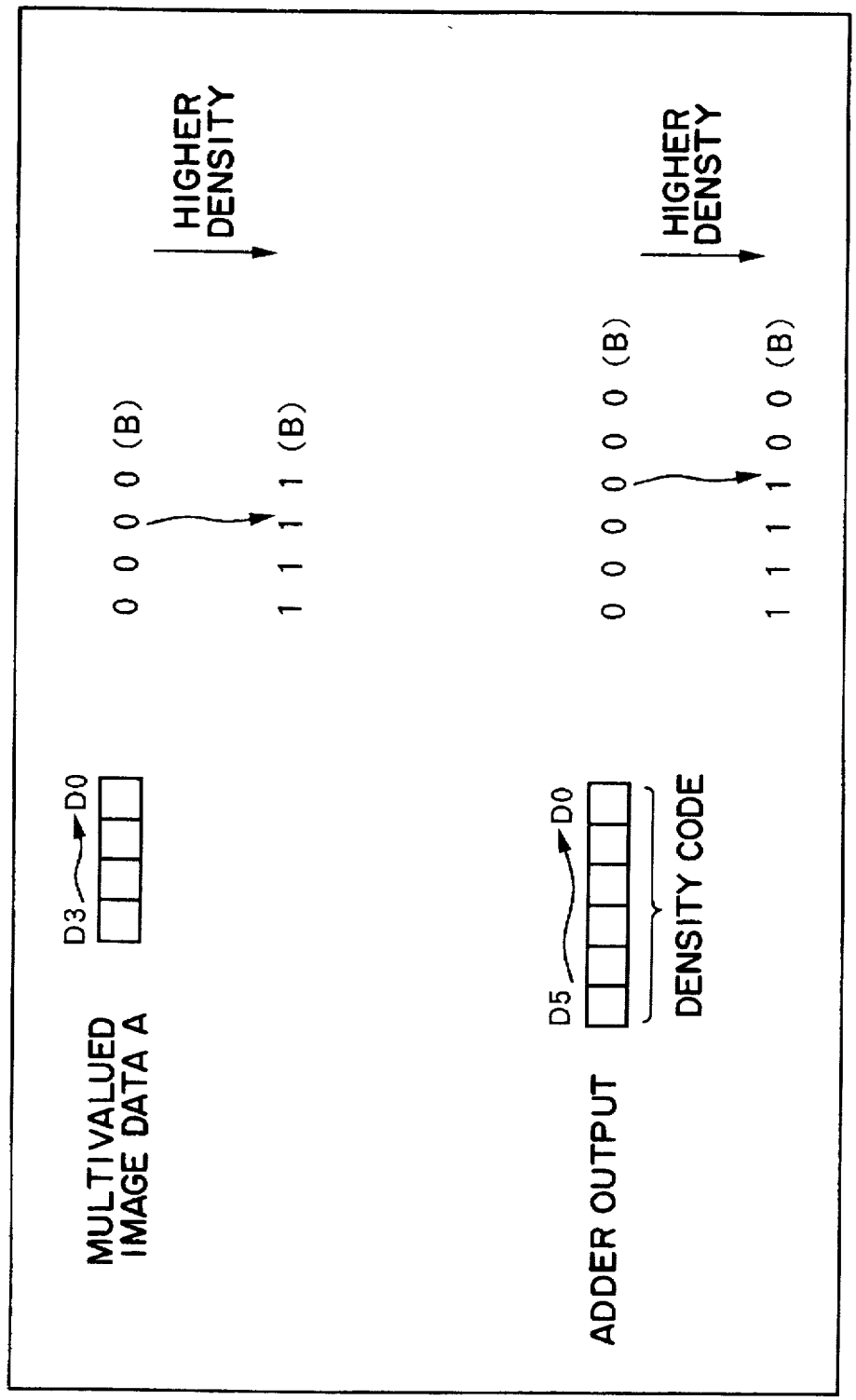
FIG. 4 is a diagram showing multivalued image data and an output signal from an adder.
Figure 5:
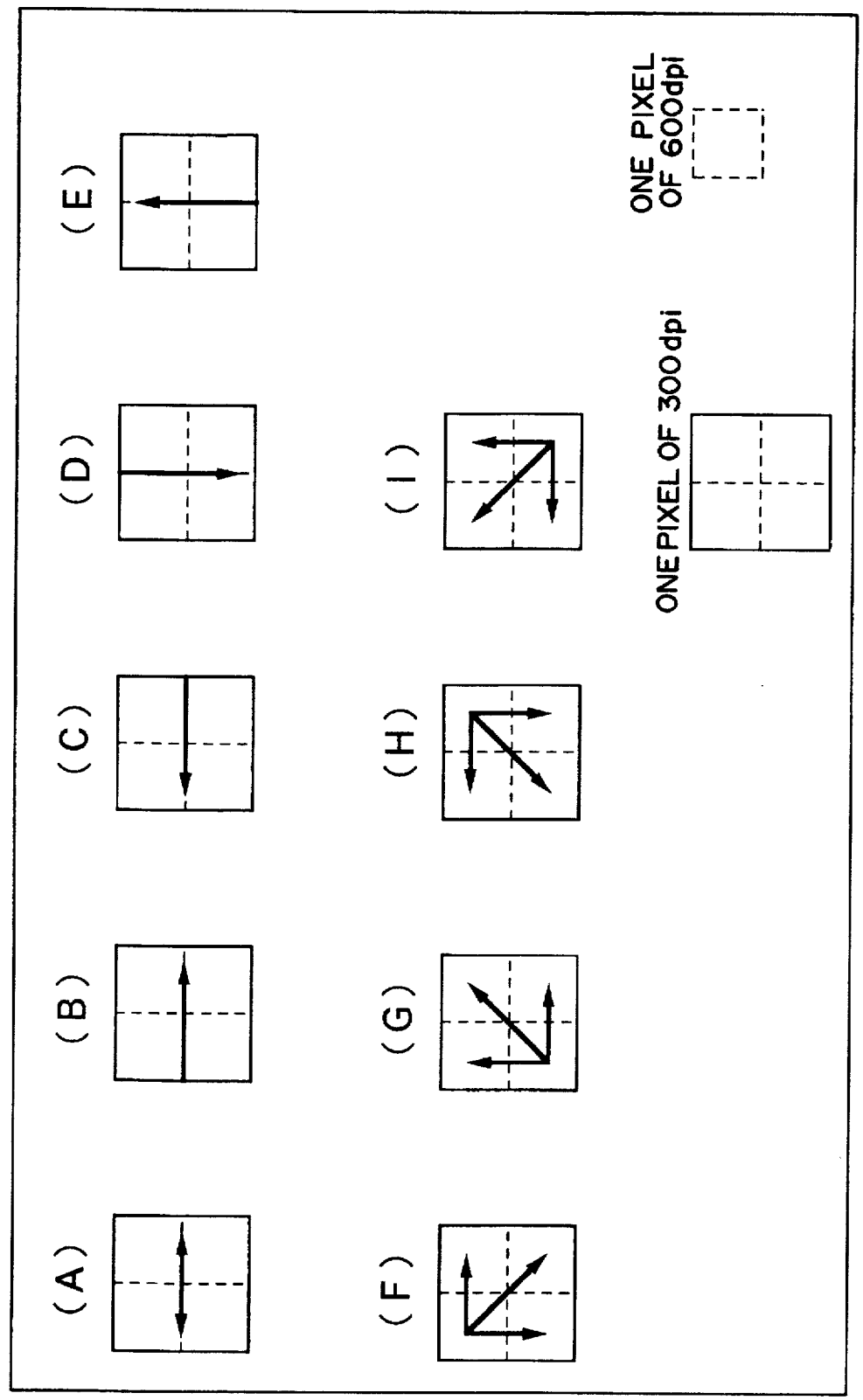
FIG. 5 is a diagram for describing pixels and the growth direction of a density pattern.

A timing chart showing the foregoing operation is illustrated in FIG. 3. The details of the adder 11 will be described later. The six-bit multivalued image data outputted by the adder 11 shown in FIG. 4 (this is 300 dpi six-bit data obtained by adding two dots of 600 dpi four-bit image data in the main scanning direction and two dots of this data in the sub-scanning direction, for a total of four dots) is fed into the PWM growth-direction decision unit 24. The inputs to the PWM growth-direction decision unit 24 are the six-bit and a Q1 output from the main-scanning counter 13, which is the result of divide-by-four frequency division. The PWM growth-direction decision unit 24 outputs a signal composed of a total of ten bits, namely a pattern-select signal (four bits) for selecting one of nine patterns from (A) to (I) in FIG. 5, in which reference is made to eight pixels surrounding the pixel of interest, and multivalued data (six bits) of the pixel of interest. The inputs to the density-pattern generating table 12 are multivalued data (six bits) A0~A5 of the pixel of interest, four bits A9~A12 of the pattern select signal, a Q0 output A6 of the main-scanning counter 13, which signal is the result of frequency-dividing the image clock by two, and a Q0 output A7 of the sub-scanning counter 14. The table 12 outputs a density code signal based upon a look-up table (e.g., a ROM or the like) having an address map shown in FIG. 6. It should be noted that the density code generated by the density-pattern generating table 12 is assumed to be a code that takes into consideration a correction of the γ characteristic of the printer.

Figure 6:
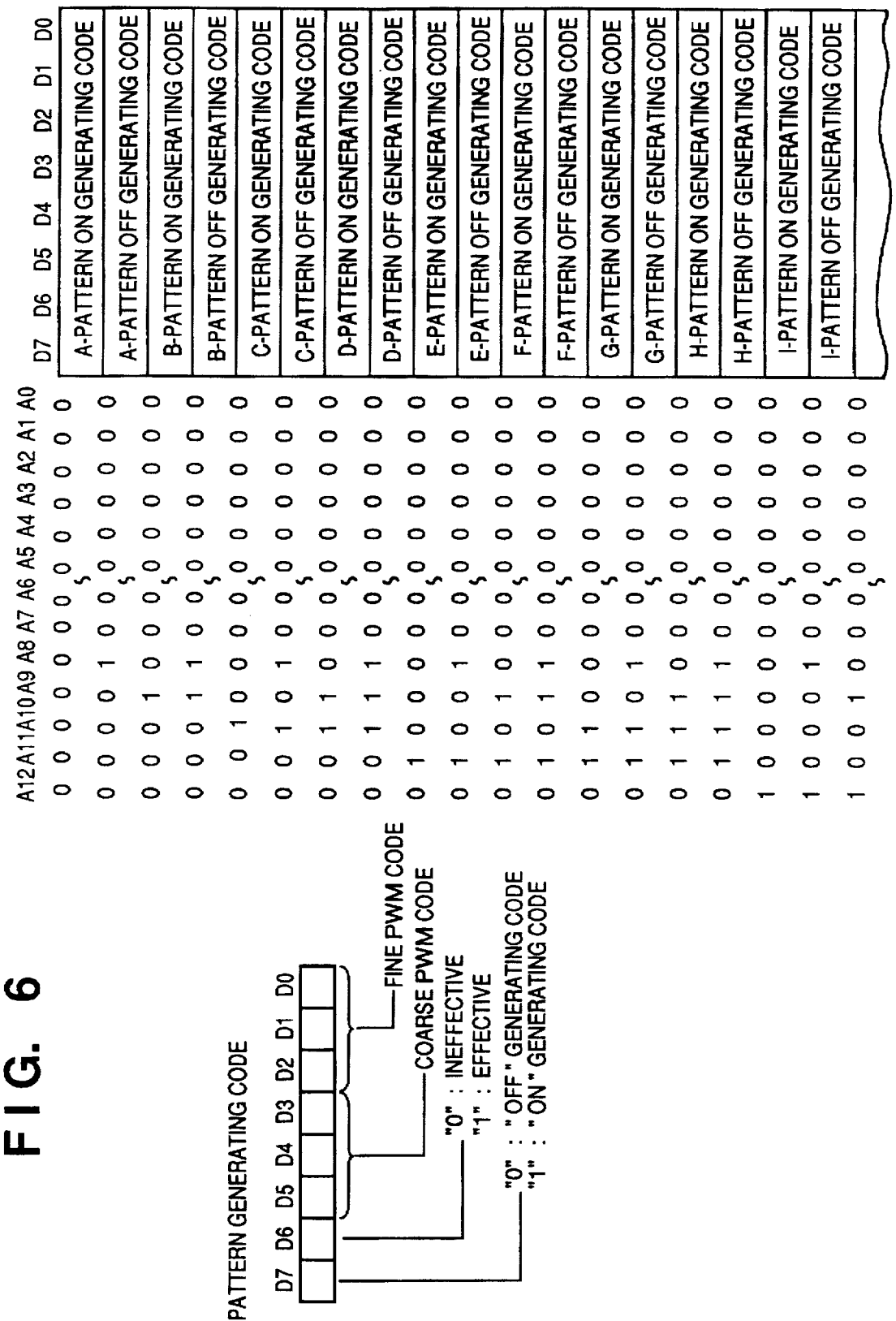
FIG. 6 is an address map of a look-up table.

As illustrated in FIG. 6, the address A8 is a 600 dpi image clock. An ON generation code and an OFF generation code are outputted with respect to one dot of 600 dpi. Pulse-width modulation is carried out by the PWM processor 5, the details of which will be described later. The PWM processor 5 monitors the MSB (bit D7 in FIG. 6) of the density code and recognizes the ON generation code if the MSB is "1" and the OFF generation code if the MSB is "0". One dot is subjected to PWM in units of ⅛ by the density code of D5~D3 and in units of 1/64 by D2~D0.

Figure 7:
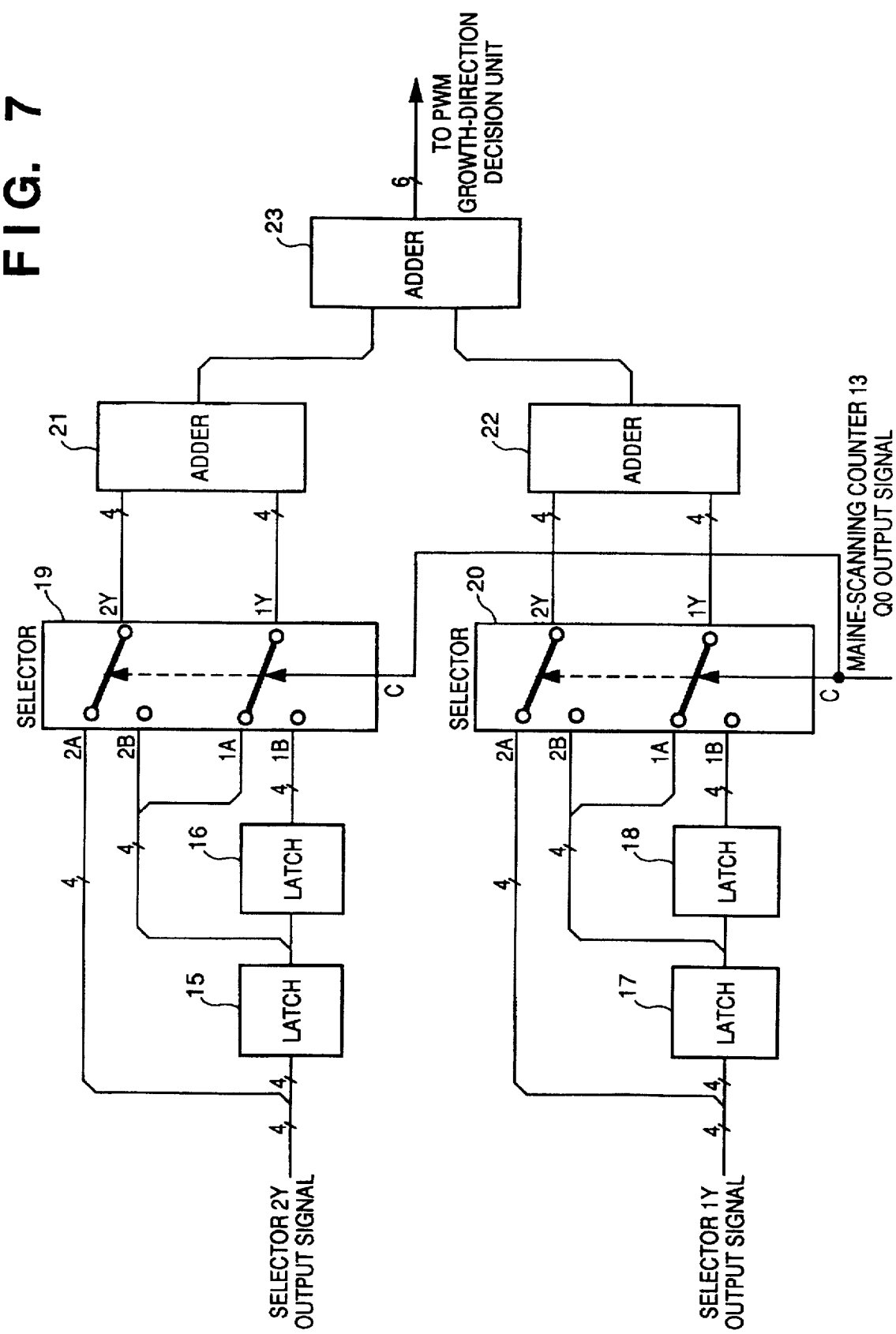
FIG. 7 is a circuit diagram showing the configuration of the adder depicted in FIG. 2.
Figure 8:
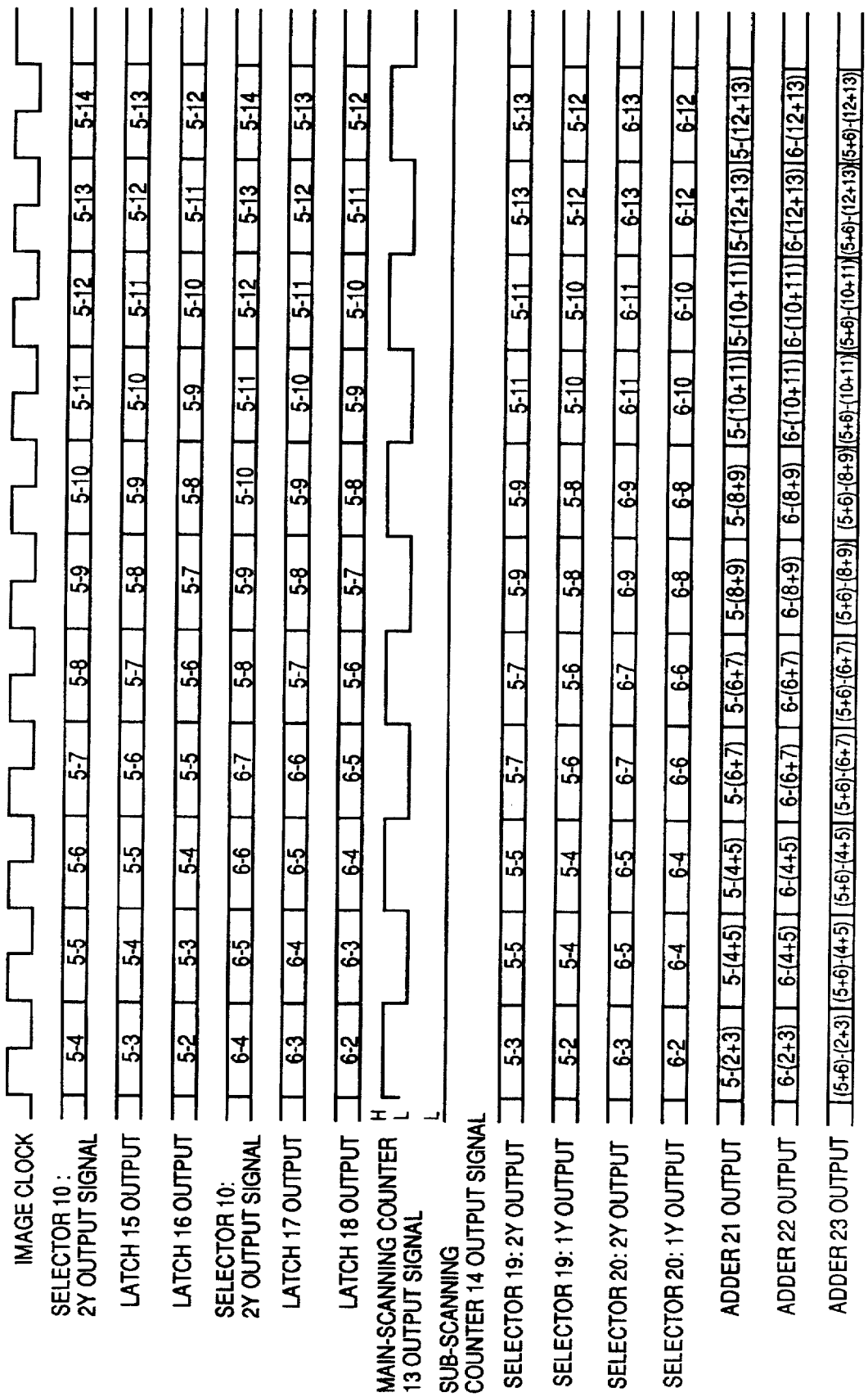
FIG. 8 is a time chart showing the operation of the adder depicted in FIG. 2.

FIG. 7 shows an example of the circuitry of the adder circuit 11 illustrated in FIG. 2. As shown in FIG. 7, the adder includes latches 15~18 for latching data in synchronization with the 600 dpi image clock (not shown), selectors 19, 20 and adding circuits 21~23. FIG. 8 is a time chart illustrating the operation of this arrangement. In FIG. 8, "5-4" means the fourth dot of data on the fifth line, and "5-(6+7)" means data obtained by adding the sixth and seventh dots on the fifth line. Similarly, (5+6)-(6+7) signifies data obtained by adding the sixth and seventh dots on the fifth line and the sixth and seventh dots on the sixth line. A 1Y output signal from the selector 10 enters as data on the (2n−1)th line, and a 2Y output signal from the selector 10 enters as data on the 2n-th line. The adding circuits 21, 22 each add the data of the (2n−1)th dot and 2n-th dot of the respective lines. The adding circuit 23 adds the two signals resulting from the above-described addition operations, thereby obtaining a six-bit signal as the result of addition.

The general features of the PWM growth-direction decision unit 24 shown in FIG. 2 will now be described.

Figure 9:
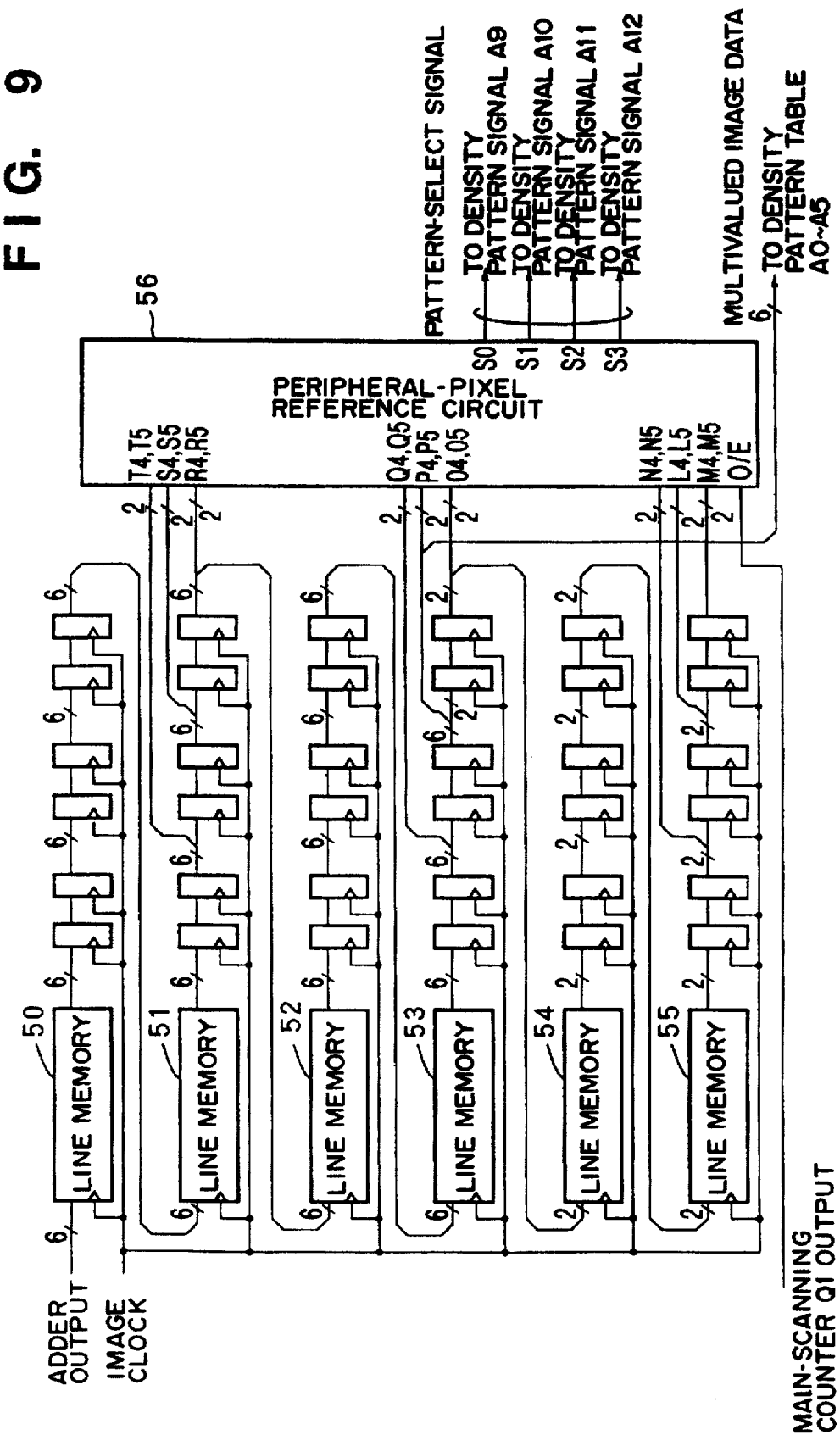
FIG. 9 is a circuit diagram showing the configuration of a PWM growth-direction decision unit shown in FIG. 2.
Figure 10:
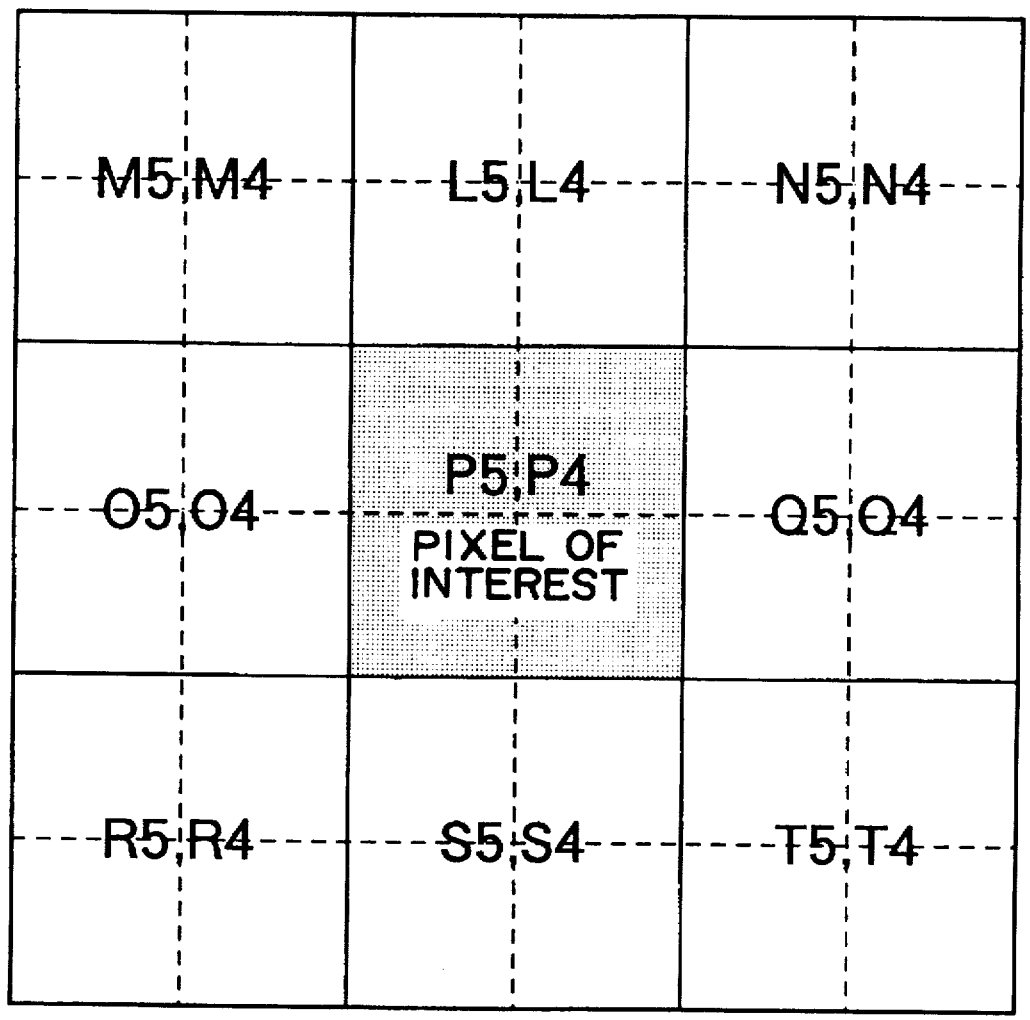
FIG. 10 is a diagram showing a pixel of interest as well as referential peripheral pixels.

FIG. 9 is an example of the circuitry of the PWM growth-direction decision unit 24. The decision unit 24 includes six-bit line memories 50~53, two-bit line memories 54, 55, and a peripheral-pixel reference circuit 56. The six-bit signal from the adder is stored successively in the line memories. When a total of six lines of data are stored, the two higher order bits of a total of nine pixels comprising the pixel of interest and the pixels surrounding it are transmitted to the peripheral-pixel reference circuit 56. With regard to the above-mentioned six-bit signal, data is transmitted in 600 dip one-dot units, but the same data is transmitted in units of two bits, as illustrated in FIG. 8. Data is transmitted in units of one line at 600 dpi in the sub-scanning direction, but the same data is transmitted in units of two lines. In accordance with this circuit arrangement, eight pixels peripheral to the pixel of interest are capable of being referred to by the peripheral-pixel reference circuit 56, as illustrated in FIG. 10. Reference is made to the two higher order bits of the multivalued data of each pixel, the features of the density of the pixel of interest are detected and the PWM growth direction of the pixel of interest is decided. For example, in a case where the two higher order bits P5, P4 of the multivalued data of the pixel of interest are (1,1), the output of the adder 11 is 110000(B)~111100(B), namely 48~60 tones. In case of (1,0), the output of the adder is 100000(B)~101111(B) or 32~47 tones; in case of (0,1), the output of the adder is 010000(B)~011111(B) or 16~31 tones; and in case of (0,0), the output of the adder is 000000(B) ~001111(B) or 0~15 tones.

Figure 11:
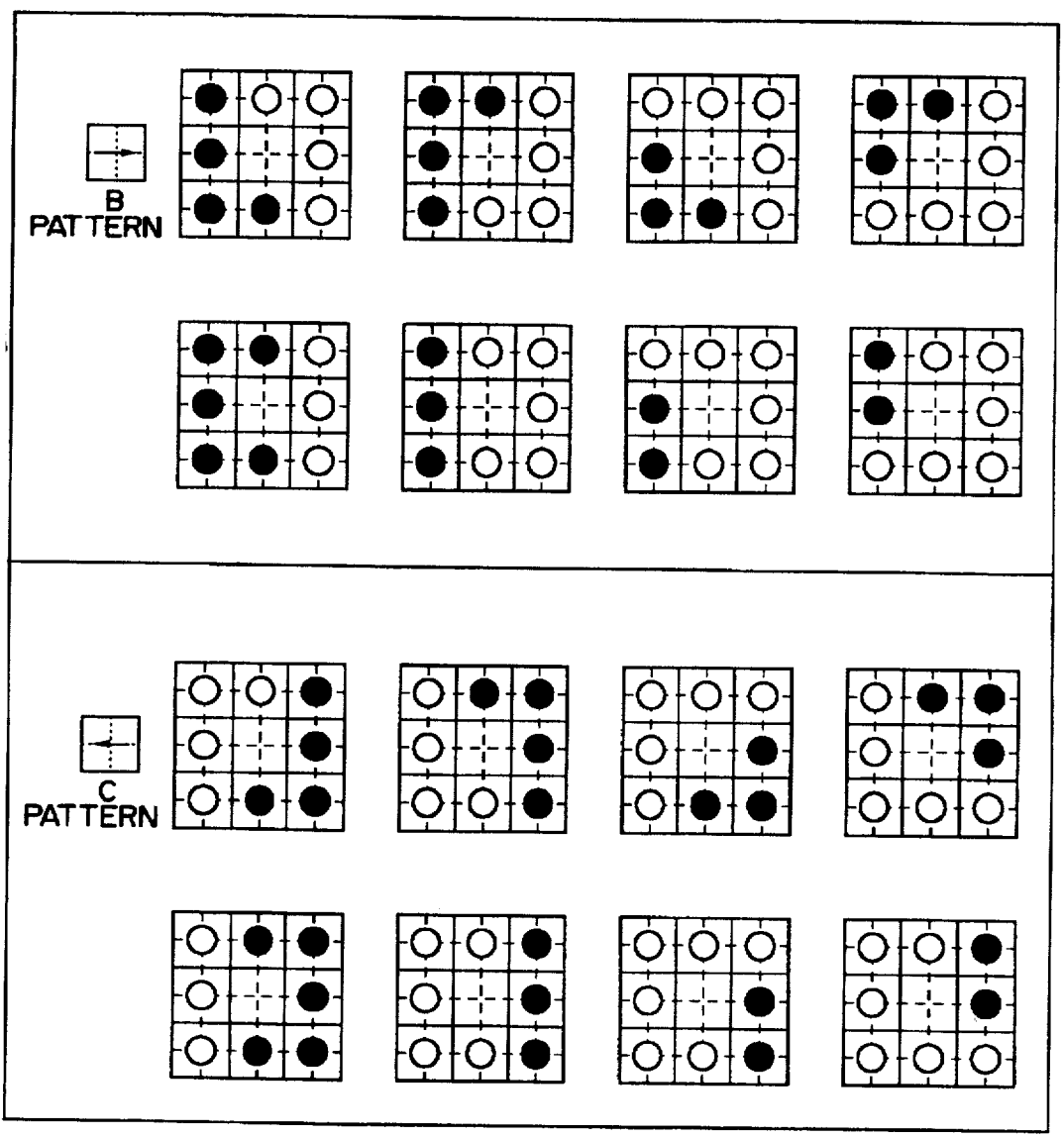
FIG. 11 is a diagram showing density patterns of peripheral pixels in the first embodiment.
Figure 12:
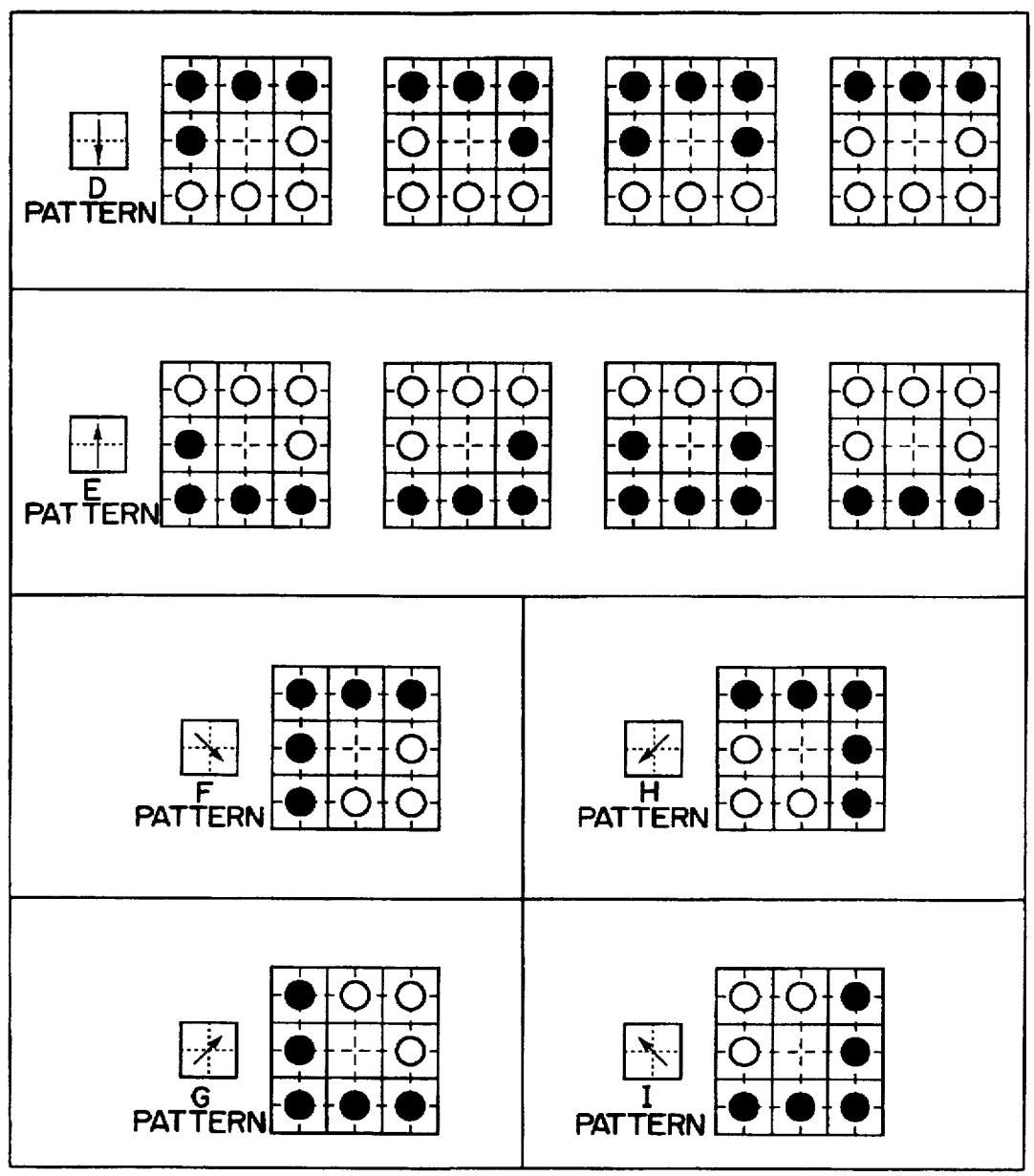
FIG. 12 is a diagram showing density patterns of peripheral pixels in the first embodiment.

PWM in a prescribed growth direction is performed when the eight pixels peripheral to the pixel of interest coincide with the density features of the kind shown in FIGS. 11 and 12. For example, B-pattern growth PWM (right-side growth) is selected and performed for a peripheral density that declines sharply to the right; D-pattern growth PWM (lower-side growth) for a peripheral density that declines sharply downward; and F-pattern growth PWM (lower-right-side growth) for a peripheral density that declines sharply to the lower right. Further, in a case where none of the peripheral pixel patterns for performing B-pattern to I-pattern growth PWM apply, namely a case in which there is no sudden change in density or a case in which the density features are uniform, an odd-number pixel (where 300 dpi is adopted as one pixel) is adopted for C-pattern growth PWM (left-side growth) and an even-number pixel (where 300 dpi is adopted as one pixel) is adopted for B-pattern growth PWM (right-side growth). In FIGS. 11 and 12, a pixel for which the two higher order bits of the image data are "1"s is represented by a black dot, and a pixel for which one higher order bit of the image data is "0" is represented by a white dot.

Figure 13:
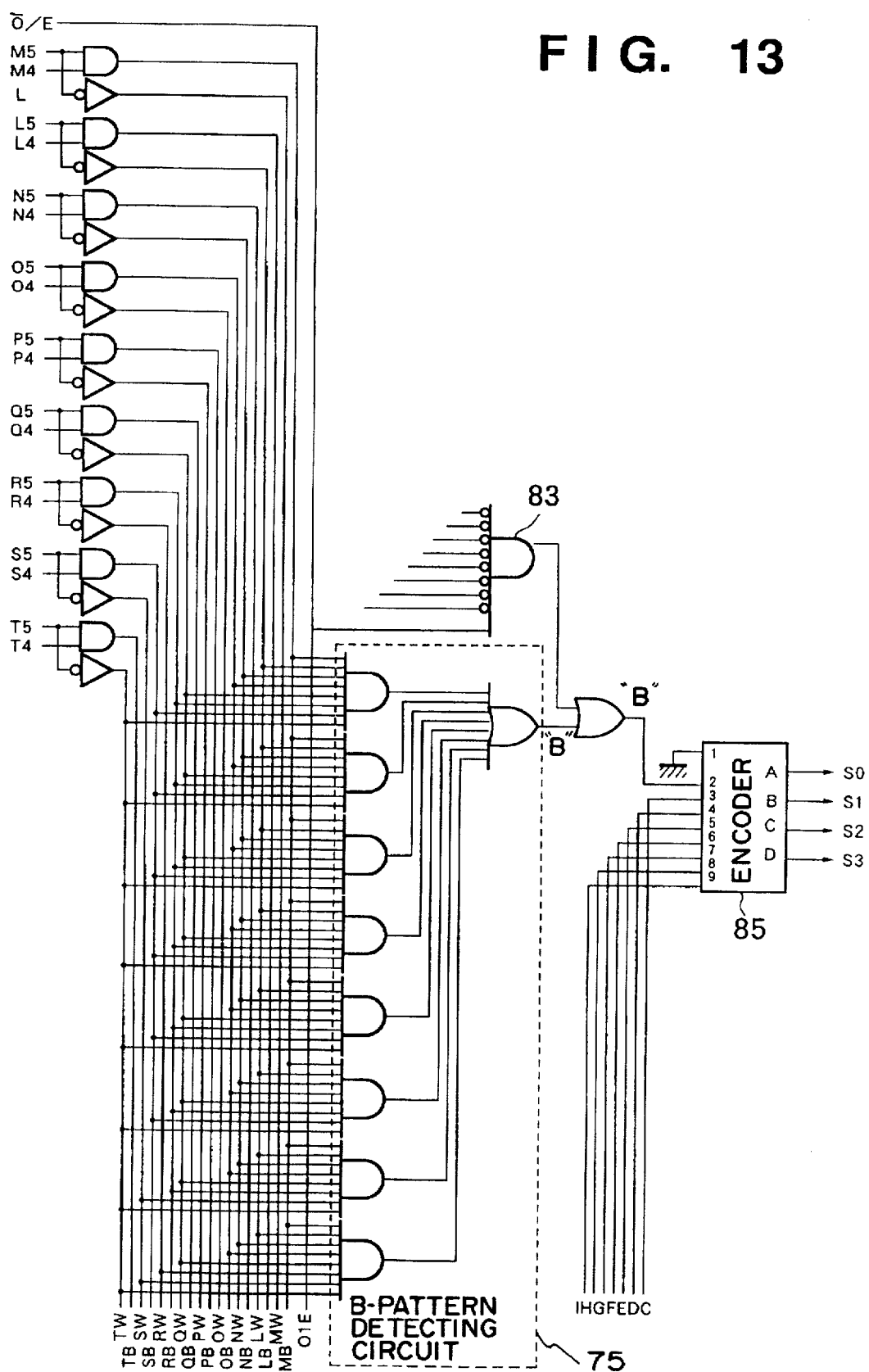
FIG. 13 is a circuit diagram showing the configuration of a peripheral-pixel reference circuit shown in FIG. 9.
Figure 14:
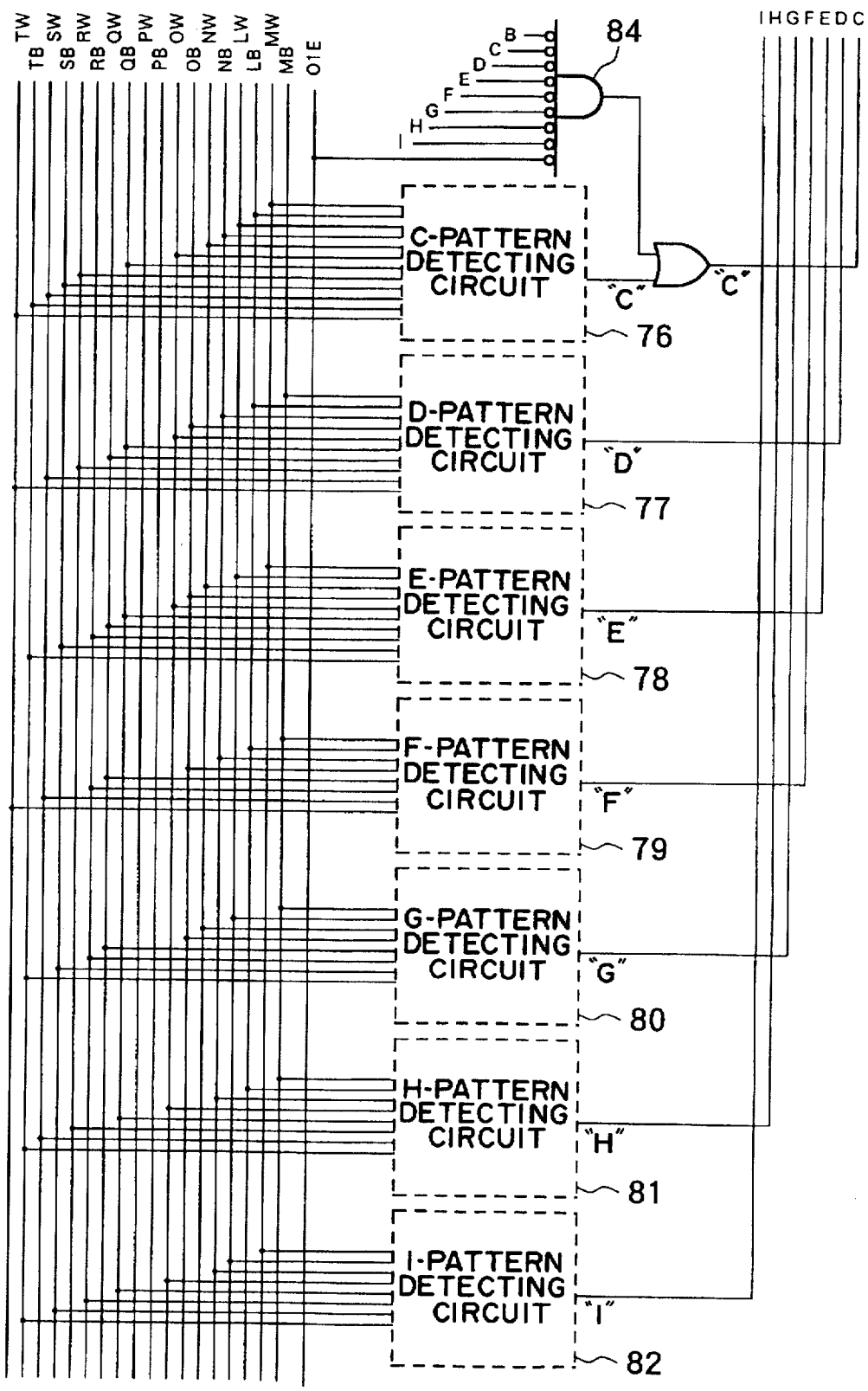
FIG. 14 is a circuit diagram showing the configuration of a peripheral-pixel reference circuit shown in FIG. 9.

FIGS. 13 and 14 are examples of circuitry constituting the peripheral-pixel reference circuit shown in FIG. 9. In FIGS. 13 and 14, TW=1 is a case in which T5=0 holds, and TW=0 is a case in which T5≠0 holds, by way of example. Further, TB=1 is a case in which (T5,T4)=(1,1) holds, and TB=0 is a case in which (T5,T4)≠(1,1) holds. With regard to an odd-number/even-number detection signal O/E, an even-numbered pixel is indicated by "1" and an odd-number pixel by "0". Matching of density patterns is carried out by pattern detecting circuit 75~82, and pattern-select signals S0~S3 coded by an encoder 85, which is the last state in the circuit, are outputted. The relationship between the pattern-select signals and pattern growth direction is as illustrated in Table 1.

TABLE 1

| S3 | S2 | S1 | S0 | PATTERN GROWTH DIRECTION SELECTED |
|----|----|----|----|-----------------------------------|
| 0  | 0  | 0  | 0  | B |
| 0  | 0  | 1  | 0  | C |
| 0  | 0  | 1  | 1  | D |
| 0  | 1  | 0  | 0  | E |
| 0  | 1  | 0  | 1  | F |
| 0  | 1  | 1  | 0  | G |
| 0  | 1  | 1  | 1  | H |
| 1  | 0  | 0  | 0  | I |

The construction and operation of the PWM processor 5 shown in FIG. 1 will now be described.

Figure 15:
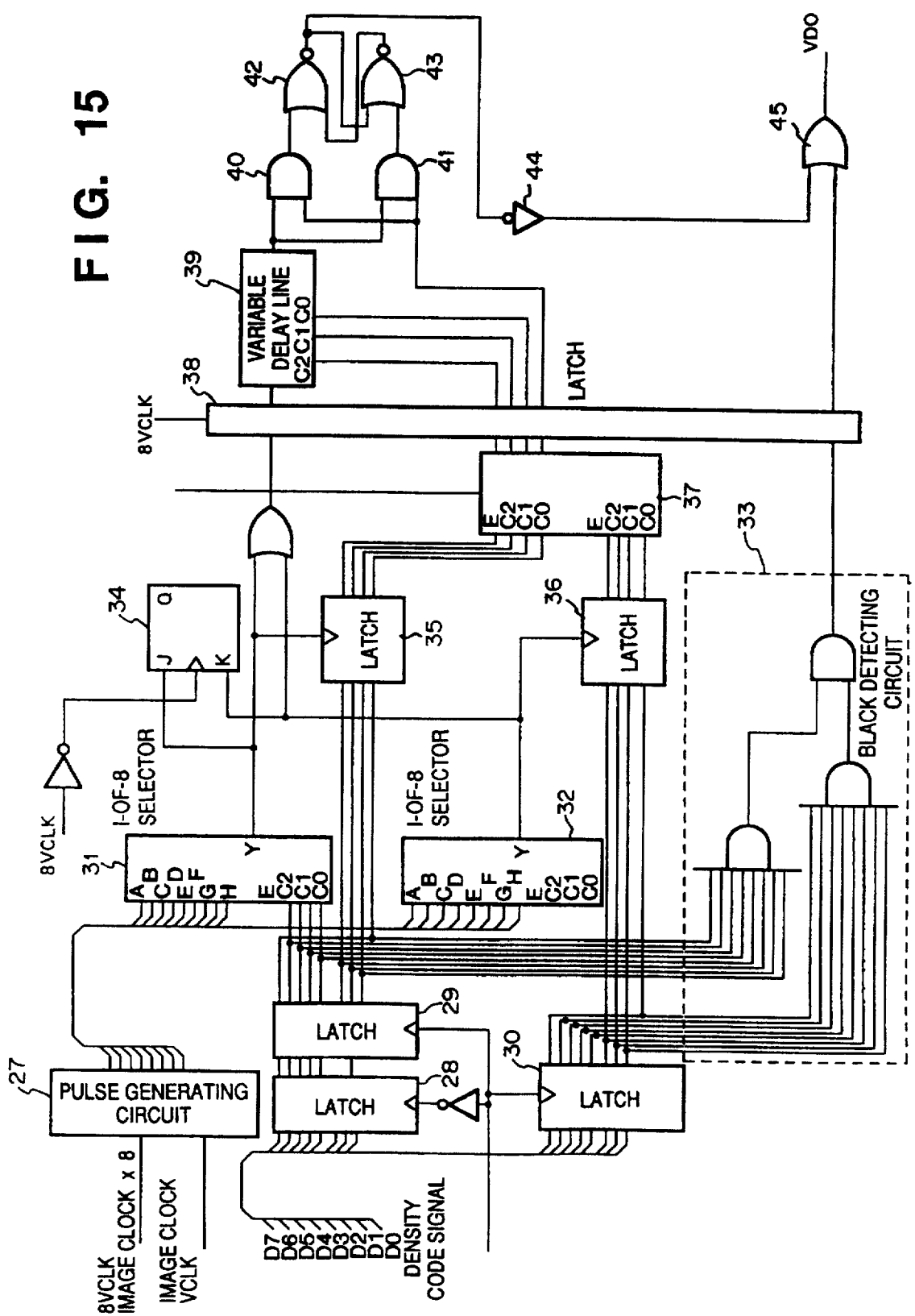
FIG. 15 is a block diagram showing the configuration of a PWM processor shown in FIG. 1.

FIG. 15 is a block diagram showing the detailed construction of the PWM processor 5. This circuit performs coarse PWM (in which one dot at 600 dpi is pulse-width modulated in units of ⅛ dot) and fine PWM (in which one dot at 600 dpi is pulse-width modulated in units of 1/64 dot). The arrangement of FIG. 15 includes a pulse generating circuit 27, latches 28–30, 35, 36 and 38, one-of-eight selectors 31, 32, a black detecting circuit 33, a J-K flip-flop 34, a four-of-eight selector 37, and a variable delay circuit 39. An RS latch is composed of NOR gates 42, 43.

Figure 16:
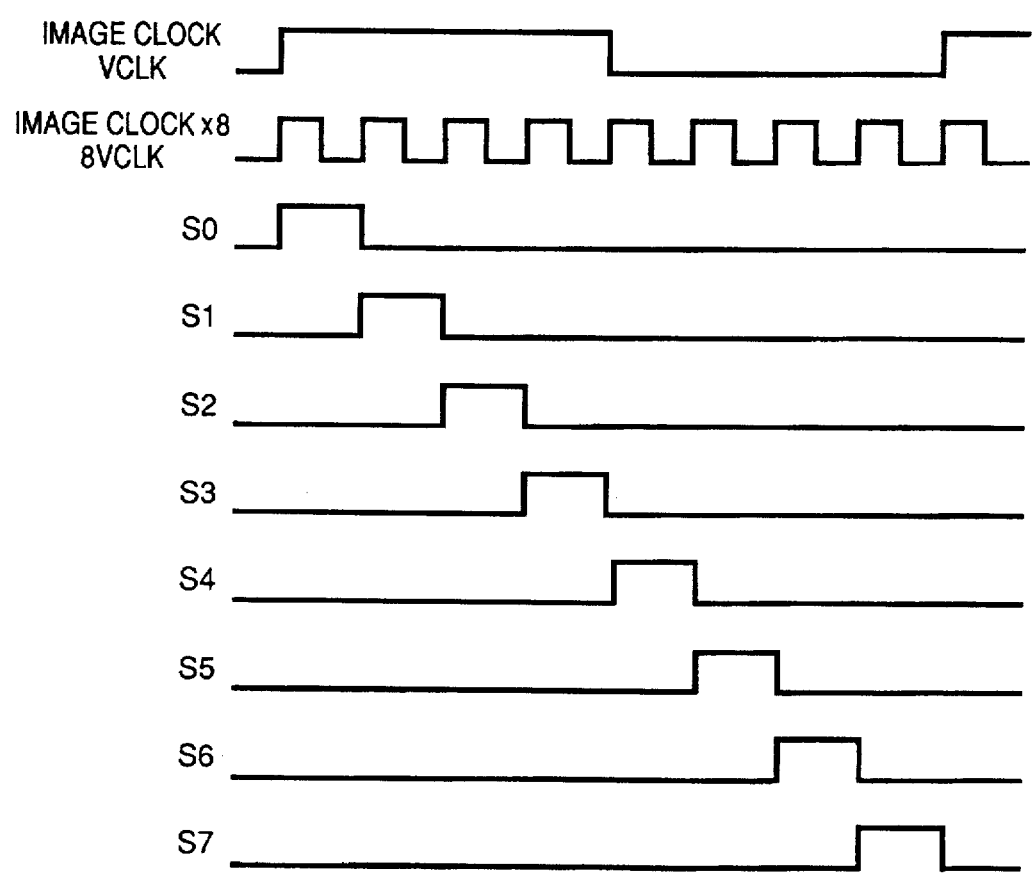
FIG. 16 is a time chart illustrating output pulses from a pulse generating circuit shown in FIG. 15.

In the arrangement described above, the pulse generating circuit 27 generates eight (S0–S7) pulses, shown in FIG. 16, based upon the image clock VCLK and a clock having a frequency eight times that of the image clock. Each of these pulses enters the selectors 31, 32, which decide to select and output, or to disable, one pulse from among the pulses S0–S7 based upon the density code signals D6, D5, D4, D3 among density code signals D0–D7 outputted by the data generator 4. The select logic of the selectors 31, 32 is as shown in Table 2.

TABLE 2

| E | C2 | C1 | C0 | OUTPUT |
|---|----|----|----|--------|
| 0 | 0  | 0  | 0  | A |
| 0 | 0  | 0  | 1  | B |
| 0 | 0  | 1  | 0  | C |
| 0 | 0  | 1  | 1  | D |
| 0 | 1  | 0  | 0  | E |
| 0 | 1  | 0  | 1  | F |
| 0 | 1  | 1  | 0  | G |
| 1 | *  | *  | *  | "LOW" |

Figure 17A:
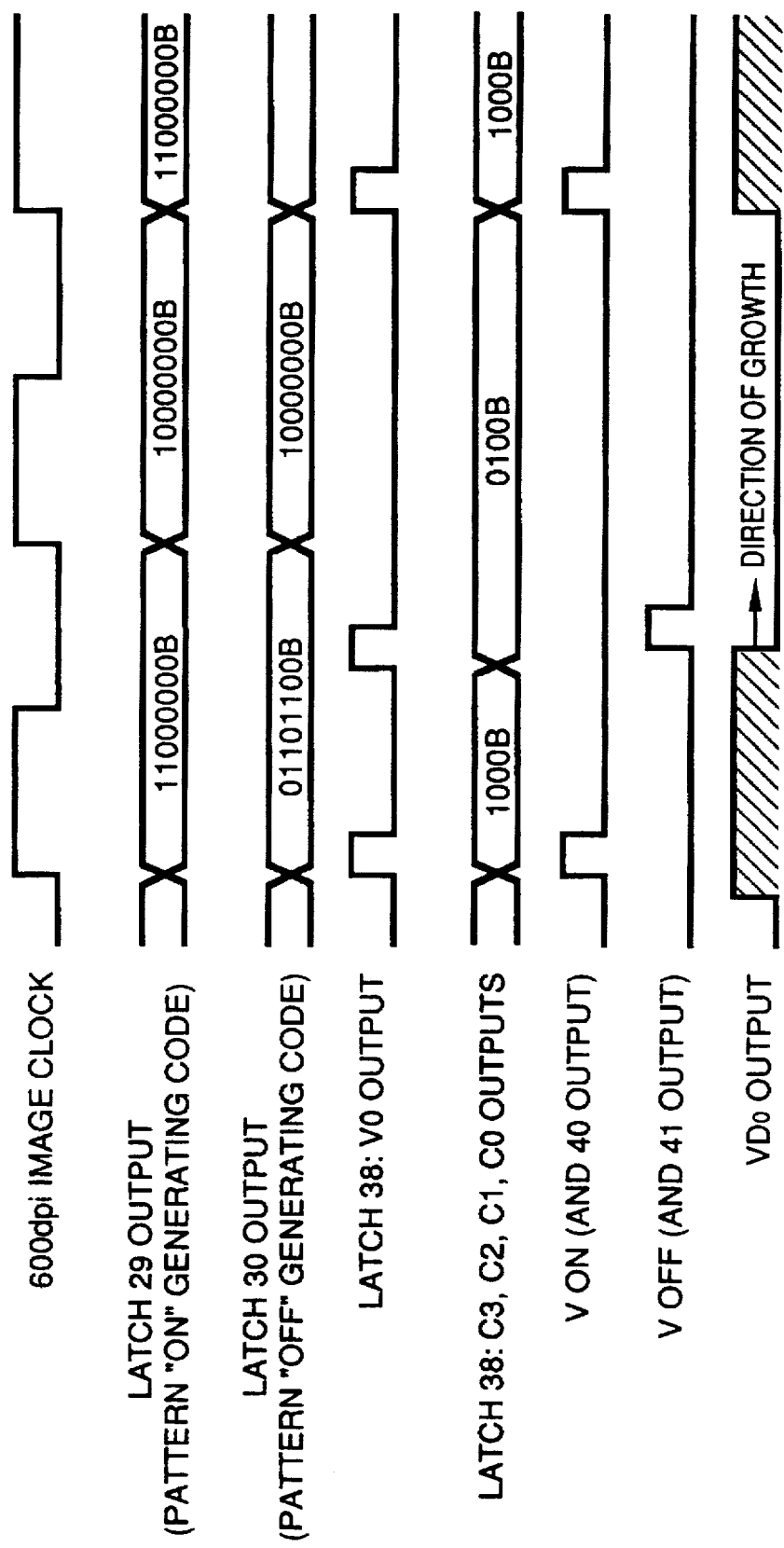
FIG. 17 is a time chart illustrating right-side growth PWM and both-side growth PWM.

When a predetermined input is applied to the black detecting circuit 33, the dot is judged to be a black dot and "1" is outputted. When "1" is outputted, the VDO signal is forcibly outputted as "1" by an OR gate 45, which is the last stage. The VDO signal at logical "1" is a signal that fires a laser (not shown), and the VDO signal at logical "0" is a signal that extinguishes the laser. In all other cases, namely when a dot is a half-tone printing dot and not a black dot, a VDO signal of the kind shown in FIG. 17 is generated. FIG. 17(a) is a time chart of VDO generation in case of right-side growth PWM, and FIG. 17(b) is a time chart of VDO generation in case of both-side growth PWM.

The operation of the PWM processor 5 will be described taking the right-side growth PWM shown in FIG. 17(a) as an example. The density code signal outputted by the density-pattern generating table 12 is composed of eight bits of an ON generation code and eight bits of an OFF generation code within one dot at 600 dpi. These are outputted by the latches 28–30 in synchronization with the leading edges of the image clock of 600 dpi. The latch 29 outputs the pattern ON generation code, and the latch 30 outputs the pattern OFF generation code. In each generation code, four bits (D6, D5, D4, D3) enter as control signals E, C2, C1, C0 of the one-of-eight selectors 31, 32. One of the pulses from among S0–S7 outputted by the pulse generating circuit 27 is selected. The ON and OFF pulses outputted by the selectors 31, 32 are OR-ed by an OR gate, the output of which is applied to the latch 38.

Meanwhile, in the generation code outputted by the latches 29, 30, four bits (D7, D2, D1, D0) enter each of the latches 35, 36 and are outputted in synchronization with the leading edges of the above-mentioned ON and OFF pulses. The ON generation code D7, D2, D1, D0 is outputted by the four-of-eight selector 37 and J-K flip-flop 34 from the leading edge of the ON pulse to the leading edge of the OFF pulse, and the OFF generation code D7, D2, D1, D0 is outputted from the leading edge of the OFF pulse to the leading edge of the next ON pulse. The latch 38 outputs a signal V0, which is the result of combining the ON and OFF pulses, fine PWM control signals C2–C0, and a recognition signal C3 of the ON and OFF pulses. The ON and OFF pulses are both delayed by a delay time of less than ⅛ of a dot by the variable delay circuit 39.

Table 3 shows the amounts of delay applied, which are decided by the signals C2–C0.

TABLE 3

| C2 | C1 | C0 | DELAY TIME |
|----|----|----|------------|
| 0  | 0  | 0  | 0/64 OF PULSE WIDTH OF 1 DOT |
| 0  | 0  | 1  | 1/64 OF PULSE WIDTH OF 1 DOT |
| 0  | 1  | 0  | 2/64 OF PULSE WIDTH OF 1 DOT |
| 0  | 1  | 1  | 3/64 OF PULSE WIDTH OF 1 DOT |
| 1  | 0  | 0  | 4/64 OF PULSE WIDTH OF 1 DOT |
| 1  | 0  | 1  | 5/64 OF PULSE WIDTH OF 1 DOT |
| 1  | 1  | 0  | 6/64 OF PULSE WIDTH OF 1 DOT |
| 1  | 1  | 1  | 7/64 OF PULSE WIDTH OF 1 DOT |

The output signal from the variable delay circuit 39 it split into a VDO-on signal VON and a VDO-off signal VOFF by the C3 output of the latch 38, a PWM signal is produced by the RS latch (NOR gates 42, 43) and this signal is outputted as the image signal VDO via the OR gate 45.

Figure 19:
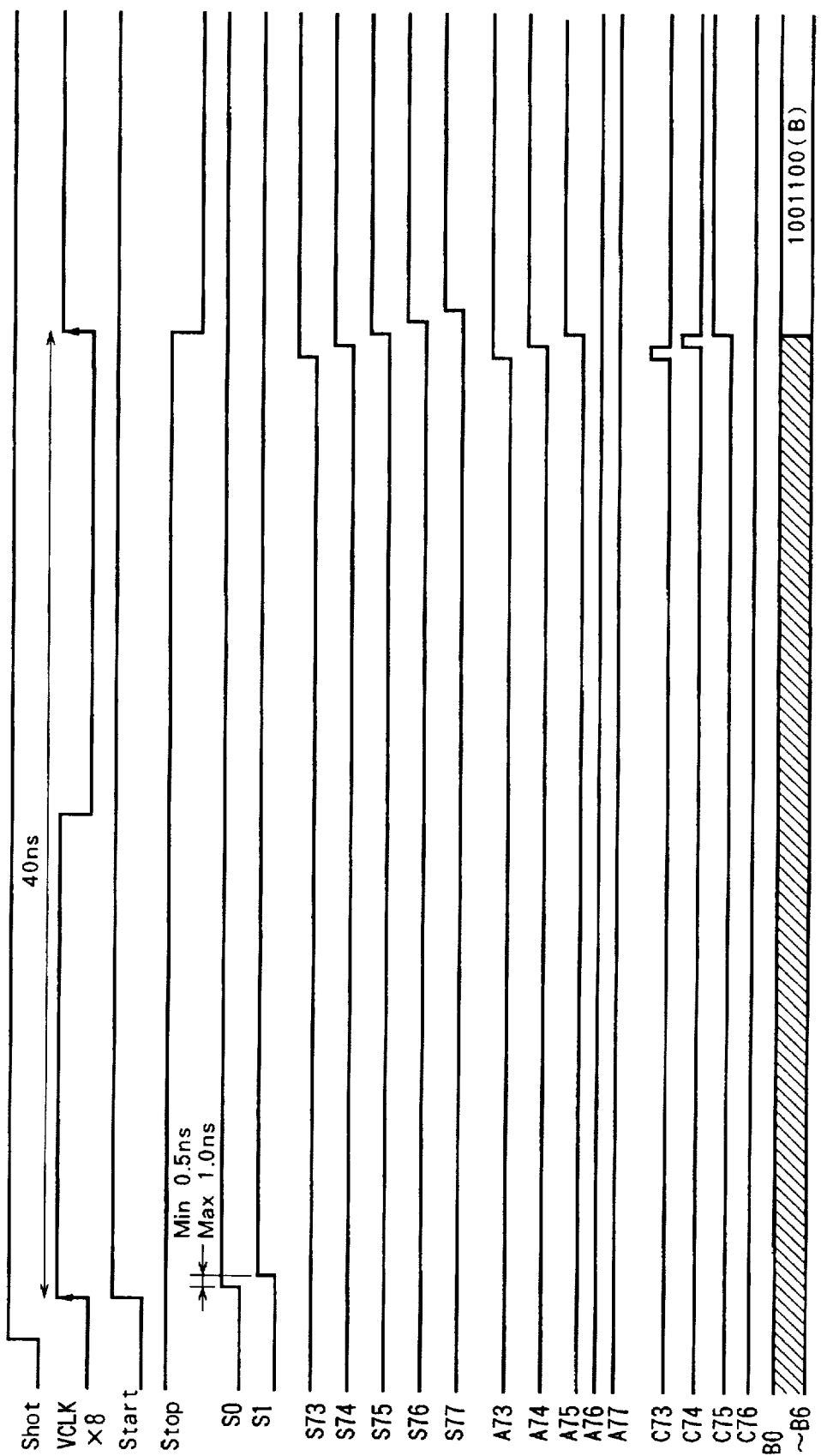
FIG. 19 is a time chart showing the operation of the variable delay circuit depicted in FIG. 18.

FIG. 18 is a circuit diagram showing the configuration of the variable delay circuit 39, and FIG. 19 is a time chart associated with the circuit 39. The operation of the variable delay circuit 39 will be described with reference to FIGS. 18 and 19. It should be noted that the circuit 39 sets the above-mentioned delay quantities before the printing operation is carried out.

First, a setting signal ST is rendered effective so that a selector 91 shown in FIG. 18 will select a start signal START for a setting operation. A one-shot pulse is inputted to a D-type flip-flop 93 as a SHOT signal, and a Q output synchronized to 8VCLK is inputted as a START signal to a circuit composed of 80 serially connected buffers. A STOP signal, which is the Q̄ output of a D-type flip-flop 94, decays following a time delay of one period (e.g., 40 ns) of the 8VCLK signal, which delay is measured from the leading edge of the START signal. In other words, each of the delay signals S0–S80 changes from "low" to "high" while being delayed successively, starting from S0, by the gate delay time. Thus, when a delay signal changes from "high" to "low", the Q output of the D-type flip-flop connected ahead of it changes from "low" to "high". The Q outputs of the D-type flip-flops connected to those buffers among the 80 buffer gates to which the START signal has been applied within the period of 40 ns from the leading edge of the START signal to the trailing edge of the STOP signal attain the "high" level.

If, by way of example, the START signal is "high" up to S75, as illustrated in FIG. 19, then A0~A75 go "high" and A76~A80 remain "low". C75, which is the output of the subsequent exclusive-OR operation, goes "high" and the other outputs C0~C74 and C76~C79 remain "low". As a result, outputs B0~B6 are coded into seven bits, namely 1001011B, by a 79 line to 7 line encoder 95 and these outputs are inputted as the control signals of the delay-quantity setting selector 92. Eight delay signals are selected from the delay signals S0~S80 by the control signals B0~B6 in the delay-quantity selector 92, and these are delivered as P0~P7. FIG. 20 is a logic table showing the relationship between the control signals B0~B6 and the eight output signals P0~P7 selected from the delay signals S0~S80 in the delay-quantity setting selector 92. According to the time chart of FIG. 19, the control signals B0~B6 are indicative of the code 1001011B, and therefore S0 is selected for P0, S10 for P1, S19 for P2, S28 for P3, S38 for P4, S47 for P5, S57 for P6, S66 for P7. The signals P1~P7 are each delayed about 5 ns at a time. The variable delay circuit 39 preferably is composed of a gate array. If the circuit is constructed on the same chip, the buffer delay times will be approximately equal.

In the above-described example, the case described is one in which buffer gate delay is a minimum of 0.5 ns and a maximum of 1.0 ns. Design is such that 40 [ns]/0.5 [ns]=80 gates so that operation is possible at the minimum delay time of 0.5 ns. When the above-described operation ends and the printing operation begins, the selector 91 of FIG. 18 selects the output V0 of the latch 38. One of the output signals P0~P7, which have delay quantities that differ from one another, is outputted from the Y output of the selector 96 by the density code signals D0~D2, which are the outputs C2, C1, C0 of the latch 38 at the time of the printing operation. It should be noted that the above-mentioned SET signal and SHOT signal may be generated by a CPU or the like, not shown.

The variable delay circuit constituting the PWM processor of this embodiment is provided with a circuit that utilizes a semiconductor delay. However, it is permissible to perform PWM processing that utilizes circuitry using a high-frequency clock or circuitry that generates an analog-type ramp function. Modulation of luminous intensity also may be employed instead of pulse-width modulation.

Figure 21:
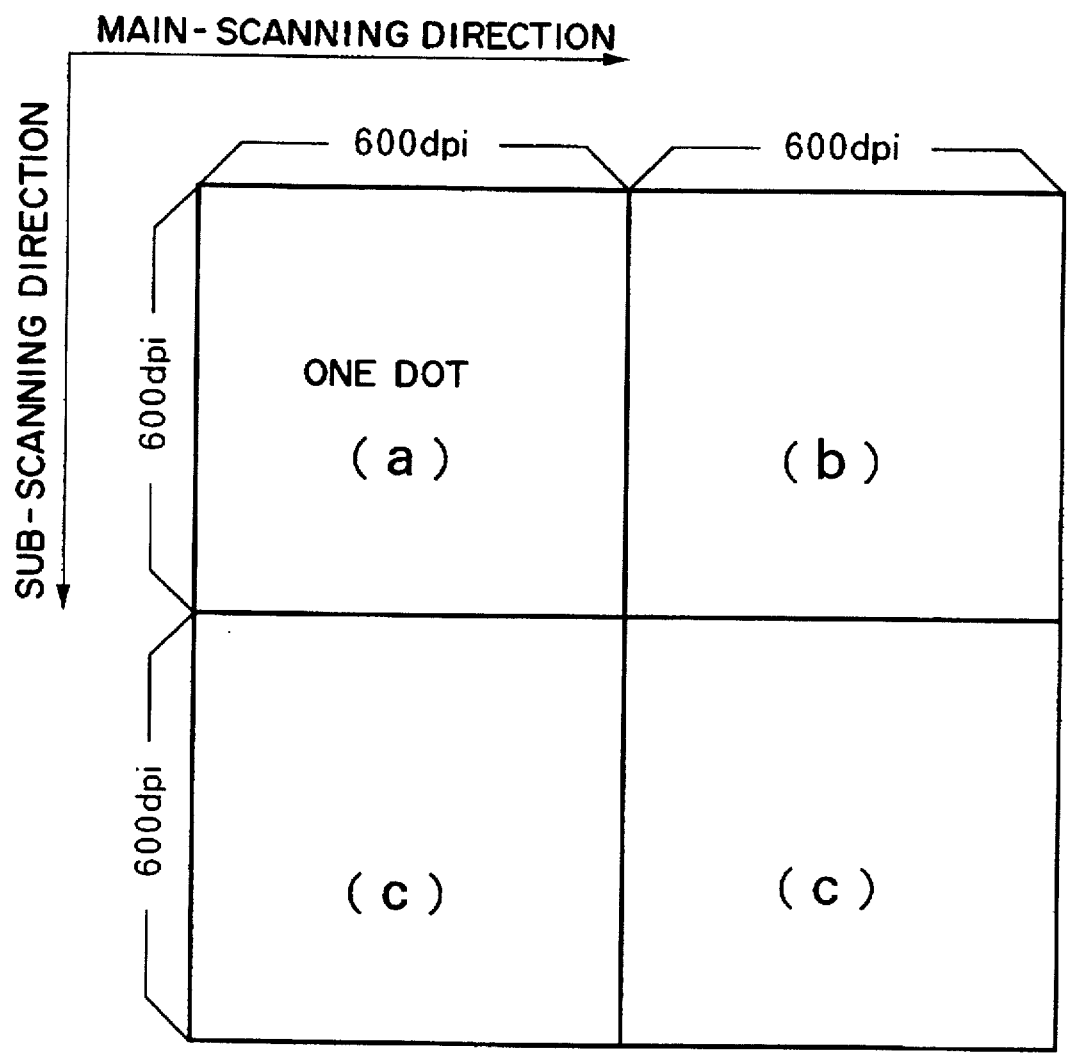
FIG. 21 is a diagram showing a growth matrix composed of four dots.
Figure 23:
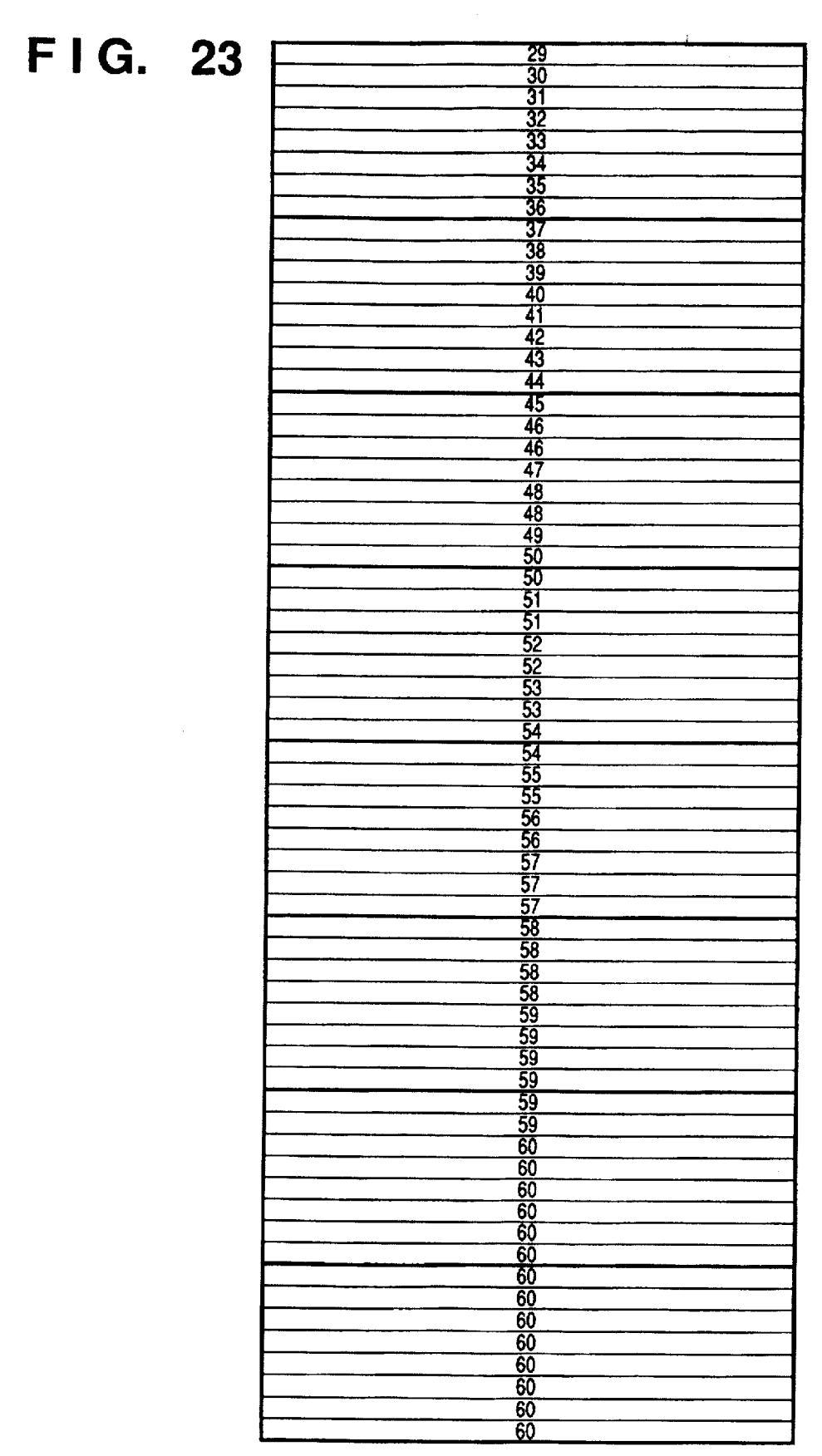
Figure 24:
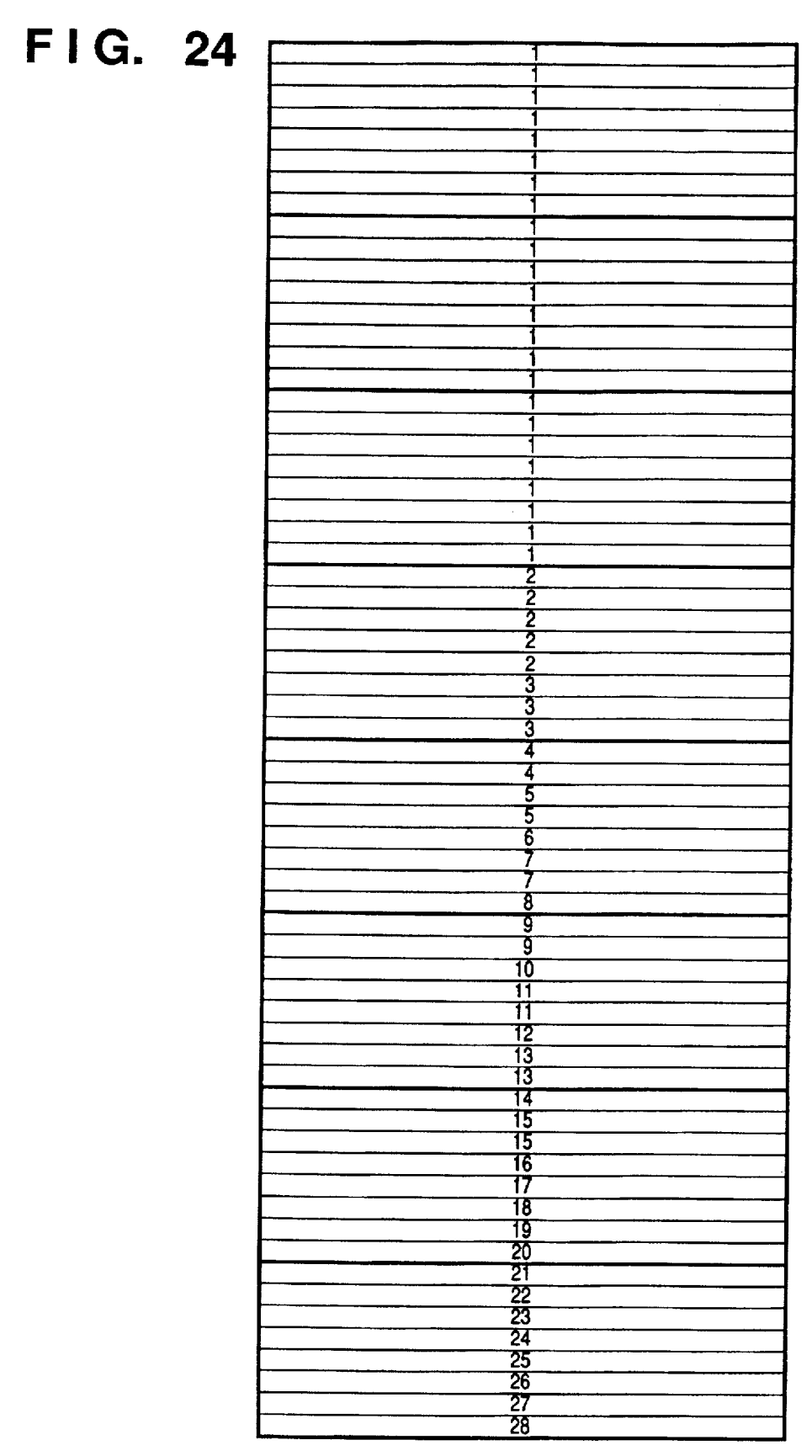
Figure 26:
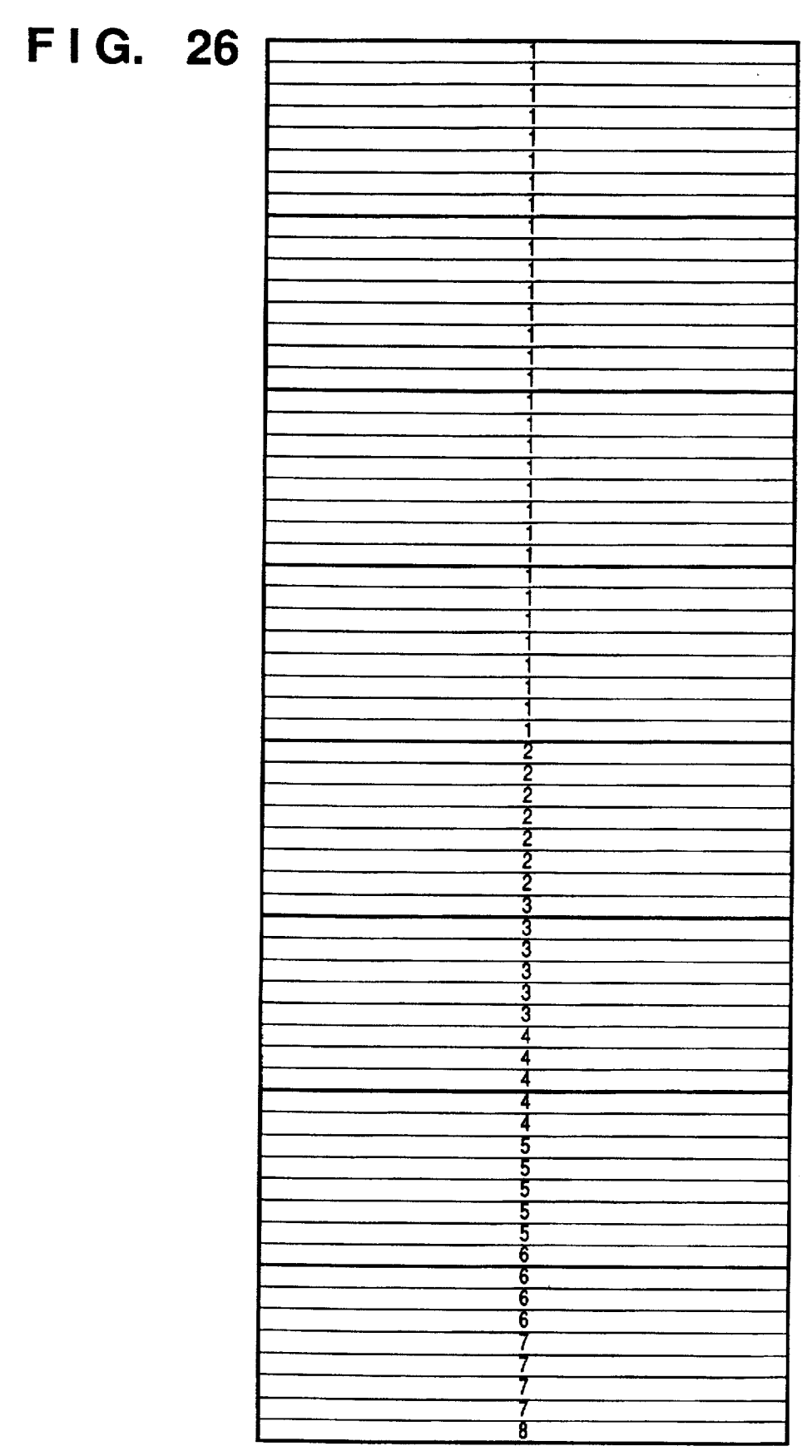
Figure 27:
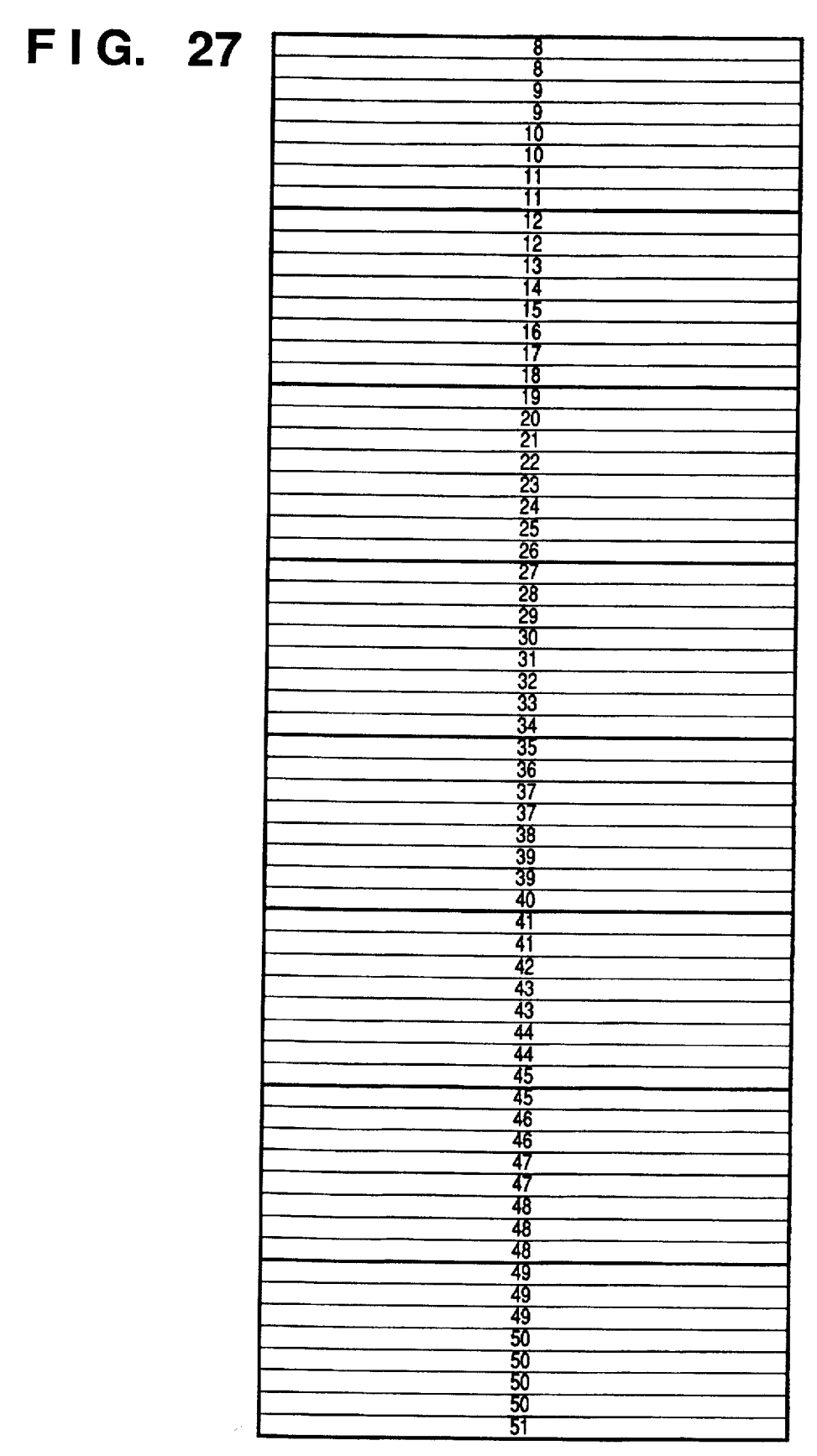
Figure 28:
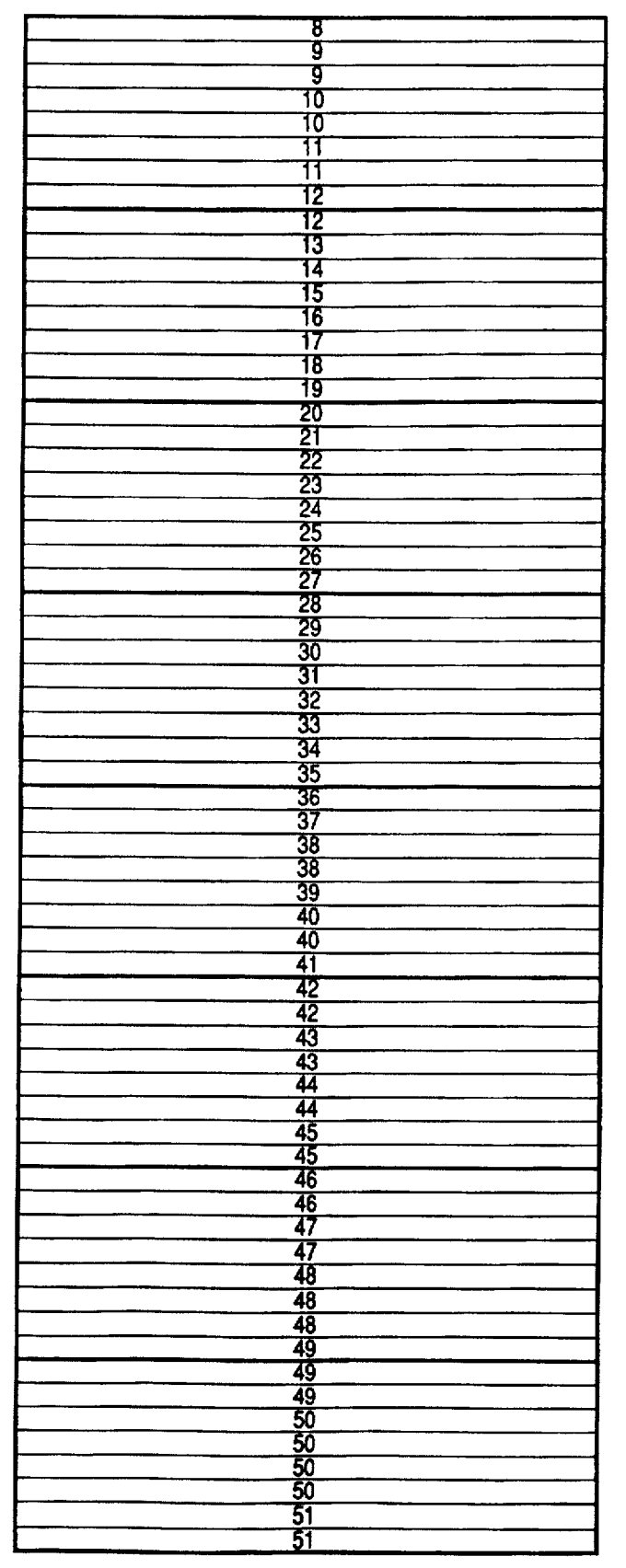
Figure 29:
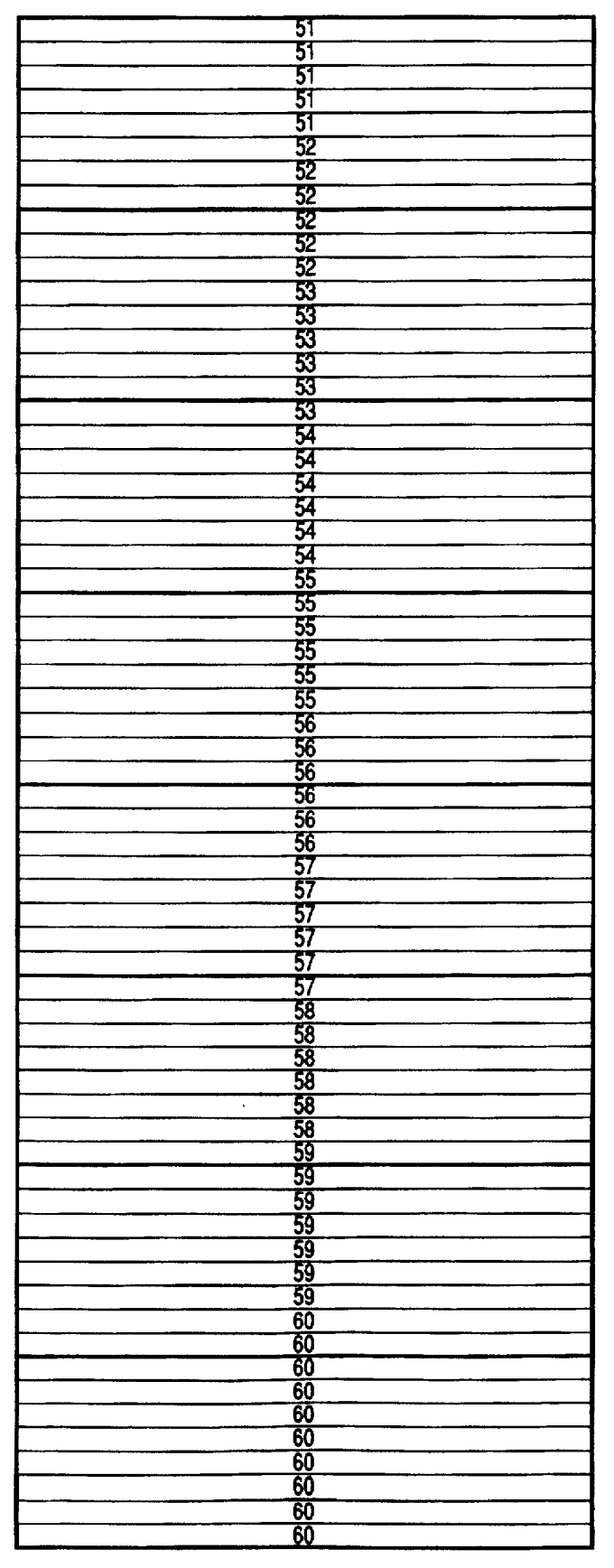

FIG. 21 is a diagram showing a growth matrix that makes reference to the six-bit image data, which results from addition, when pattern growth PWM decided by the PWM growth-direction decision unit 24 of FIG. 2 is carried out. As illustrated in FIG. 21, the growth matrix is composed of a total of four dots, in which two dots are taken in the main scanning direction and two dots in the sub-scanning direction, with one dot being 600 dpi. Furthermore, each dot is partitioned into 256 parts. FIGS. 22~25 and FIGS. 26~29 are diagrams showing the manner in which each dot illustrated in FIG. 21 is divided into 256 parts. These Figures correspond to (a)~(d) in FIG. 21. FIGS. 22~25 show a growth matrix for B-pattern PWM, and FIGS. 26~29 show a growth matrix for F-pattern PWM. For example, in a case where B-pattern PWM has been selected, a matrix that is less than six-bit image data (0~60) resulting from addition is printed in black.

Figure 30:
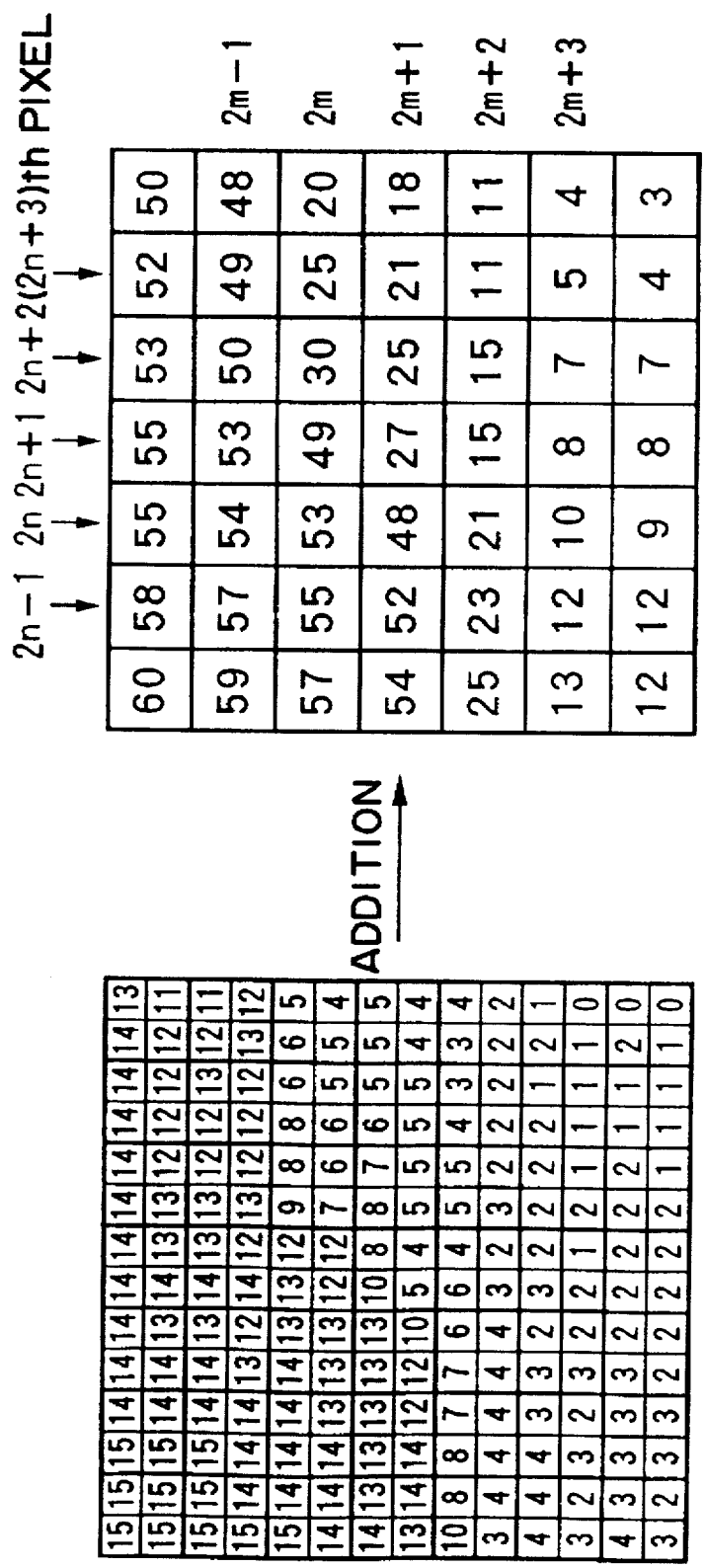
FIG. 30 is a diagram showing results of printing in the first embodiment.
Figure 31:
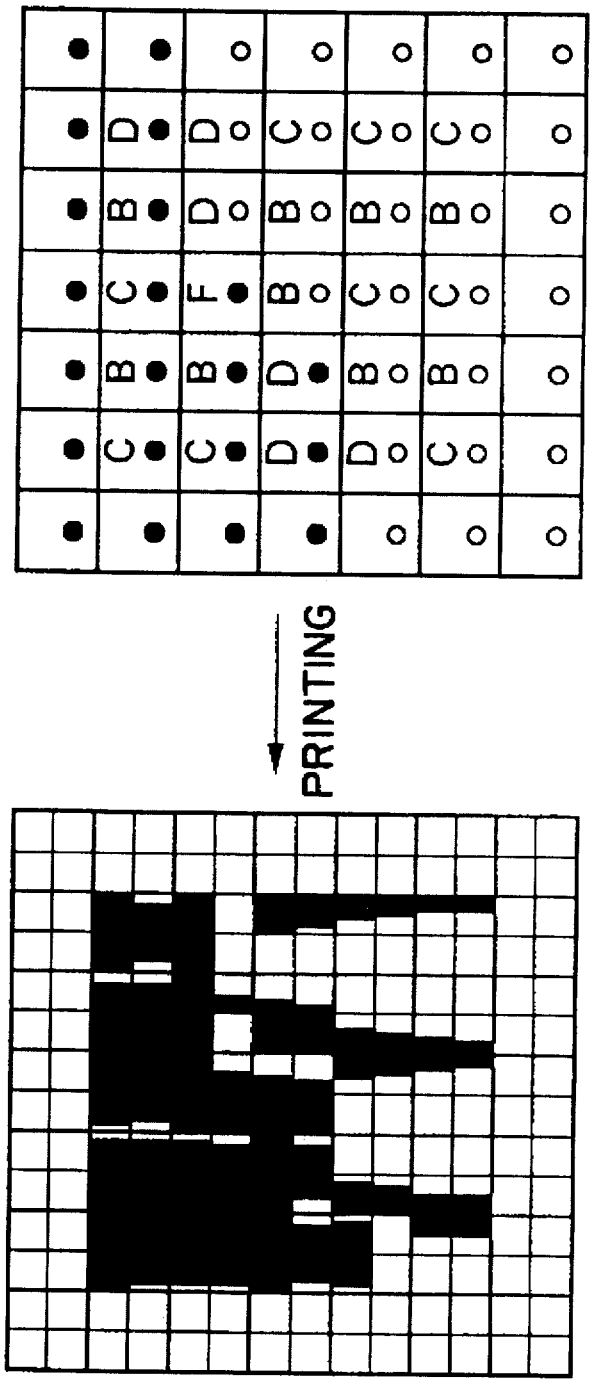
FIG. 31 is a diagram showing results of printing in the first embodiment.

FIGS. 30, 31 are diagrams showing the process through which 600 dpi four-bit multivalued image data transmitted by the printer controller is converted into 300dpi six-bit multivalued data by the addition operation, the PWM growth direction is decided and printing is carried out. As evident from these Figures, a portion in which density undergoes a sudden change causes PWM to grow from the side of higher density in units of 300 dpi. With regard to a portion in which density undergoes a gradual change, two pixels at 300 dpi are joined, PWM is performed and, as a result, PWM is caused to grow in units of 150 dpi in the main scanning direction.

Accordingly, by making the contour of a character image appear sharp and subjecting a photographic image to PWM in units of 150 dpi, it is possible to obtain a half-tone image having little density irregularity caused by irregularity in the speeds of the paper conveyance system and drive system of the photosensitive drum in the printer.

Thus, as described above, the growth direction of PWM is decided upon referring to the change in density of the peripheral pixels. In case of the contour of a character image, therefore, PWM is performed in units of 300 dpi in such a manner that coincidence with the shape of the image is attained. In the case of an image in which the change in density is gradual, as in a photographic image, right-side growth PWM and left-side growth PWM are alternately selected, whereby PWM is performed in units of 150 dpi in the main scanning direction.

As a result, it is possible to reduce density irregularity caused by irregularity in the speeds of the paper conveyance system and drive system of the photosensitive drum in the printer, and half-tone printing in which character images appear sharp can be carried out.

In the foregoing embodiment, it is described that the luminous intensity of laser irradiation is a constant density pattern. However, the present invention is effective also in a case where the luminous intensity of laser irradiation possesses a plurality of levels and these are combined to form density patterns. Further, in the foregoing embodiment, density patterns are formed by pulse-width modulation based upon gradually increasing, in the main scanning direction, the area of black subdivisions, which are continuous in the main scanning direction and sub-scanning direction, of subdivisions in which one dot is finely divided, with four dots serving as one pixel. However, this does not impose a limitation upon the invention. An arrangement may be adopted in which density patterns are formed by subjecting subdivisions to a concentrating dither method or diffusing dither method, in which a total of nine dots, namely 3 dots×3 dots in the main scanning direction and sub-scanning direction, are adopted as one pixel.

Furthermore, according to this embodiment, 300 dpi is adopted as the basic pixel. However, an image having less density irregularity can be obtained even if 150 dpi is adopted as the basic pixel and a portion having little change in density is made 75 dpi in the main scanning direction. It is also permissible to adopt 600 dpi as the basic pixel and make a portion having little change in density 300 dpi or 150 dpi in the main scanning direction and sub-scanning direction.

Further, in this embodiment, image data of 300 dpi is produced by adding multivalued image data sent from the printer controller in units of 600 dpi. However, an arrangement may be adopted in which the image data is transmitted from the printer controller in units of 300 dpi, in which case the addition processing would be deleted. Alternatively, an arrangement may be adopted in which the image data is transmitted from the printer controller in units of 600 dpi, in which case the image data would be inputted to the density-pattern generating table in units of 600 dpi without adding the image data.

[Second Embodiment]

In the first embodiment described above, the referential pixels of the PWM growth-direction decision unit 24 are 3×3=9 pixels. In the second embodiment, however, the PWM growth direction is decided with 5×5=25 pixels serving as the referential pixels, as illustrated in FIG. 32.

Figure 32:
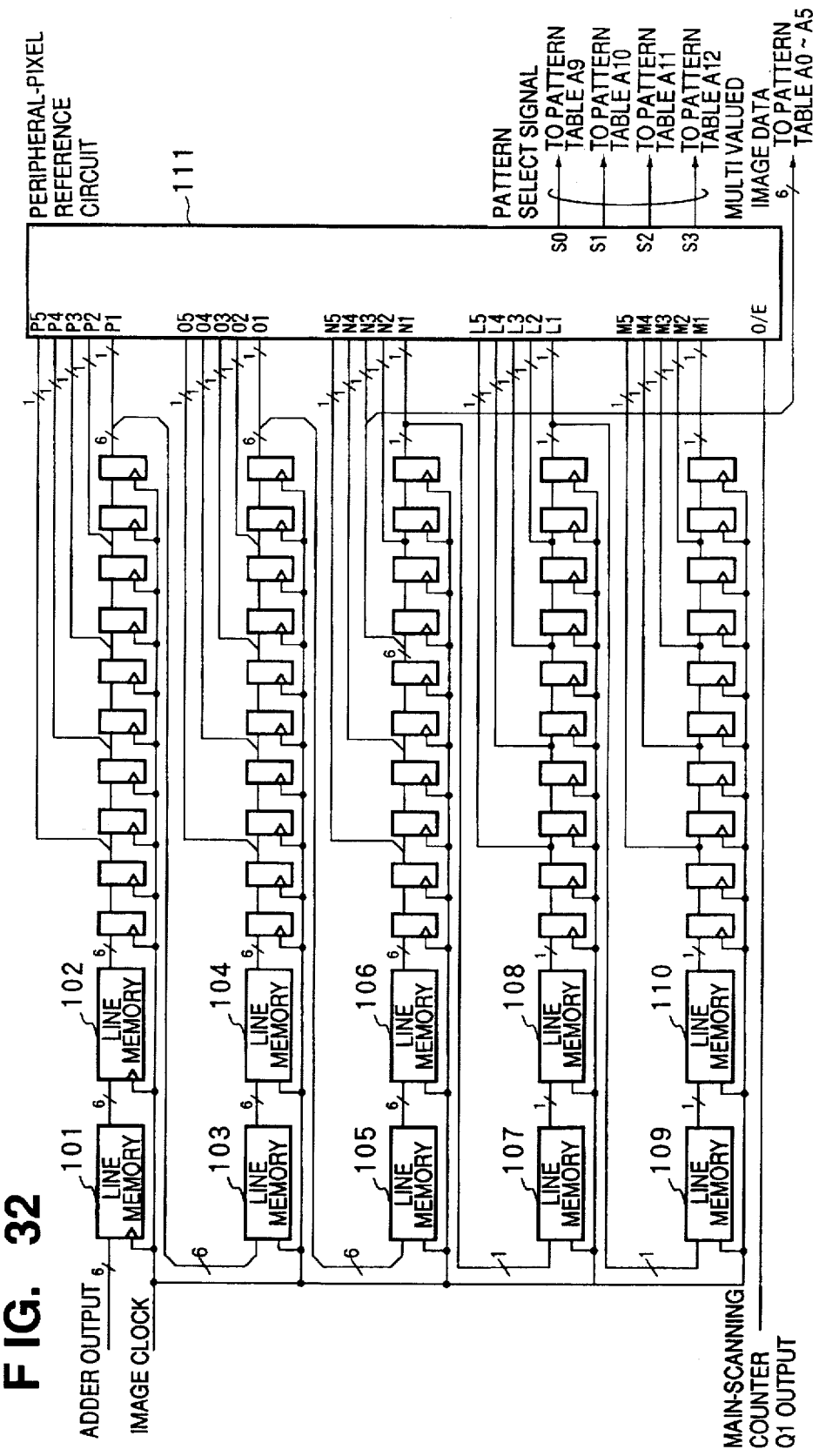
FIG. 32 is a circuit diagram illustrating the configuration of a PWM growth-direction decision unit according to a second embodiment of the invention.
Figure 33:
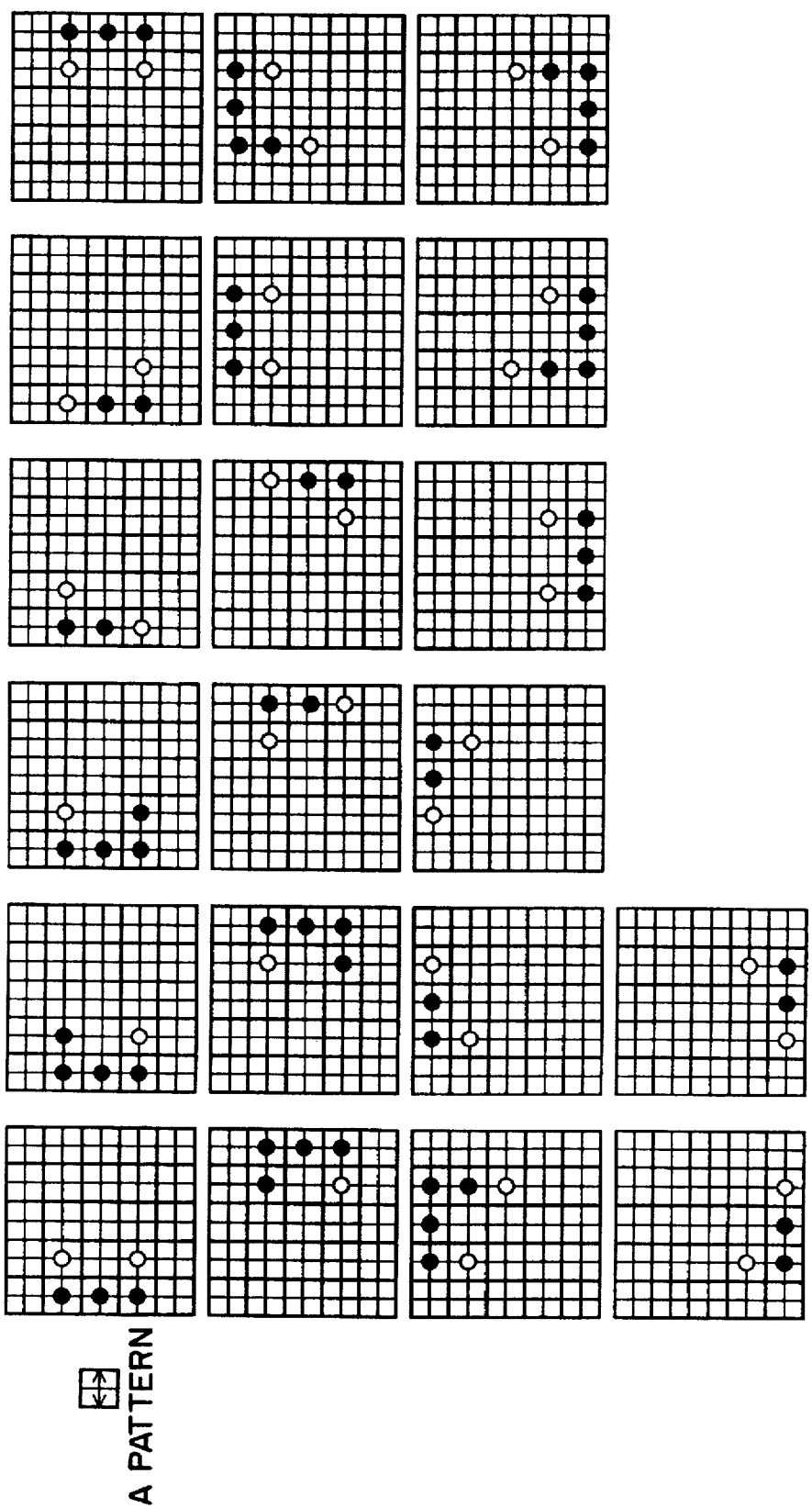
FIG. 33 is a diagram showing density patterns of peripheral pixels in the second embodiment.
Figure 34:
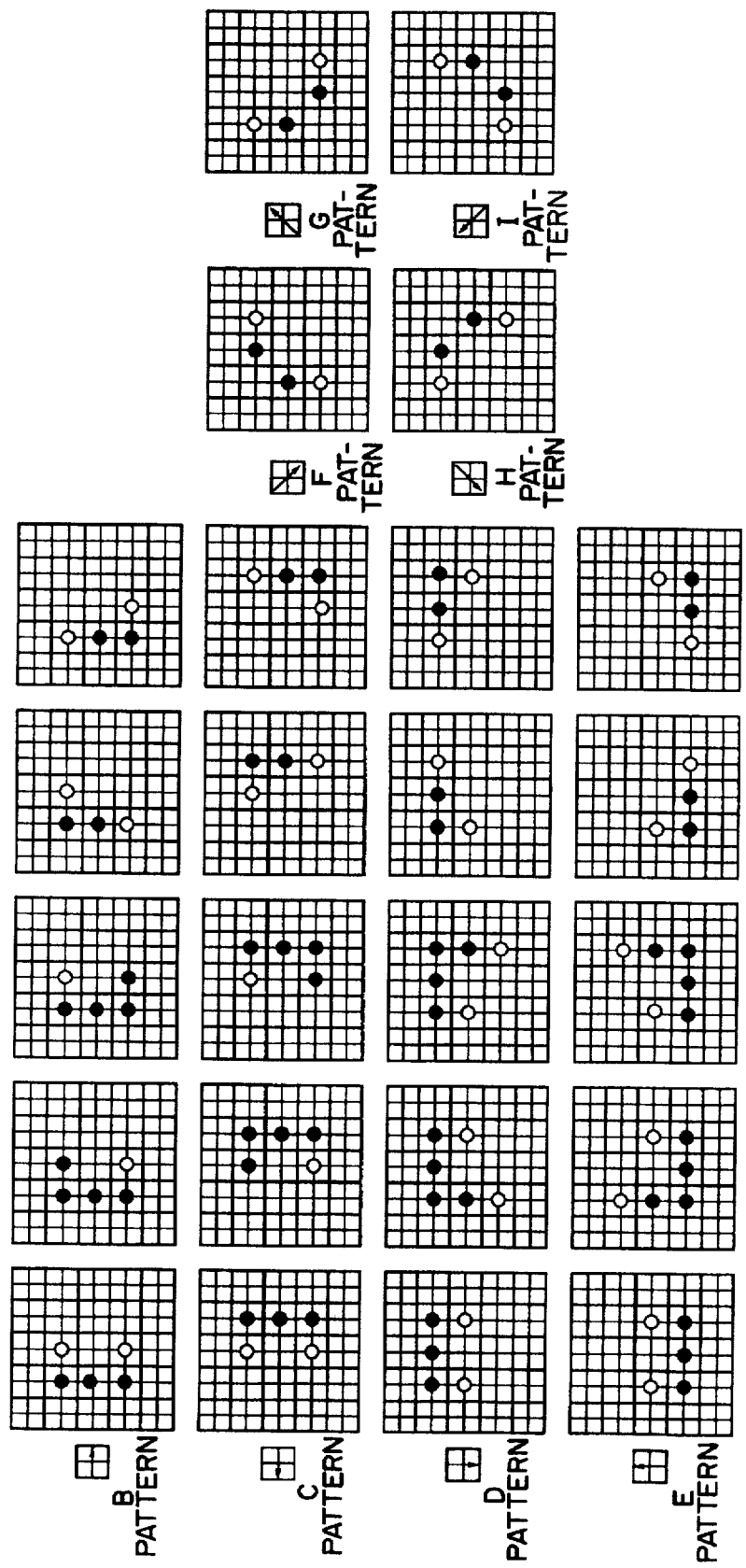
FIG. 34 is a diagram showing density patterns of peripheral pixels in the second embodiment.
Figure 35:
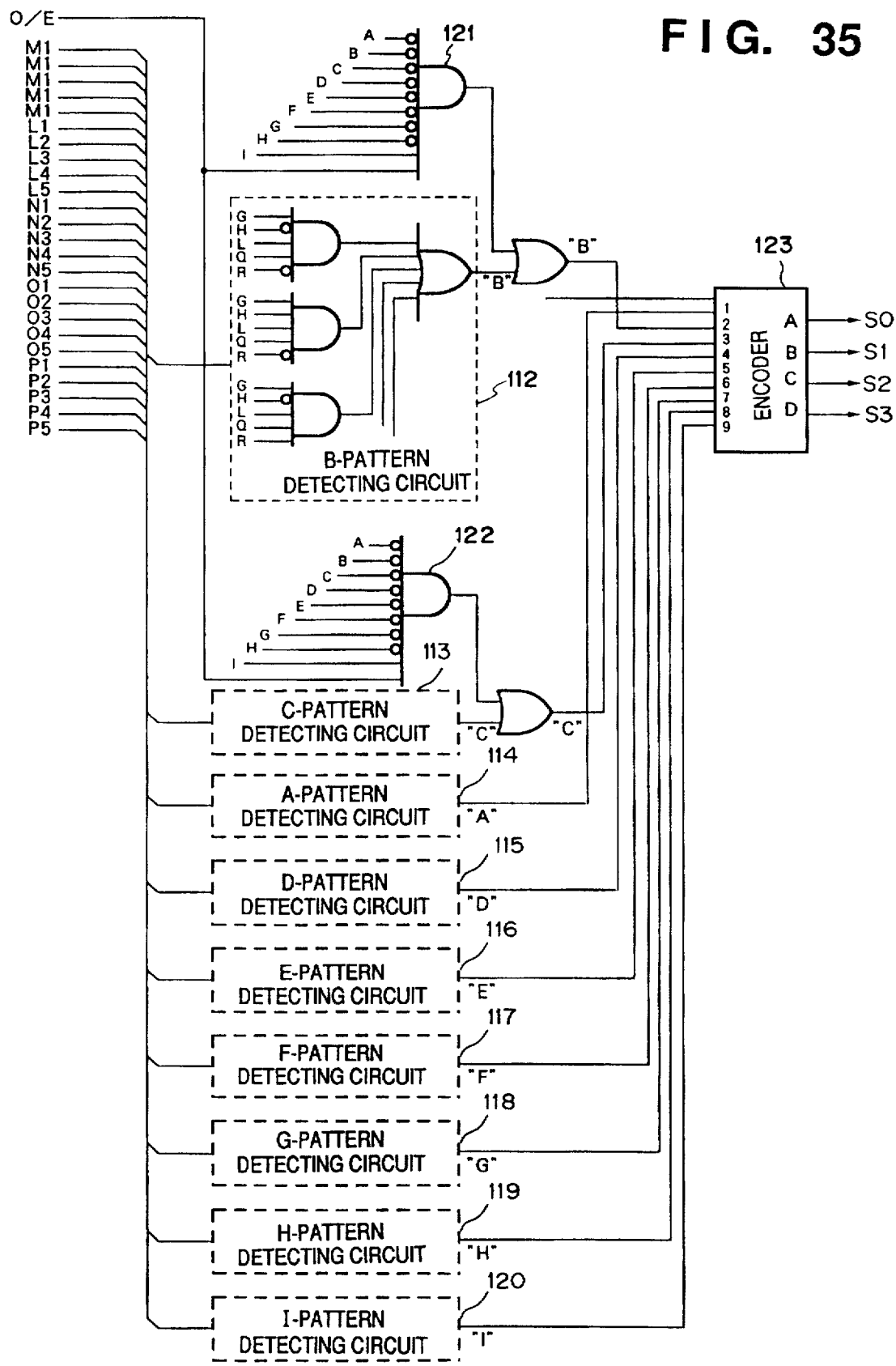
FIG. 35 is a circuit diagram showing the configuration of a peripheral-pixel reference circuit shown in FIG. 32.

In FIG. 32, one higher order bit of the multivalued image data of each of the 25 peripheral pixels and the Q1 output of the main-scanning counter are inputted to a peripheral-pixel reference circuit 111, and a predetermined pattern-select signal is outputted if this 26-bit signal agrees with the density patterns shown in FIGS. 33 and 34. Here a black circle indicates a pixel for which the higher order bit of image data is "1", a white circle indicates a pixel for which the higher order bit of image data is "0", and no mark indicates that it does not matter whether the higher order bit is "1" or "0" ("don't care"). FIG. 35 is a diagram showing an example of the peripheral-pixel reference circuit 111 for detecting the matching patterns shown in FIGS. 33 and 34. The patterns A~I are detected by pattern detecting circuits 112~120, one of the signals "A", "B", "C", "D", "E", "F", "G", "H" and "I" becomes "1", and this is coded by an encoder 123.

Figure 36:
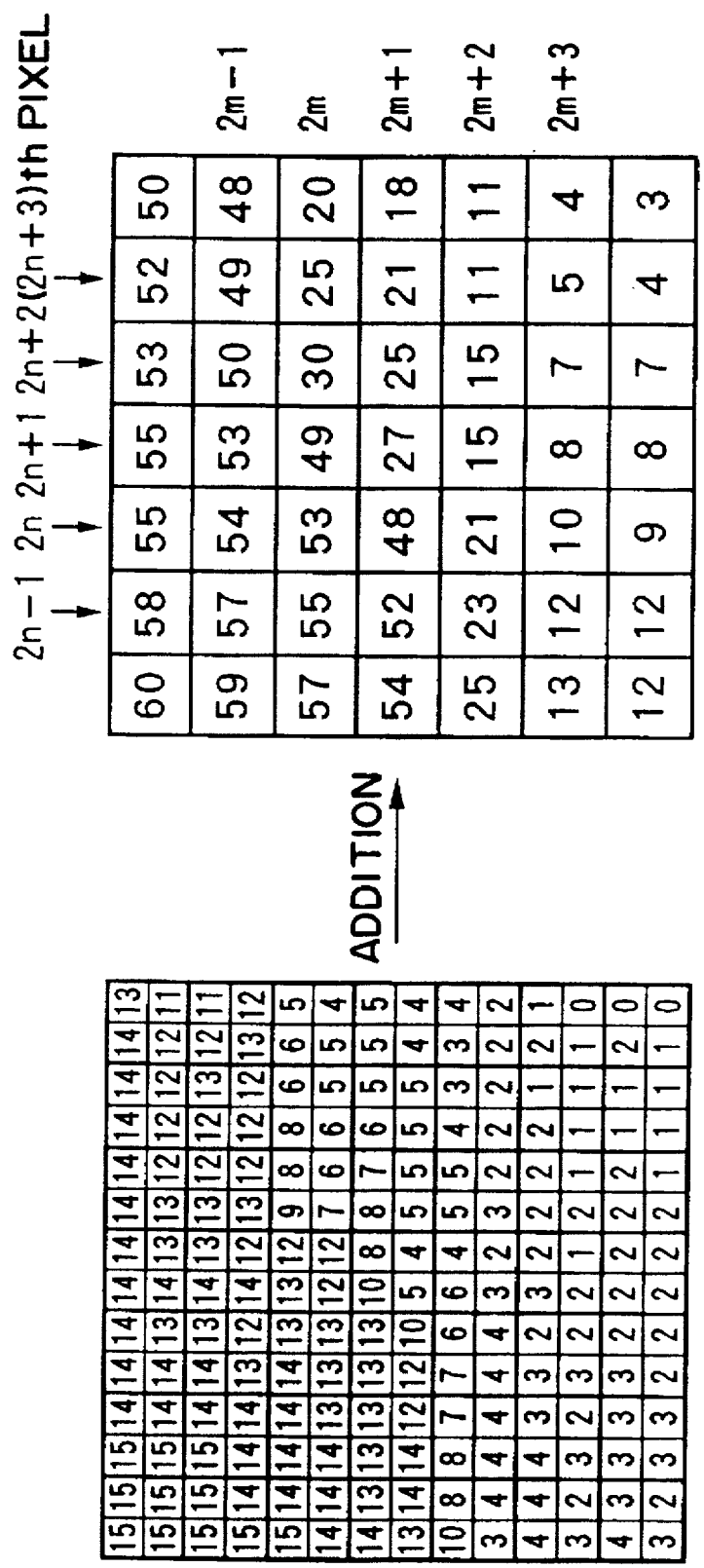
FIG. 36 is a diagram showing results of printing in the second embodiment.
Figure 37:
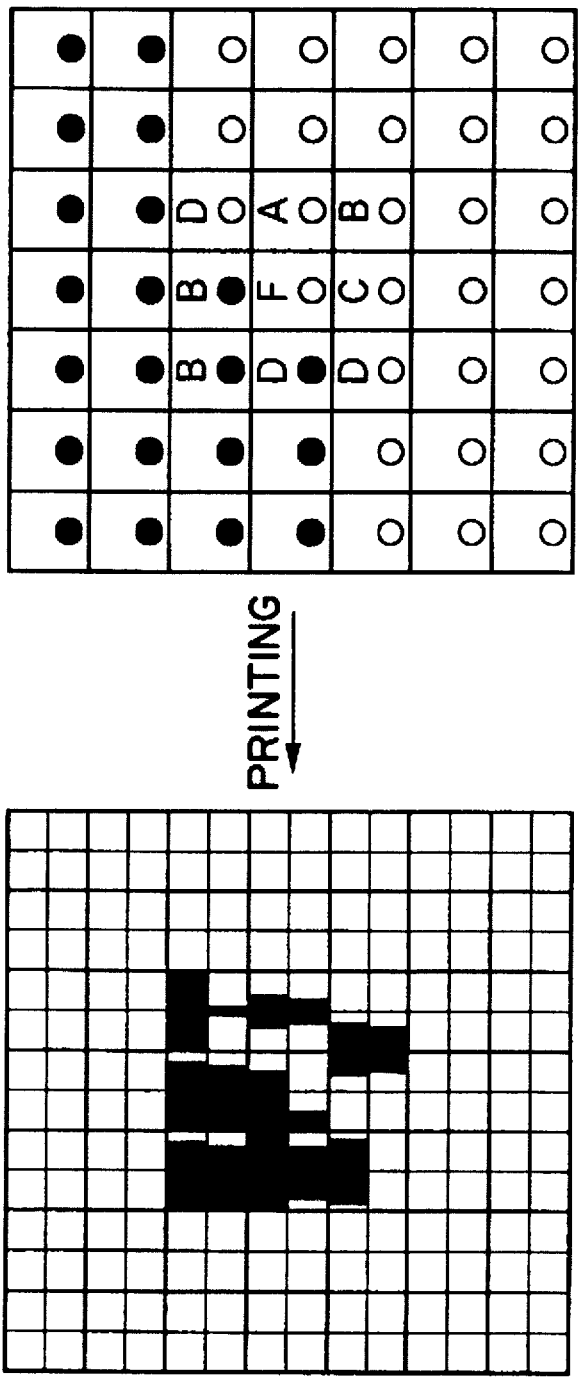
FIG. 37 is a diagram showing results of printing in the second embodiment.

FIGS. 36 and 37 are diagrams showing the process through which 600 dpi four-bit multivalued image data transmitted by the printer controller is converted into 300 dpi six-bit multivalued data by the addition operation, the PWM growth direction is decided and printing is carried out. As evident from these Figures, a portion in which density undergoes a sudden change causes PWM to grow from the side of higher density in units of 300 dpi. With regard to neighboring portions, these are made pixels independent from the peripheral pixels using both-side growth PWM. With regard to portions where the change in density is gradual, two pixels at 300 dpi are joined, PWM is performed and, as a result, PWM is caused to grow in units of 150 dpi in the main scanning direction.

[Third Embodiment]

Figure 38:
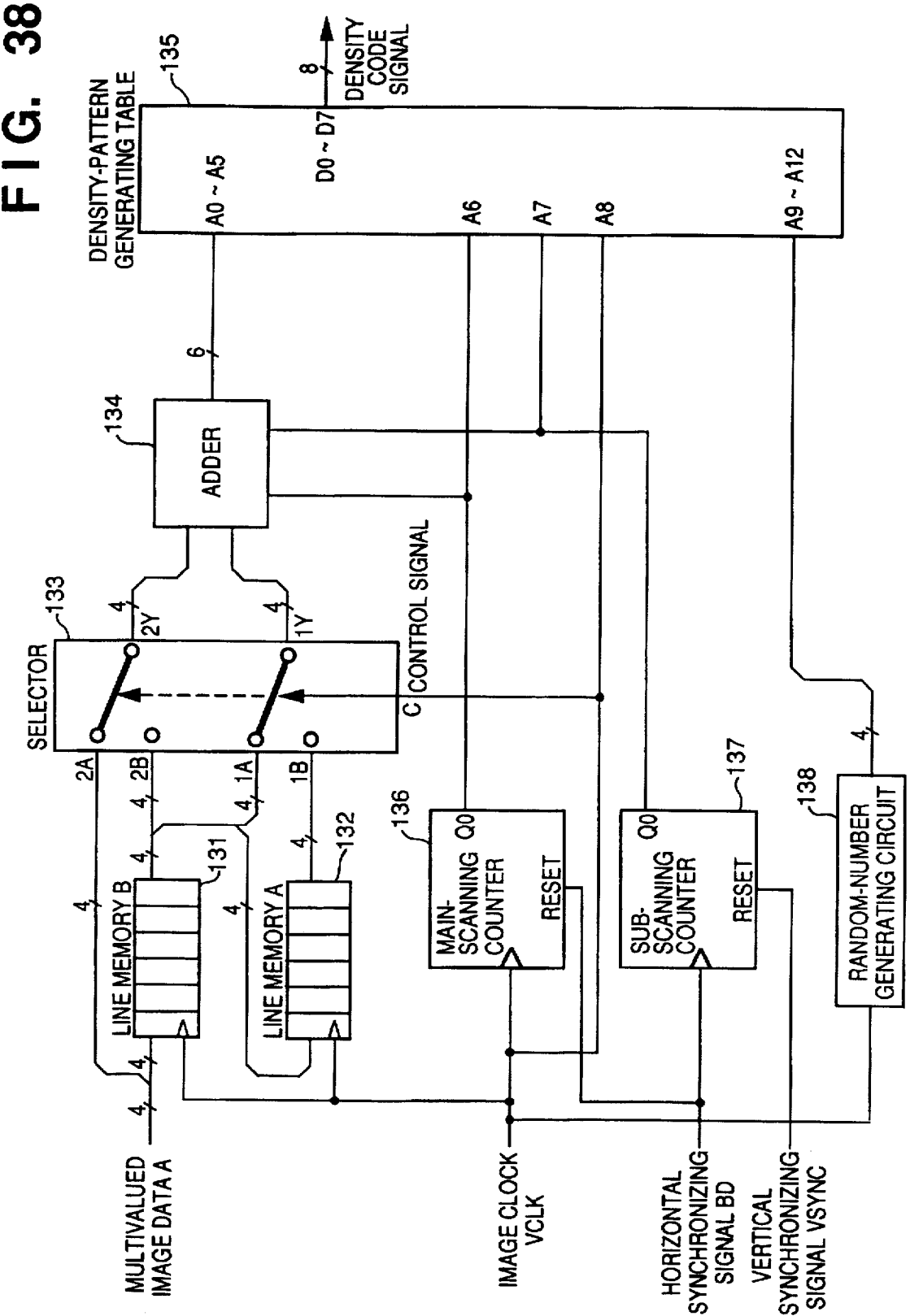
FIG. 38 is a block diagram showing the configuration of a data generator in a third embodiment of the invention.

FIG. 38 is a block diagram showing the configuration of a data generator according to a third embodiment of the invention. In the foregoing embodiments, the direction of PWM growth of a pixel of interest is decided upon referring to the features of the change in density of peripheral pixels. In the third embodiment, however, direction of growth is decided randomly, thereby reducing an irregularity in printing density owing to an irregularity in the speed of the paper conveyance system.

The arrangement of FIG. 38 includes line memories 131, 132, a selector 133, an adder 134, a density-pattern generating table 135 and counters 136, 137. This arrangement is similar to that of the first embodiment. Numeral 138 denotes a random-number generating circuit. This circuit generates a four-bit random signal in synchronization with the image clock VCLK. More specifically, in the third embodiment, the growth direction of PWM is changed randomly by this random signal. As a result, rather than density patterns being formed continuously in the sub-scanning direction that is peculiar to the PWM method, the density patterns become intermittent in random fashion. The effect is a reduction in density irregularity caused by an irregularity in the speed of the paper conveyance system.

[Fourth Embodiment]

Figure 39:
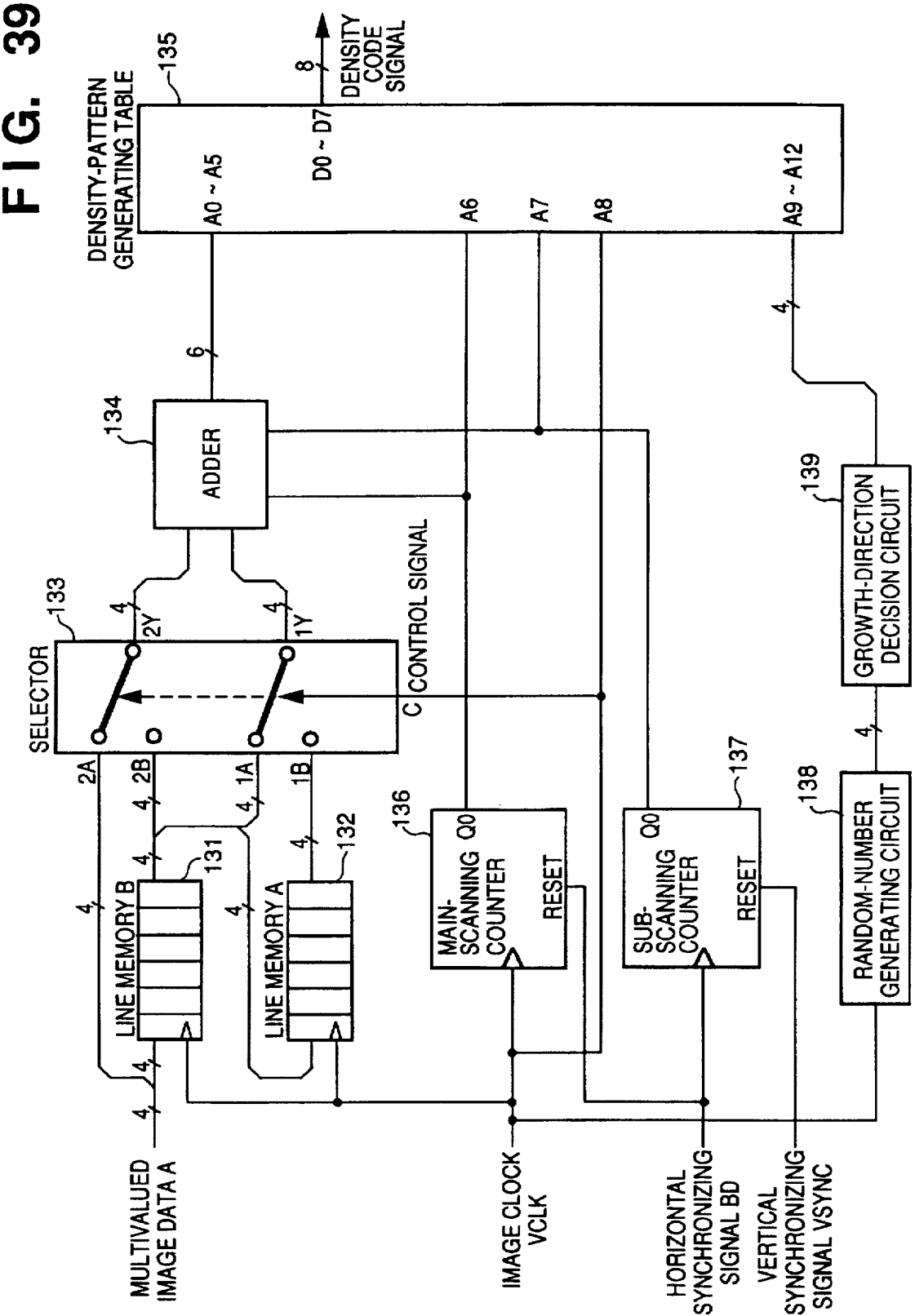
FIG. 39 is a block diagram showing the configuration of a data generator in a fourth embodiment of the invention.

FIG. 39 is a block diagram showing the configuration of a data generator according to a fourth embodiment of the invention. In this embodiment, the arrangement of the third embodiment is further provided with a growth-direction deciding circuit 139 which, upon referring to the growth direction of the peripheral pixels, decides the PWM growth-direction select signal from the random-number generating circuit 138.

Figures 41A, 41B:
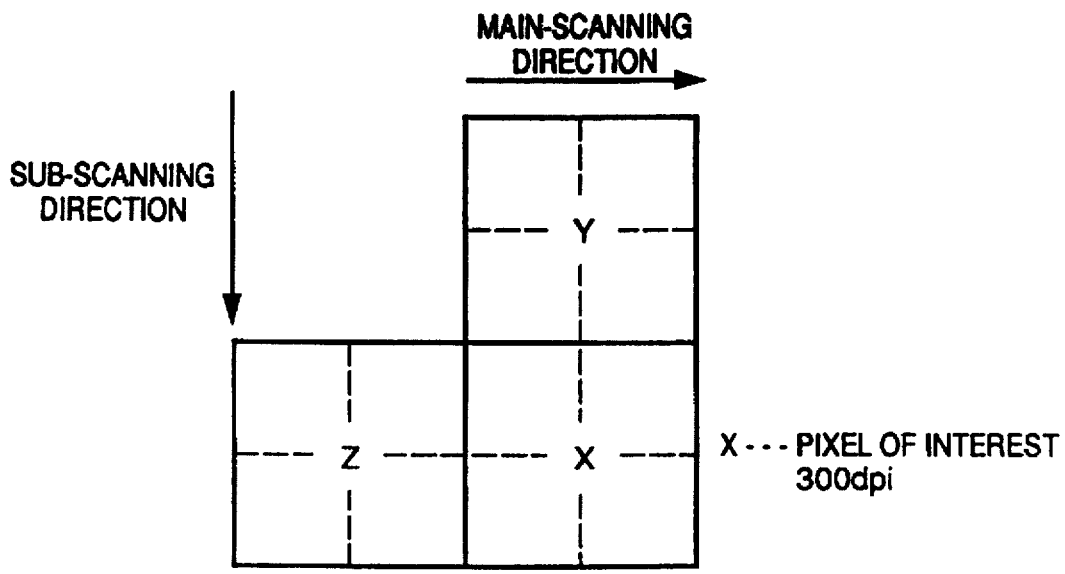
FIG. 41 is a diagram for describing the operation of a coincidence circuit shown in FIG. 40.

FIG. 40 is a diagram showing an example of the growth-direction deciding circuit 139. In FIG. 40, the output signal from the random-number generating circuit 138 is a growth-direction select signal (X3~X0) of the pixel of interest. The output of a latch 142 via a latch 141 is a growth-direction select signal (Z3~Z0) of the neighboring pixel to the left of the pixel of interest, and the output of a latch 144 via a line memory 140 and latch 143 is a growth-direction select signal (Y3~Y0) of the neighboring pixel to the right of the pixel of interest. In a case where X3~X0, Z3~Z0 and Y3~Y0 coincide with the table of (b) in FIG. 41 owing to a coincidence circuit 145, the output of the random-number generating circuit 138 is changed to a signal (0000B), which designates A-pattern growth (both-side growth) by the selector 146 (see FIG. 41).

Thus, in accordance with the fourth embodiment, it is possible to eliminate an irregular mottled pattern composed of a cluster of dots that occurs in the third embodiment in a case where left-side growth (C pattern) and right-side growth (B pattern) are side by side.

[Fifth Embodiment]

FIG. 42 is a block diagram showing the configuration of a data generator according to a fifth embodiment of the invention. In the fifth embodiment, four lines of a four-bit growth-direction select signal generated by the random-number generating circuit 138 are stored in a four-line memory from a PWM growth-direction decision unit 147 before printing is carried out. At the time of the printing operation, the growth direction of PWM is decided by a growth-direction select signal successively outputted by the line memory.

FIG. 43 is a diagram showing an example of the circuitry of the PWM growth-direction deciding unit 147. In this circuit, the arrangement is such that four lines of the random number are stored in a four-line memory 149 by a selector 148 within a time period in which a vertical synchronizing signal VSYNC, which is signal that gives notice of the printing operation, is effective. Though four lines are used in this embodiment, it is of course possible to use a number of lines other than four. For example, one line, three lines, eight lines, . . . , may be stored. In addition, several dots can be taken in the main scanning direction without using one line, and these dots may be used repeatedly.

Furthermore, the information for deciding direction of growth may be stored in a ROM or the like in advance without relying upon the random-number generating circuit 138, and this ROM may be accessed.

[Sixth Embodiment]

Figure 44:
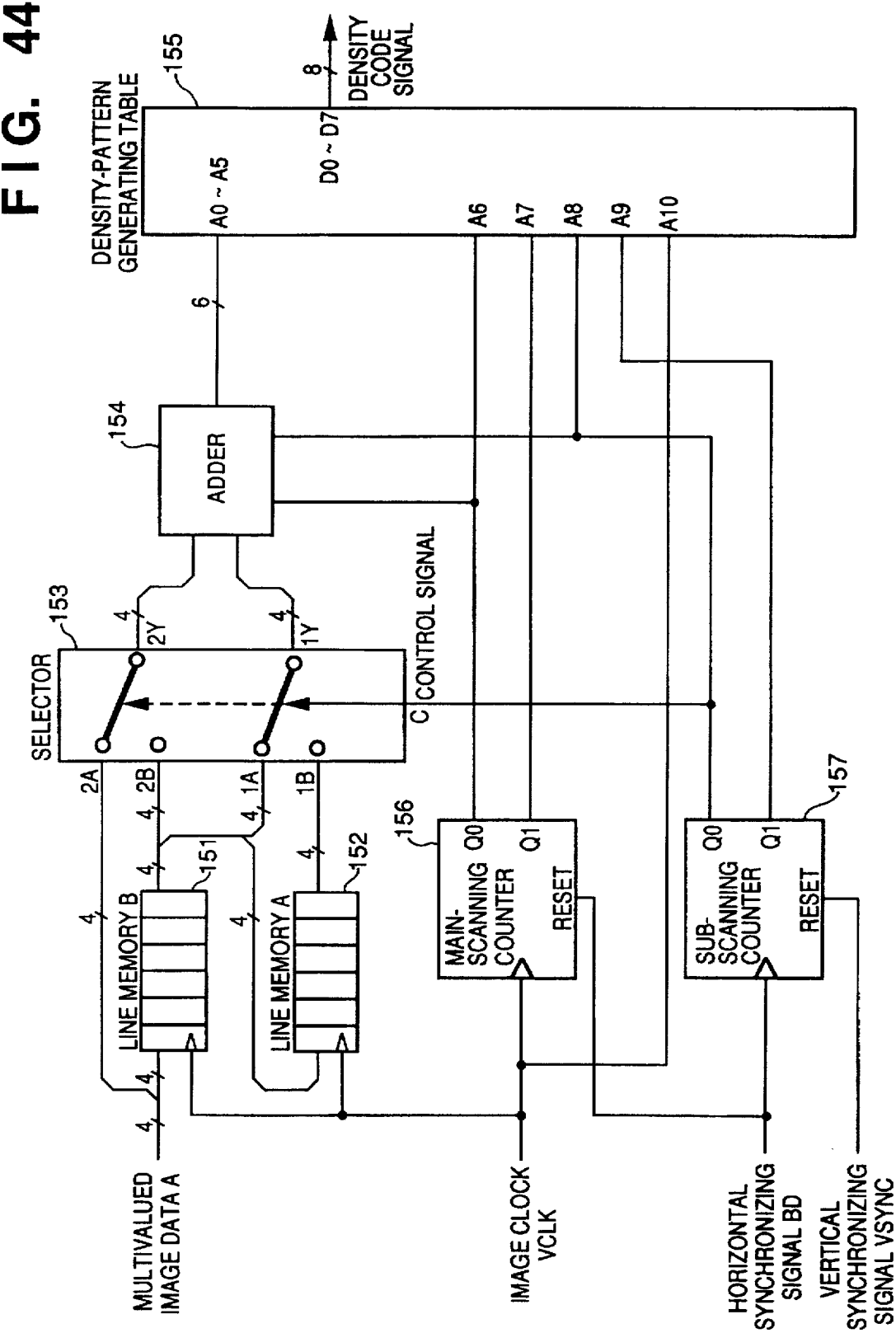
FIG. 44 is a block diagram illustrating the configuration of a data generator in a sixth embodiment of the invention.

FIG. 44 is a block diagram showing the configuration of a data generator according to a sixth embodiment of the invention.

Figure 45:
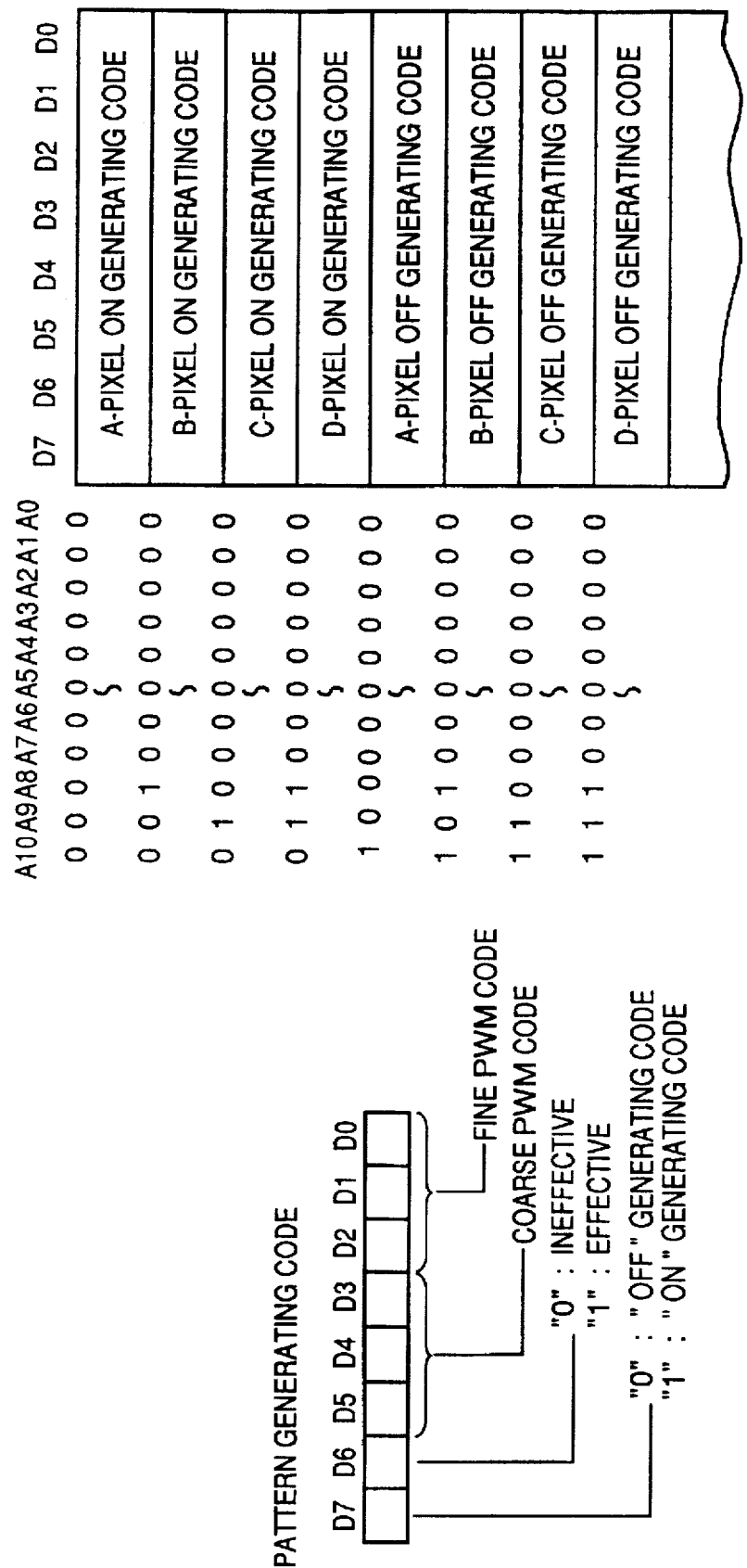
FIG. 45 is a diagram showing a look-up table in the sixth embodiment.

The arrangement of FIG. 44 includes line memories 151, 152, a selector 153, an adder 154, a density-pattern generating table 155 and counters 156, 157. This arrangement is similar to that of the first embodiment. The inputs to the density-pattern generating table 155 are six-bit multivalued image data outputted by the adder 154, a two-bit output signal from the main-scanning counter 156, a two-bit output signal from the sub-scanning counter 157, and the image clock, for a total of 11 bits, and a density code signal is outputted by a look-up table (composed or a ROM or the like) having an address map shown in FIG. 45. It should be noted that the density code outputted by the density-pattern generating table 155 is assumed to be a code that takes into consideration a correction of the γ characteristics of the printer.

Figure 46:
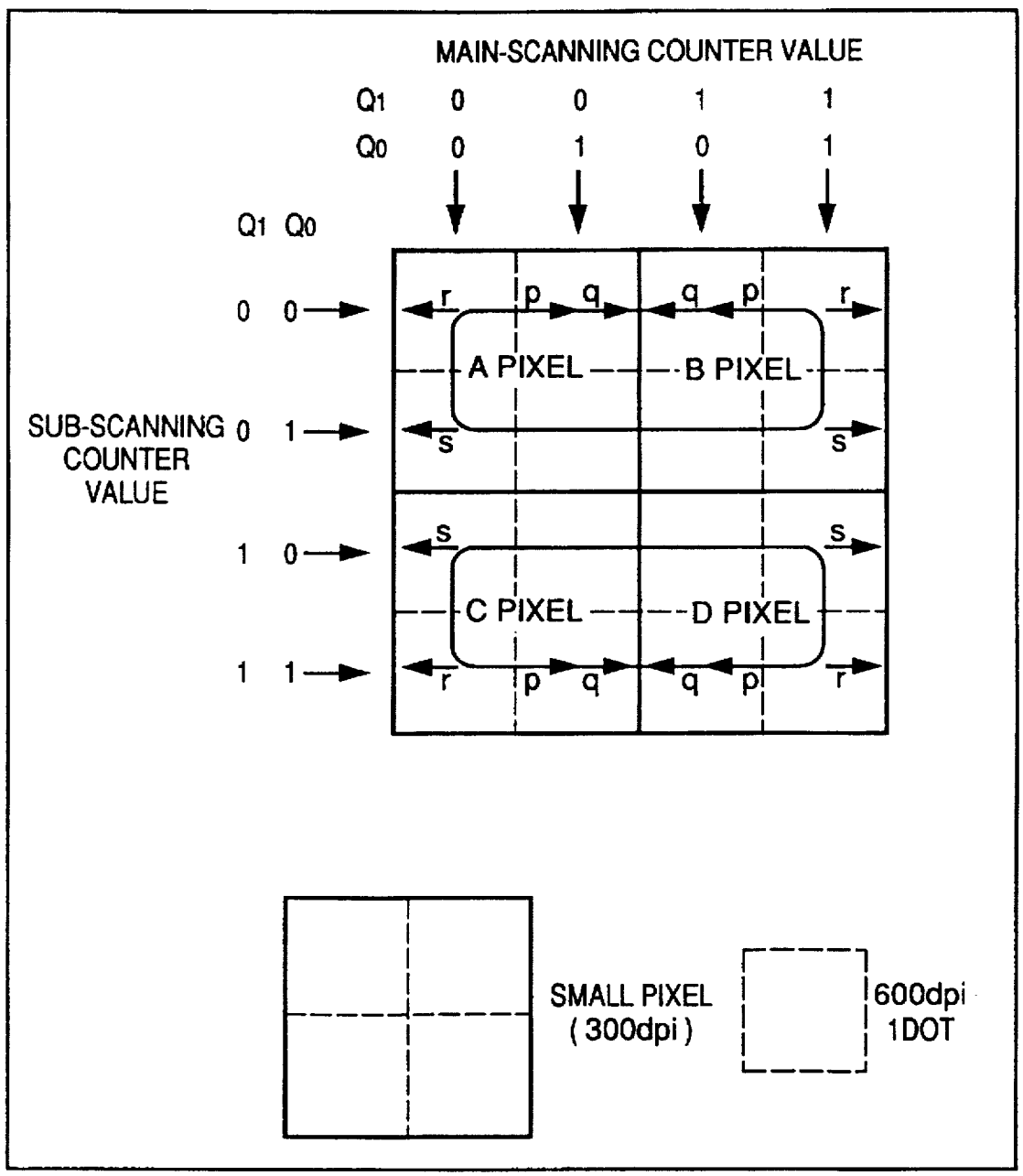
FIG. 46 is a diagram for describing pixels and the growth direction of a density pattern.

FIG. 46 is a diagram for describing pixels and the growth direction of a density pattern. As shown in FIG. 46, a small pixel that is the minimum unit expressing density is taken as being a total of four dots, namely two dots in the main scanning direction and two dots in the sub-scanning direction, in which one dot is taken as 600 dpi. In a large pixel, which is composed of a total of four small pixels, namely two pixels in the main scanning direction and two pixels in the sub-scanning direction, the density pattern of each small pixel (A pixel, B pixel, C pixel, D pixel) is made to grow in such a manner that the density patterns of each of the small pixels become connected. For each of the small pixels, first a black area is caused to grow in the direction of arrow p, then black areas are caused to grow simultaneously in the directions of arrows q, r and s, respectively.

FIGS. 47 through 50 are diagrams showing examples of matrices (threshold values) of growth ranking of D pixels in a case where density patterns are formed by subdividing a small pixel (4 dots at 600 dpi) into 256 parts. In these Figures, subdivisions of threshold values less than four are printed in black with regard to multivalued image data 4(04[H]), by way of example. In other words, 37 of 256 subdivisions are filled in black.

As a result, a dot at 300 dpi based upon central growth as the PWM growth direction and a dot at 150 dpi based upon right-side growth as the PWM growth direction can be alternately repeated in the main scanning direction.

Figure 51:
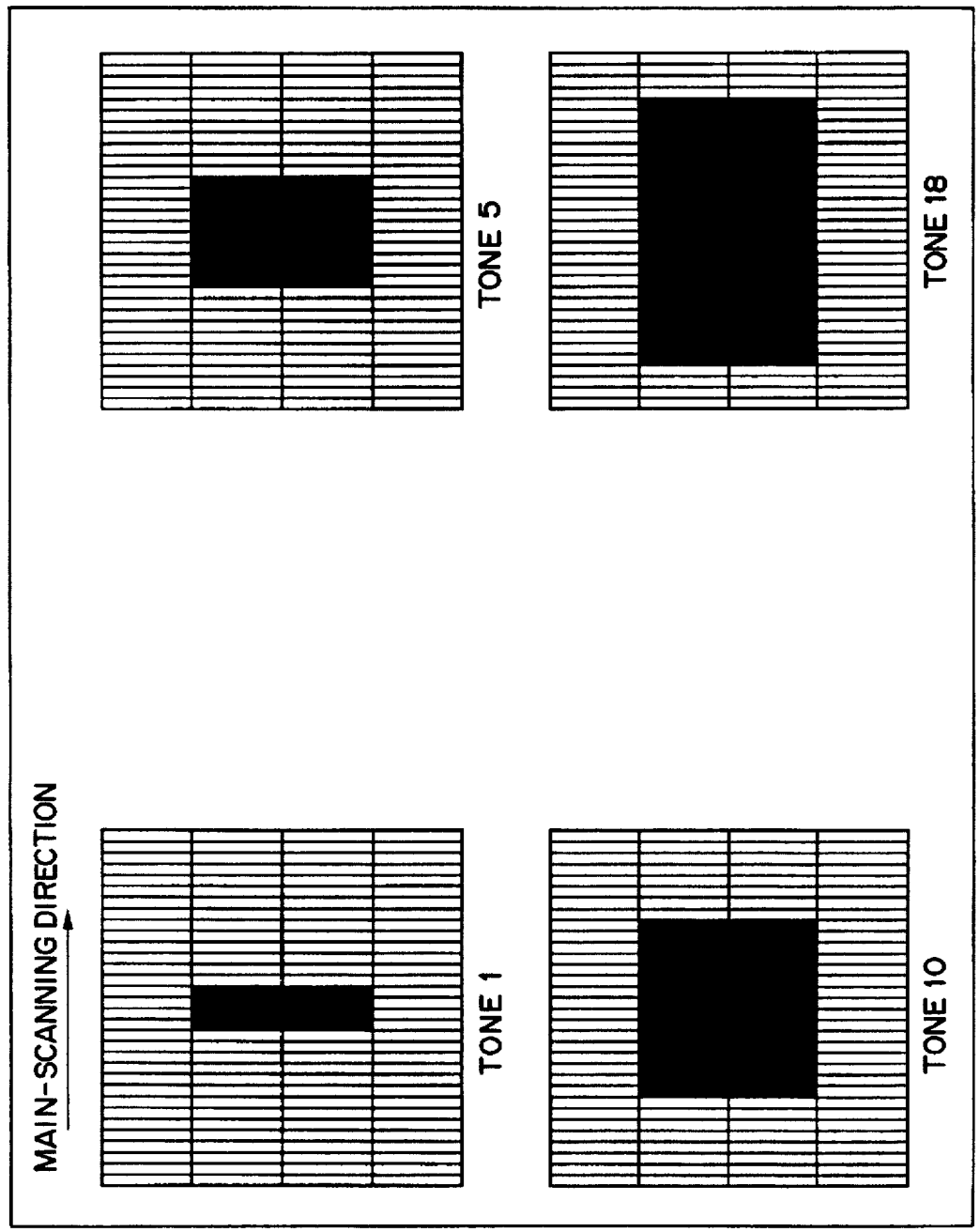
FIG. 51 is a diagram showing the number of tones of multivalued image data as well as density patterns of large pixels.
Figure 52:
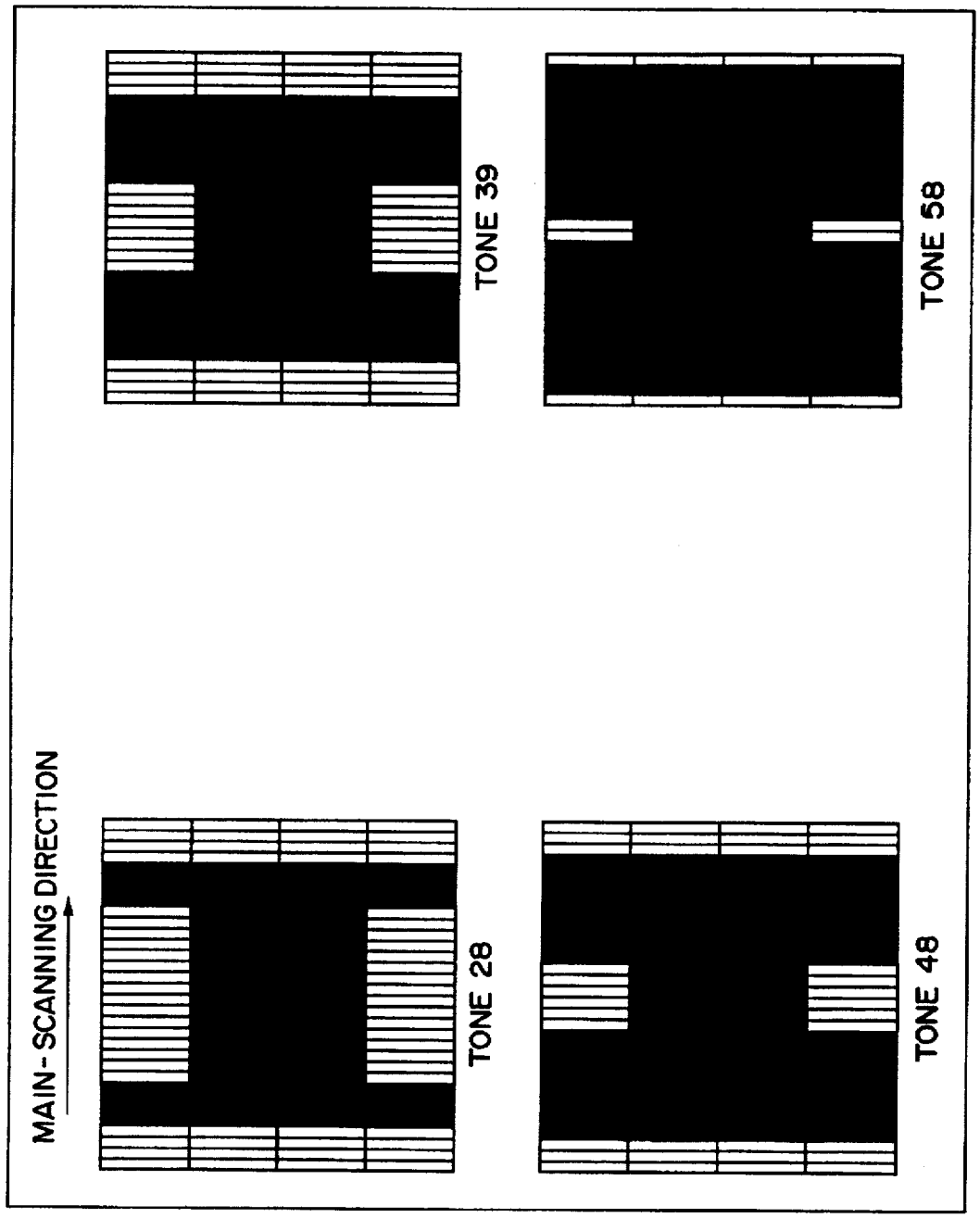
FIG. 52 is a diagram showing the number of tones of multivalued image data as well as density patterns of large pixels.

FIGS. 51 and 52 are diagrams showing the number of tones of multivalued image data as well as density patterns of large pixels. These density patterns are illustrated as large pixels in units of 150 dpi in which four small pixels of A, B, C, D at 300 dpi are gathered together. At low density (tones 1~18), the density pattern is caused to grow from the center of the large pixel, and the interval is made ½ dot in the main scanning direction and one dot in the sub-scanning direction in such a manner that the density pattern will not contact the neighboring large pixel. At medium density (tones 19~39), each small pixel is provided with a growth direction, and the density pattern of each small pixel is caused to grow in such a manner that small pixels within a large pixel are spaced apart by one dot in the main scanning direction while neighboring large pixels are spaced apart by ½ dot in the main scanning direction. At high density (tones 40~60), density patterns are caused to grow with the center placed upon each small pixel.

Figure 53:
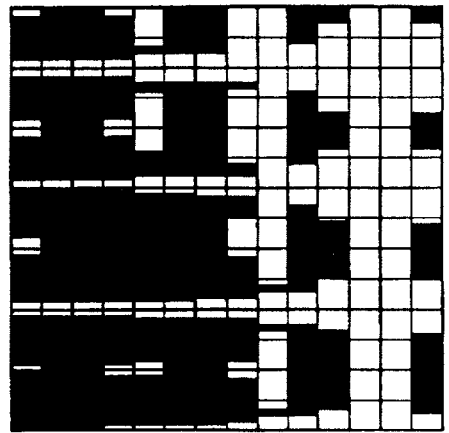
FIG. 53 is a diagram showing results of printing according to the sixth embodiment.

FIG. 53 is a diagram showing the process through which 600 dpi four-bit multivalued image data transmitted by the printer is converted into 300 dpi six-bit multivalued data by an addition operation and printing is carried out. Thus, at low density and medium density, a density pattern is formed in large-pixel units (150 dpi). At high density, a density pattern is formed in small-pixel units (300 dpi). This makes possible printing unaffected by an irregularity in printing density caused by a speed irregularity in the paper conveyance system and drive system of the photosensitive drum in the printer.

[Seventh Embodiment]

Figure 54:
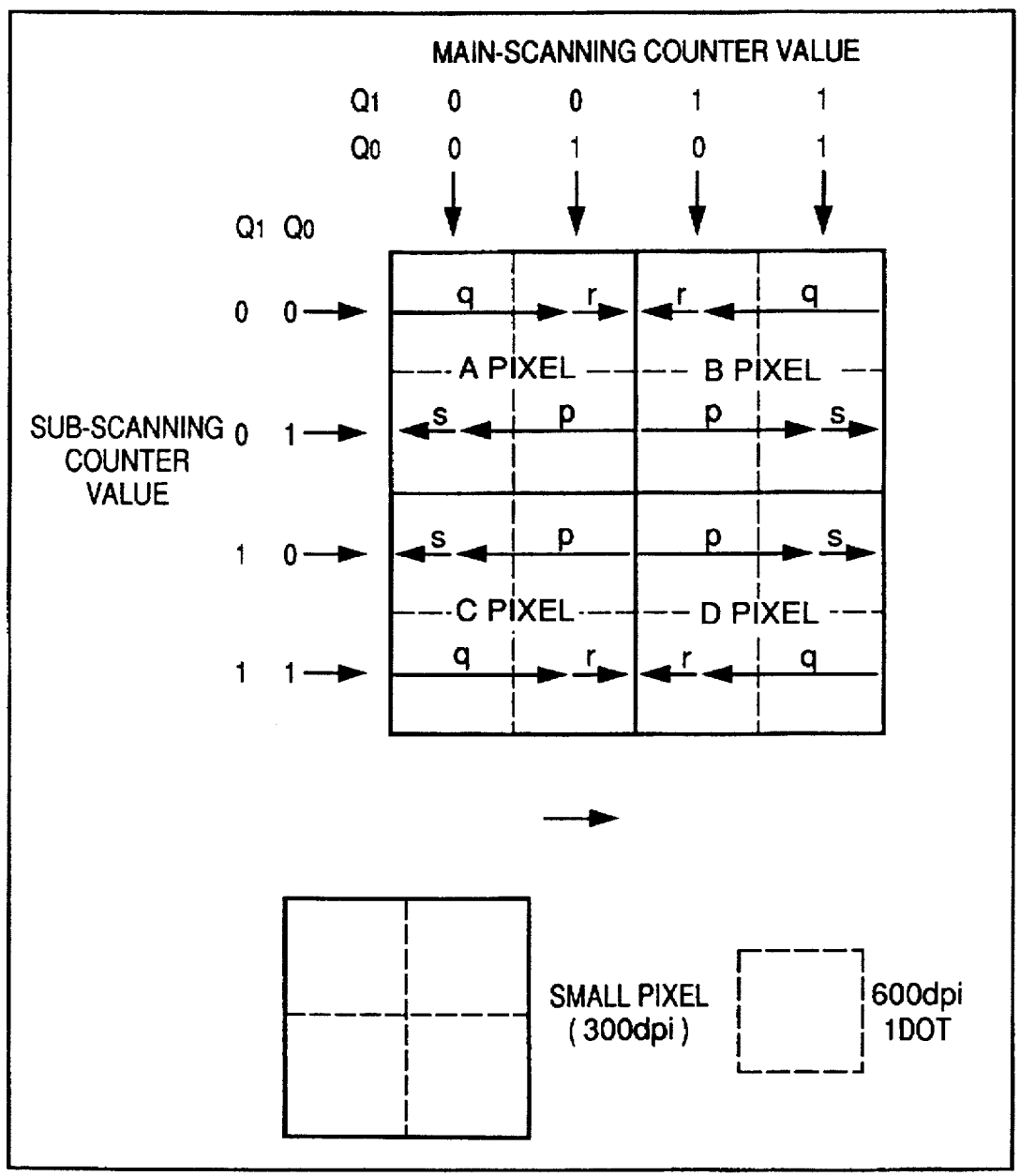
FIG. 54 is a diagram for describing pixels and the growth direction of a density pattern in a seventh embodiment of the invention.

FIG. 54 is a diagram illustrating pixels and the growth direction of a density pattern in a seventh embodiment. This is similar to the sixth embodiment with the exception of the growth direction of the density pattern.

First a black area is caused to grow in the direction of arrow q with regard to each of the small pixels (A pixel, B pixel, C pixel, D pixel), after which growth is caused in the direction of arrow r. Black areas are caused to grow similarly in the directions of the arrows p and s.

Figure 55:
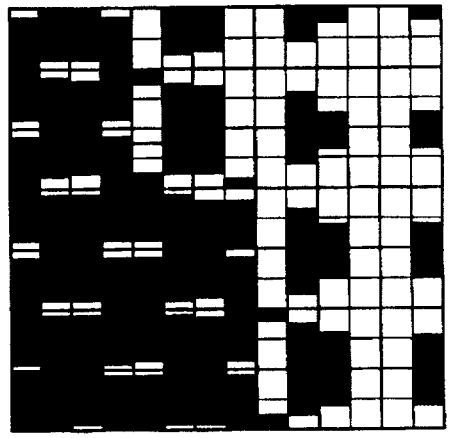
FIG. 55 is a diagram showing results of printing according to the seventh embodiment.

FIG. 55 is a diagram showing multivalued image data and results of printing. As is evident from the Figure, a density pattern is caused to grow in units of large pixels in case of low density. At high density, a growth direction is provided for each small pixel, a density pattern is caused to grow in units of small pixels, four dots are connected in the main scanning direction and two dots are connected in the sub-scanning direction.

[Modification]

Figure 56:
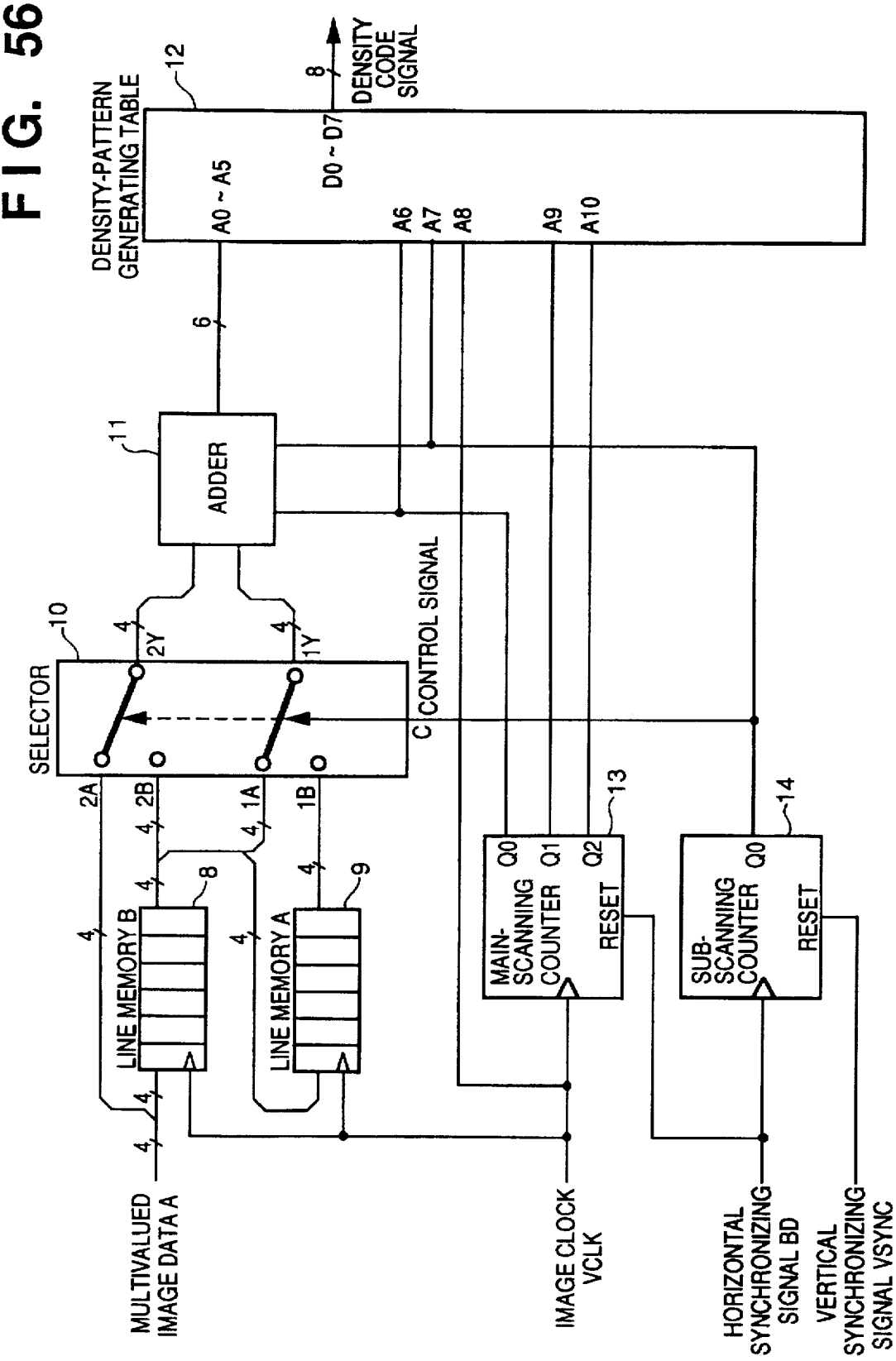
FIG. 56 is a block diagram illustrating the configuration of a data generator in a modification.
Figure 57:
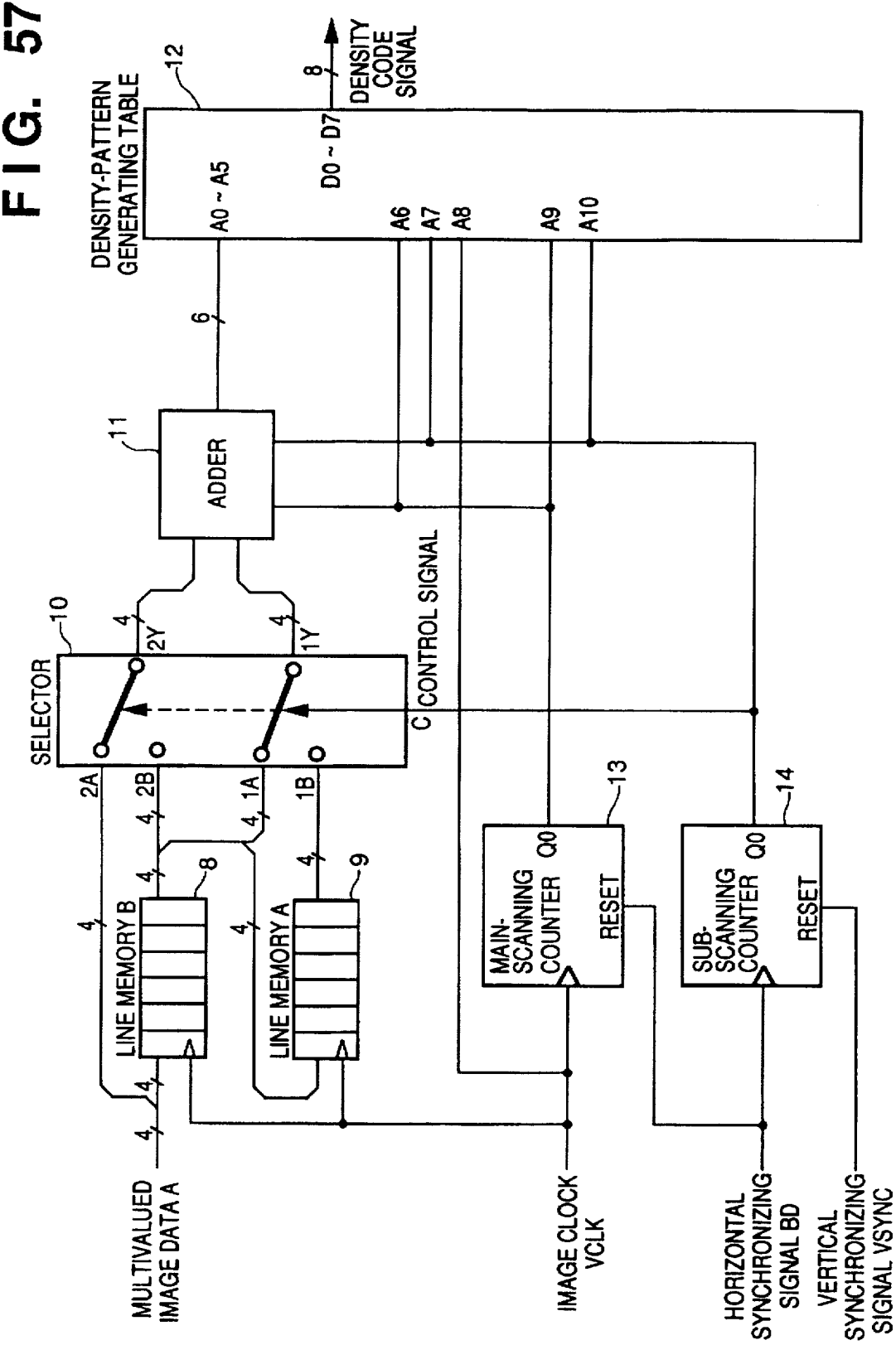
FIG. 57 is a block diagram illustrating the configuration of a data generator in a modification.
Figure 58:
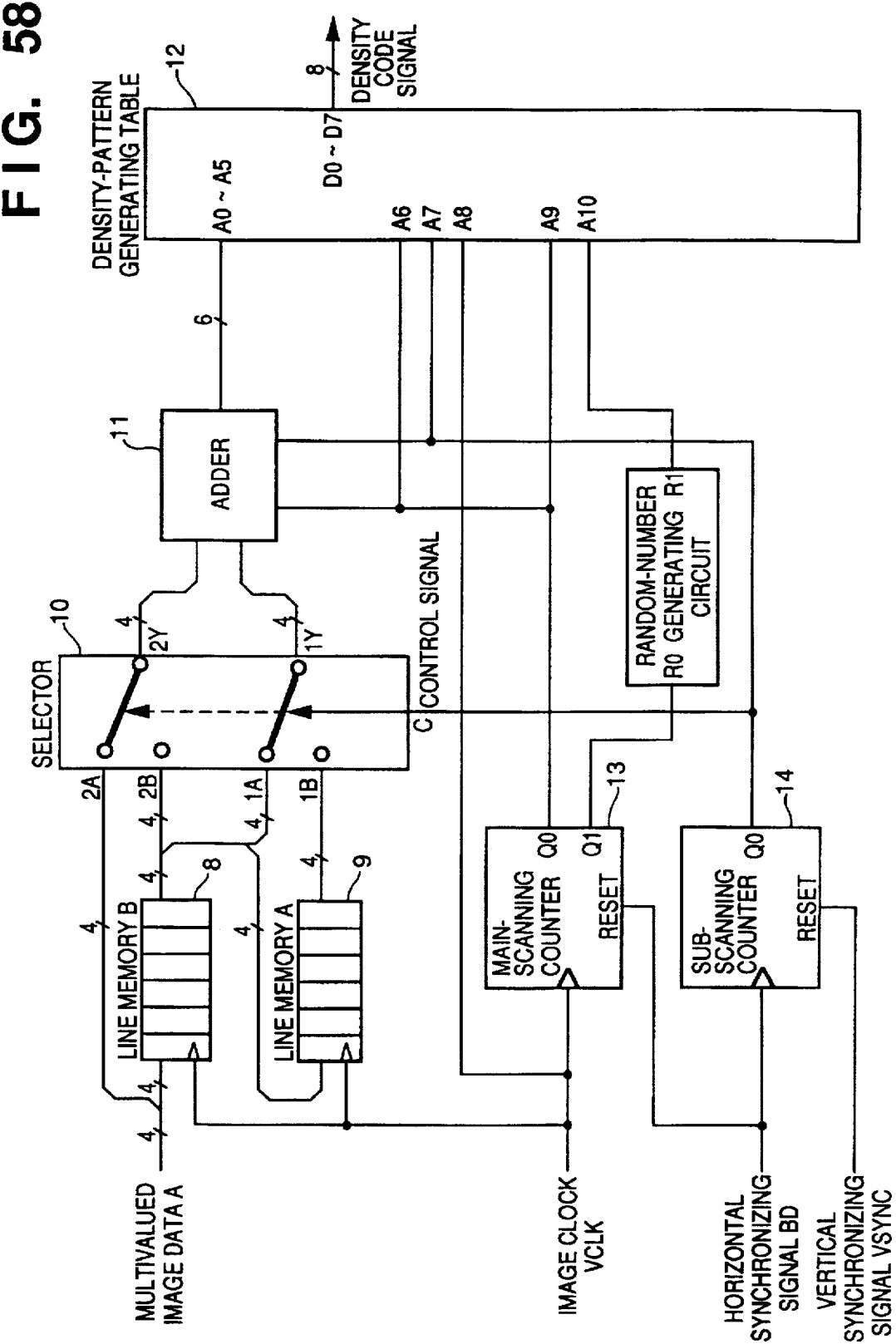
FIG. 58 is a block diagram illustrating the configuration of a data generator in a modification.
Figure 59:
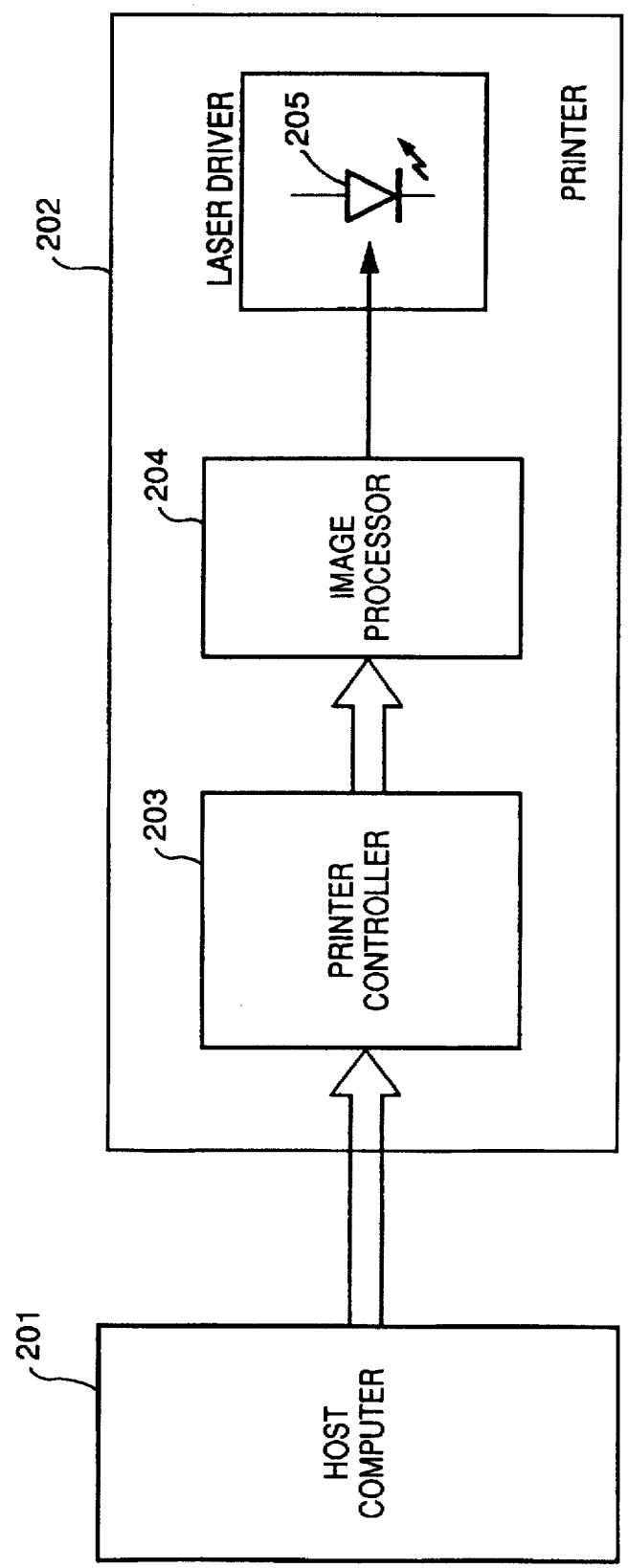
FIG. 59 is a block diagram illustrating the configuration of a printer system.
Figure 60:
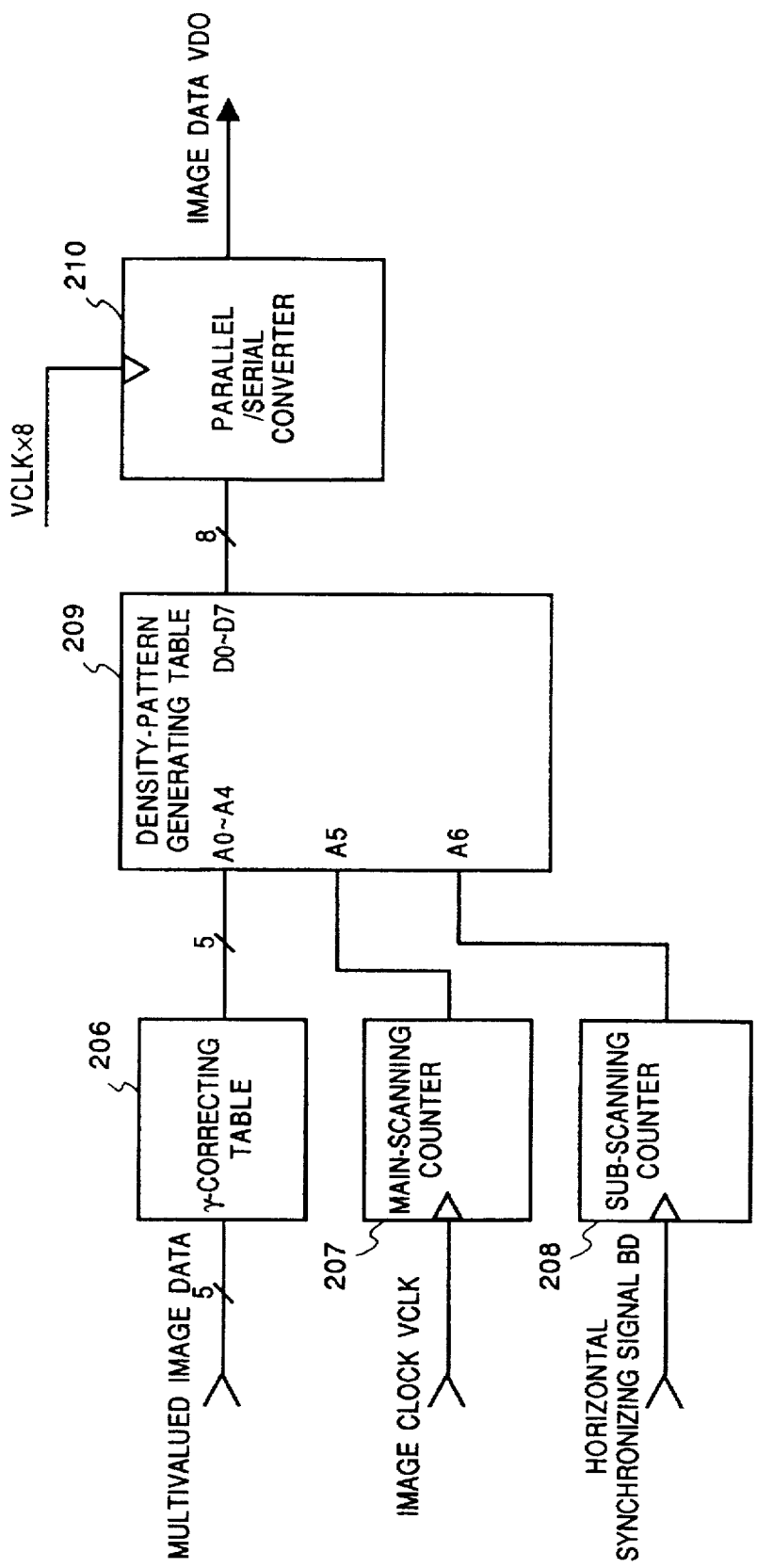
FIG. 60 is a block diagram illustrating the configuration of an image processor shown in FIG. 59.
Figure 61:
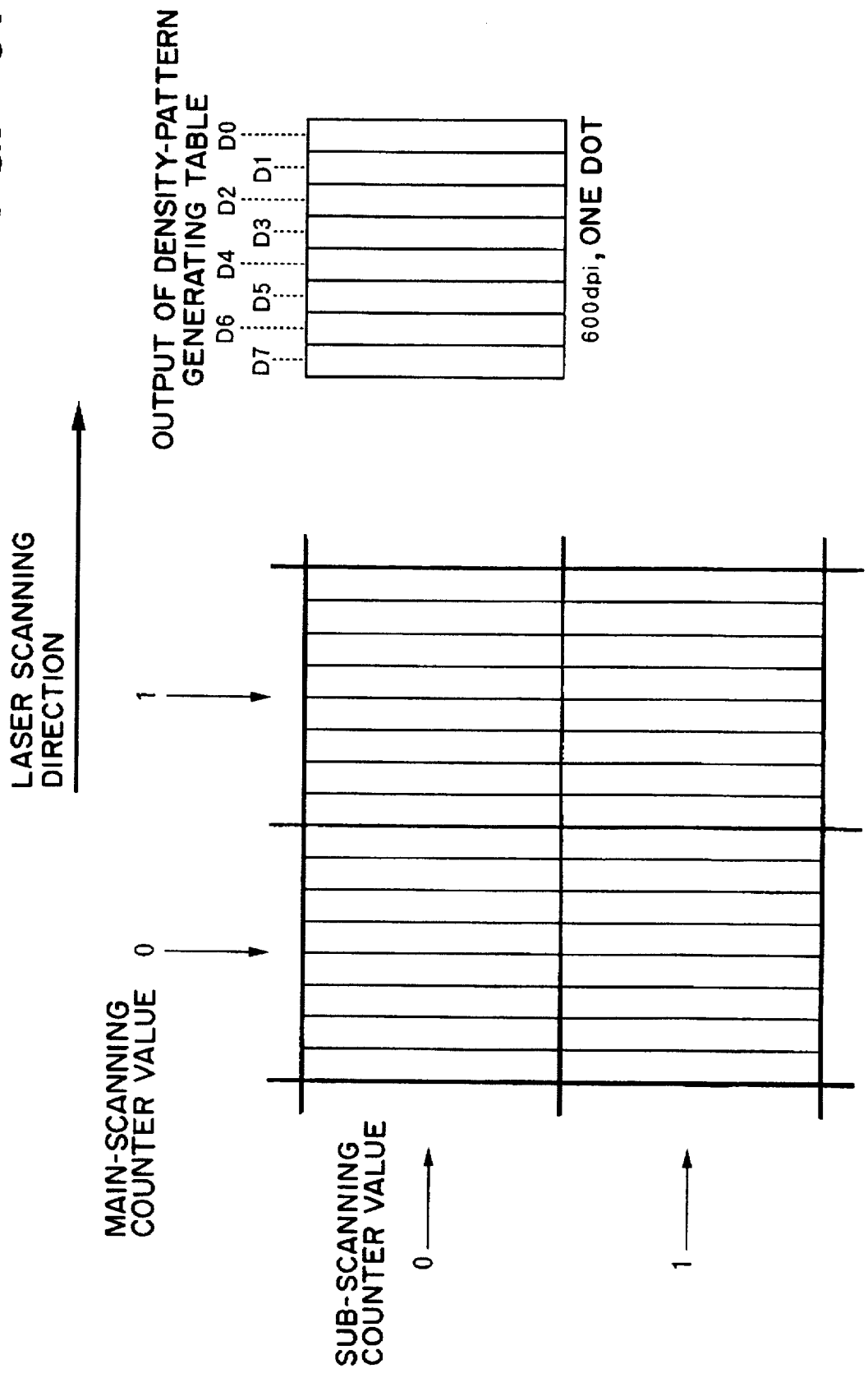
FIG. 61 is a diagram for describing density representation of one pixel
Figure 62:
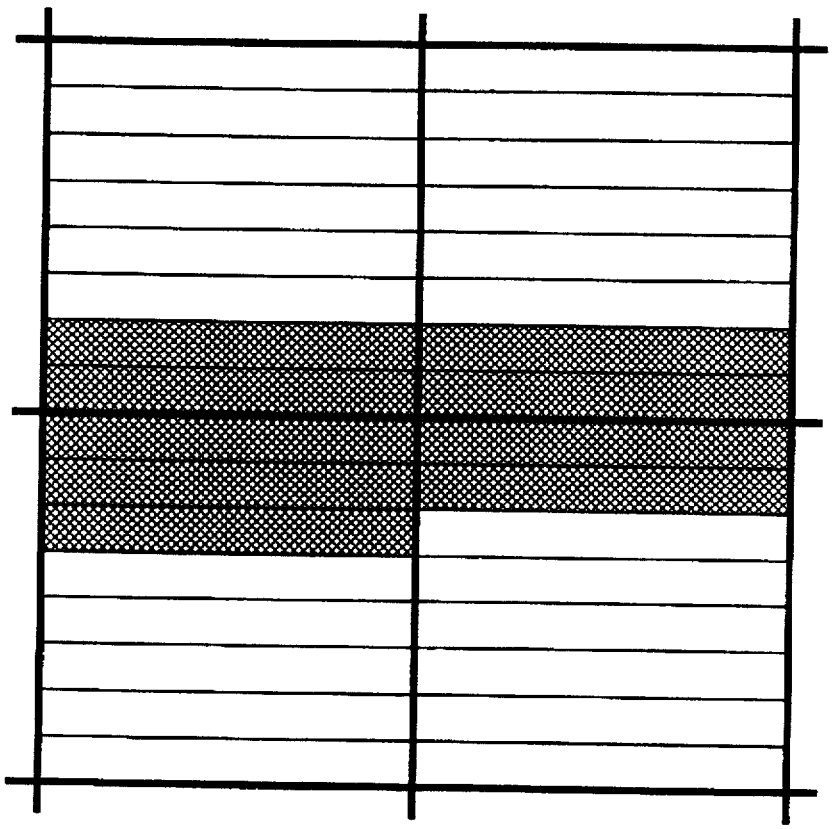
FIG. 62 is a diagram showing an example of a density pattern.
Figure 63:
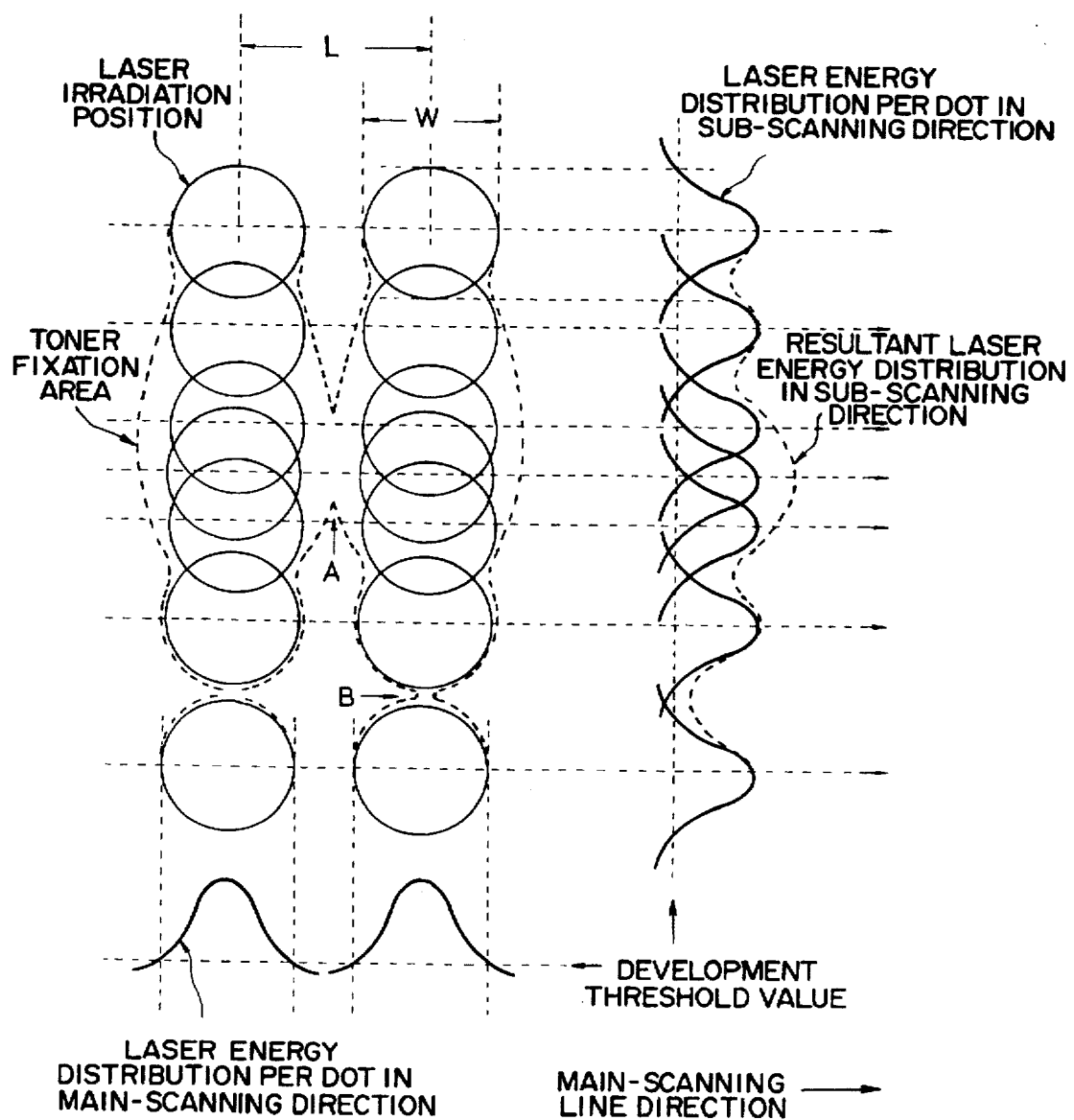
FIG. 63 is a diagram for describing the principle of density irregularity.
Figure 64:
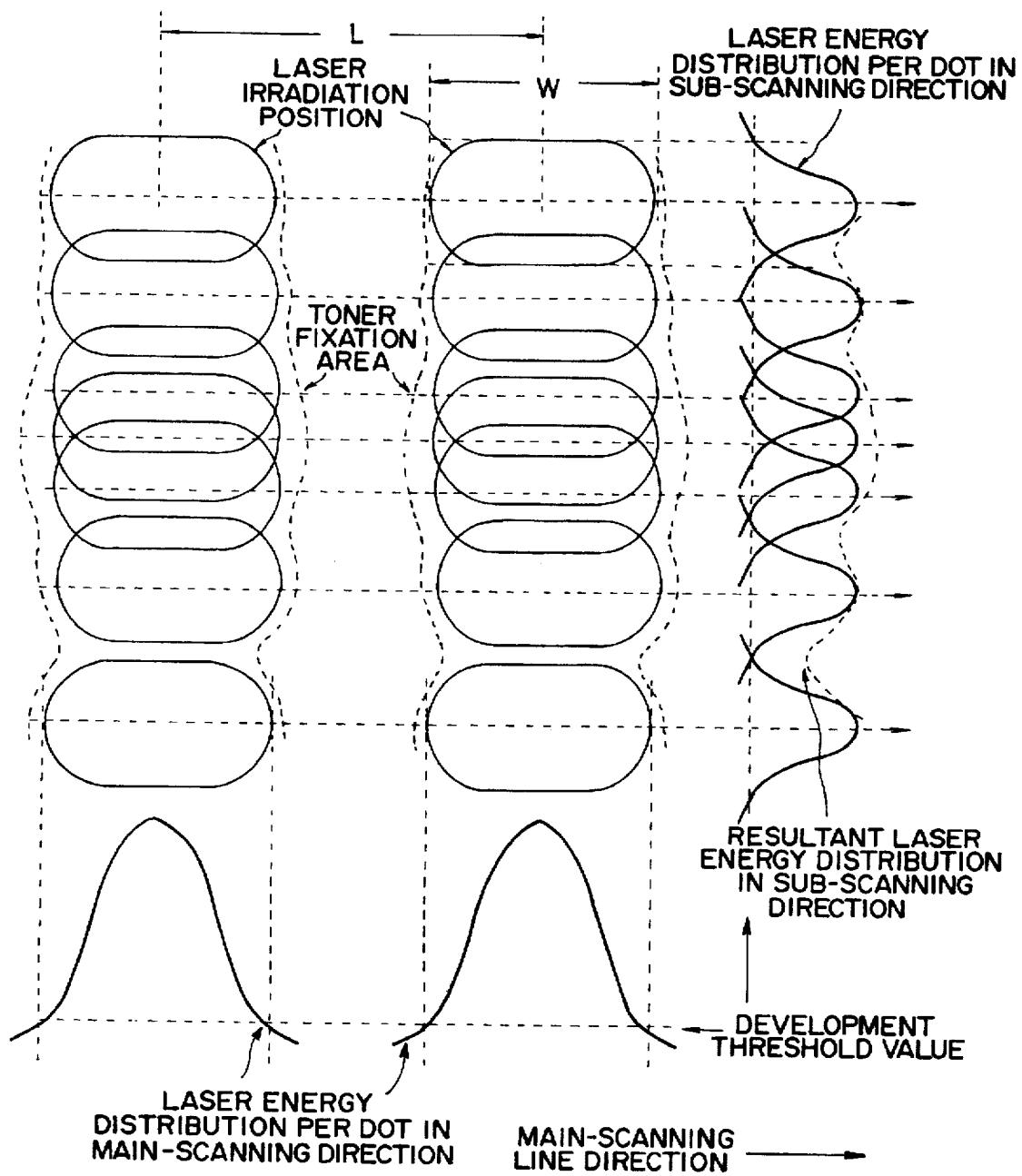
FIG. 64 is a diagram for describing the principle of density irregularity.

The invention is not limited to the data generating units of the embodiments. FIGS. 56~58 illustrate other possible arrangements. In FIG. 56, two bits, namely the outputs Q1 and Q2 of the main-scanning counter resulting from divide-by-8 and divide-by-16 frequency division, are adopted as the pattern-select signal.

In FIG. 57, a pattern is selected by the output Q0 of the main-scanning counter resulting from divide-by-2 frequency division and the output Q0 of the sub-scanning counter resulting from divide-by-2 frequency division. A dot at 300 dpi based upon central growth and a dot at 150 dpi based upon left-side growth and right-side growth can be alternately repeated in the sub-scanning direction.

In FIG. 58, a one-bit random-number is generated from R1 of the above-mentioned random-number generator whenever the Q1 signal of the main-scanning counter resulting from divide-by-4 frequency division enters R0. As a result, a dot at 300 dpi based upon central growth and a dot at 150 dpi based upon left-side growth and right-side growth are mixed randomly so that density irregularity is made less conspicuous.

Thus, by combining PWM growth directions that differ from one another, it is possible to reduce density irregularity caused by an irregularity in the speed of the paper conveyance system and drive system of the photosensitive drum in the printer.

[Eighth Embodiment]

Figure 65:
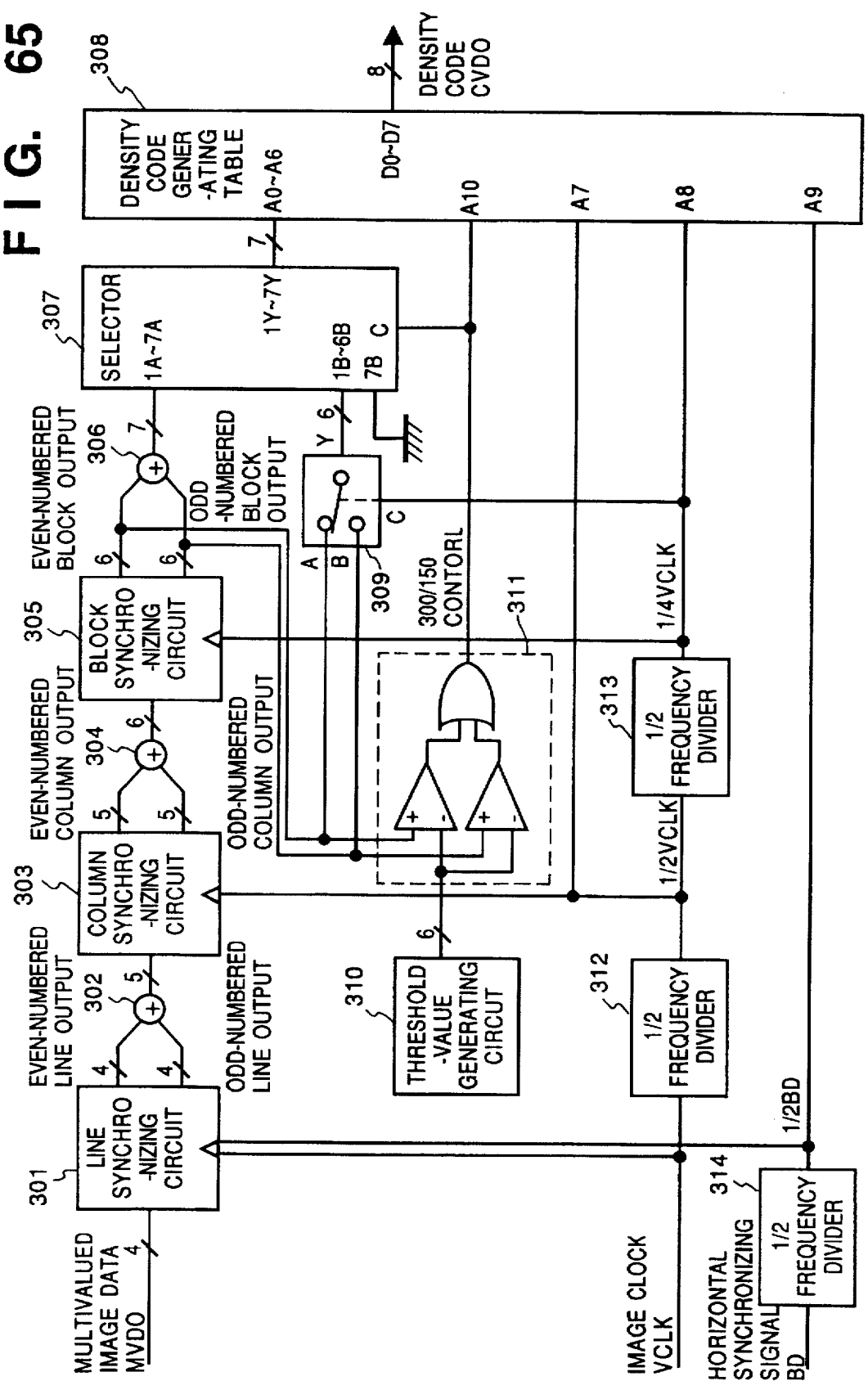
FIG. 65 is a block diagram illustrating the configuration of a data generator according to an eighth embodiment of the invention.

FIG. 65 is a block diagram showing the configuration of a data generator according to an eighth embodiment of the invention. The arrangement of FIG. 65 includes a line synchronizing circuit 301, an adder 302, a column synchronizing circuit 303, an adder 304, a block synchronizing circuit 305, an adder 306, a selector 307, a density-code generating table 308 constituted by a ROM (read-only memory), a selector 309, a threshold-value generating circuit 310, a density discriminating circuit 311 and frequency dividers 312, 313, 314.

Figure 66:
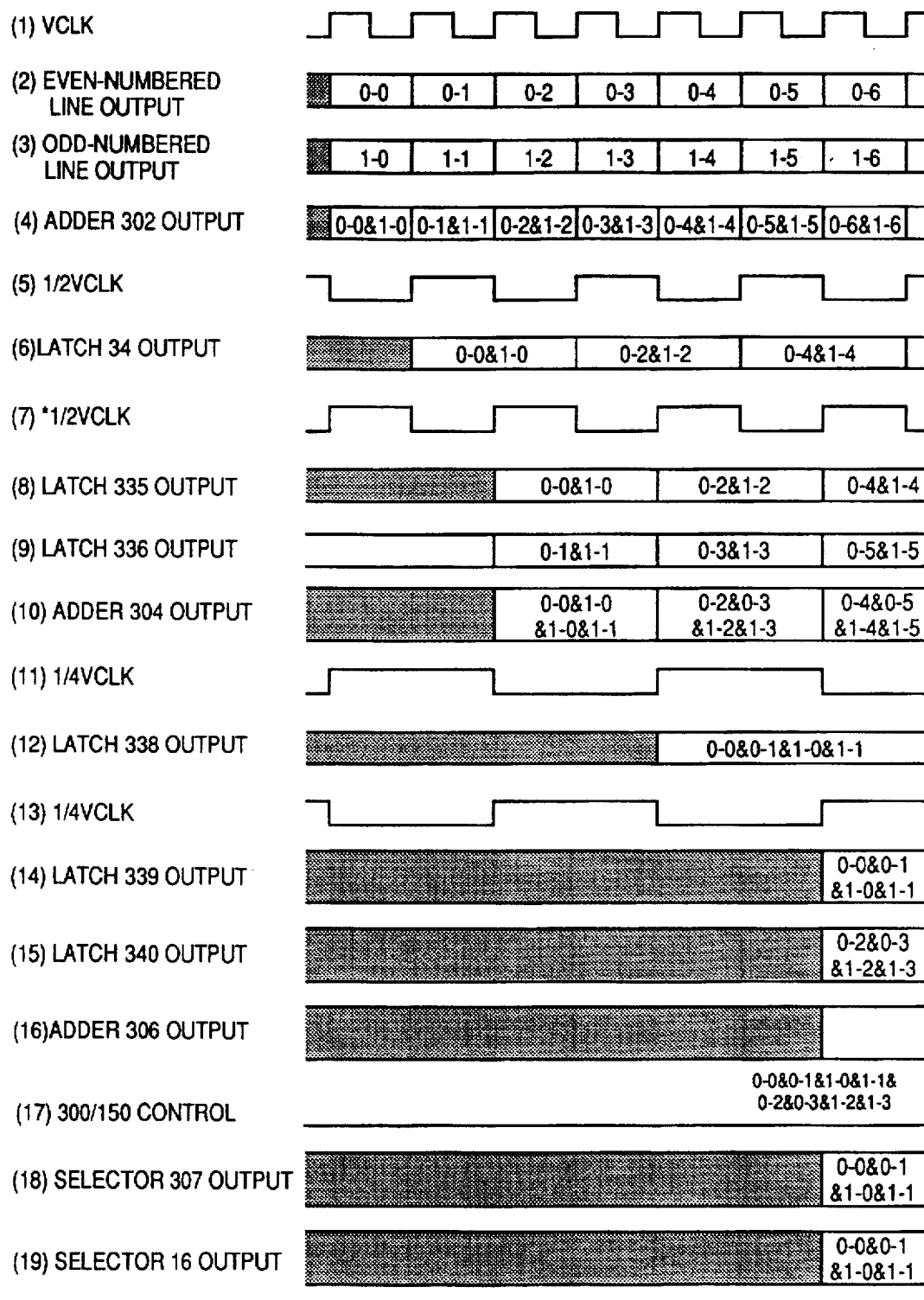
FIG. 66 is a timing chart of signals produced by the data generator according to the eighth embodiment.
Figure 67:
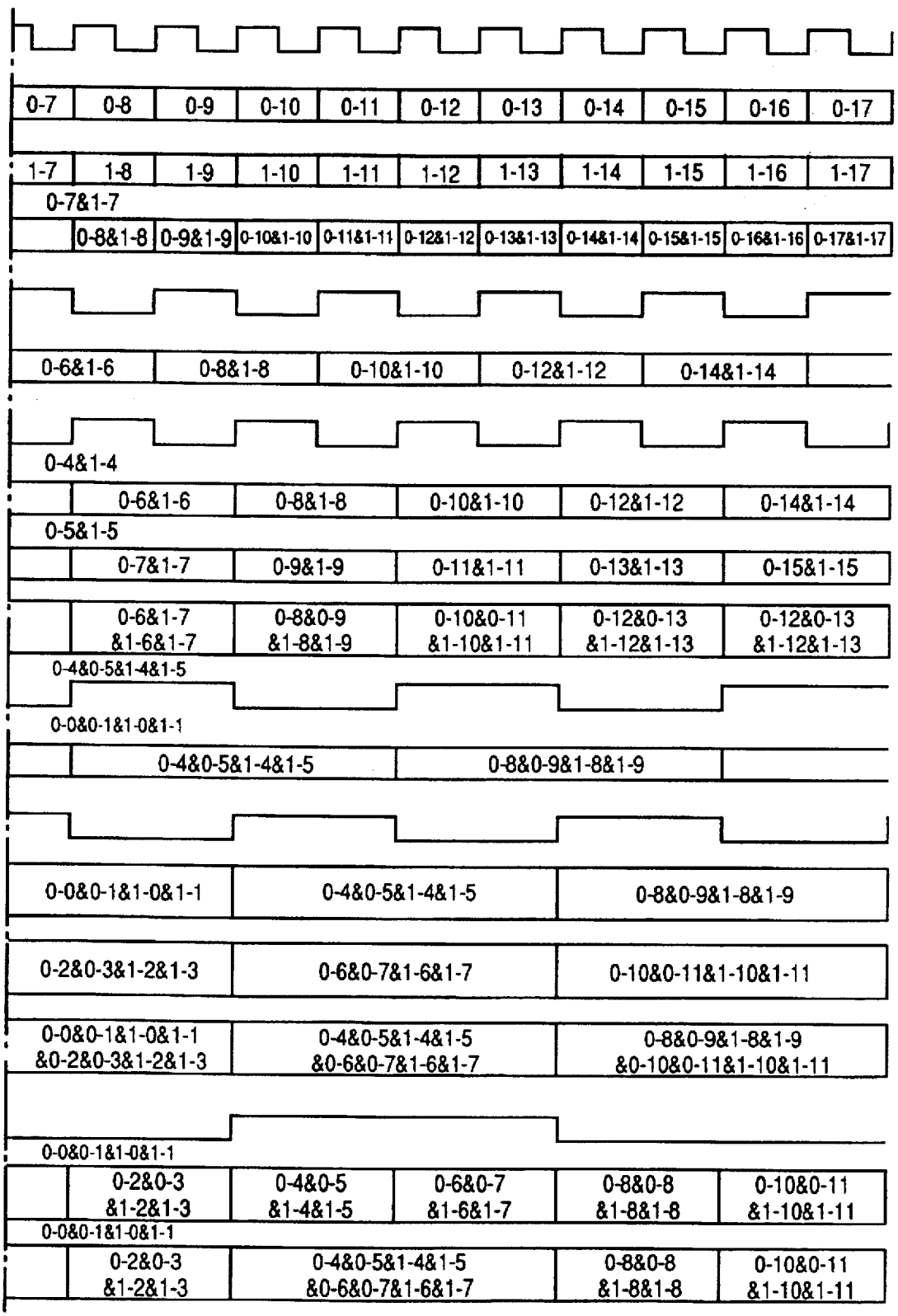
FIG. 67 is a timing chart of signals produced by the data generator according to the eighth embodiment.

FIGS. 66 and 67 are timing charts of signals produced by the data generator according to the eighth embodiment. In FIGS. 66 and 67, data is represented by a (row-column) number in 600 dpi units, and a first dot is represented by the first (column) of the first line (row) in the sub-scanning direction, i.e., by (0-0). For example, (1-3) represents one dot that is the fourth dot in the main scanning direction on the second line in the sub-scanning direction. Further, "&" in FIGS. 66 and 67 signifies addition of the (row-column) numbers.

The data generator 4 has a system [i.e., (300 dpi in the sub-scanning direction)×(300 dpi in the main scanning direction)] for adding a total of four dots of four-bit multivalued image data MVDO transmitted from the printer controller 3, namely two dots in the main scanning direction and two dots in the sub-scanning direction, and a system [i.e., (300 dpi in the sub-scanning direction)×(150 dpi in the main scanning direction)] for adding a total of six dots of the four-bit multivalued image data MVDO, namely four dots in the main scanning direction and two dots in the sub-scanning direction, selects which of these system is to be used depending upon results of addition, and generates an eight-bit multivalued density code CVDO, which indicates the density pattern, based upon the results of selection.

The printer controller 3 sends the four-bit multivalued image data MVFO in units of 600 dpi. Here F(h) indicates black, O(h) white and 1(h)–E(h) a half-tone. In other words, in the case of one dot at 600 dpi, it is possible to express 16 tones of O(h)–F(h). In units of 300 dpi in which four dots are clustered together, it is possible to express 57 tones of O(h)–38(h) [4*E(h)=38(h)]. In units of (300×150) dpi in which eight dots are clustered together, it is possible to express 113 tones of O(h)–70(h).

The line synchronizing circuit 301 synchronizes, every two lines, multivalued image data in units of 600 dpi received from the printer controller 3.

The line synchronizing circuit 301 will now be described.

Figure 68:
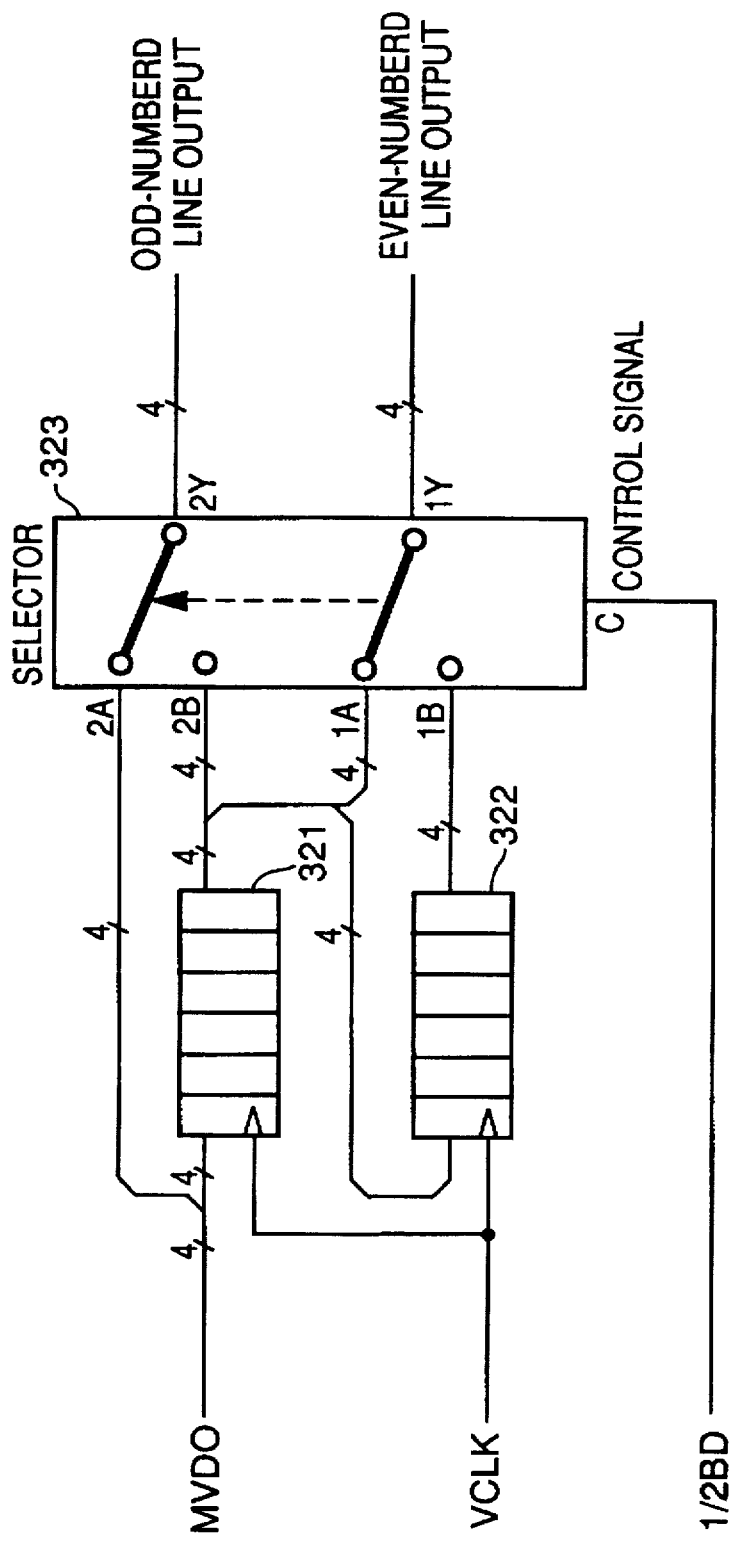
FIG. 68 is a block diagram showing the configuration of a line synchronizing circuit according to the eighth embodiment.
Figure 69:
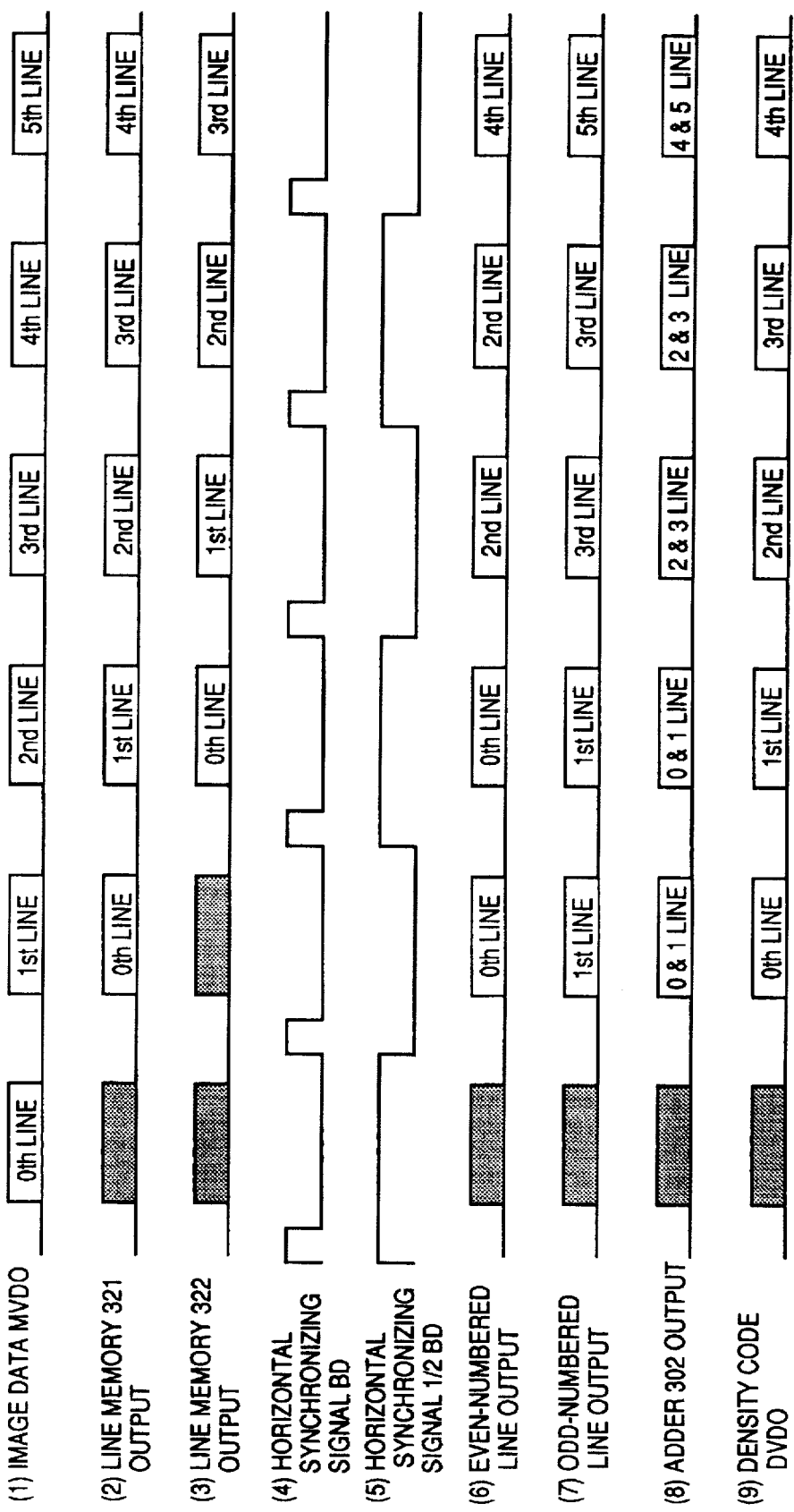
FIG. 69 is a timing chart showing the signals of the line synchronizing circuit depicted in FIG. 68.

FIG. 68 is a block diagram showing the configuration of the line synchronizing circuit according to the eighth embodiment, and FIG. 69 is a timing chart showing the signals of the line synchronizing circuit 301 depicted in FIG. 68.

In FIG. 68, numerals 321, 322 denote line memories, and numeral 323 denotes a selector.

At the timings indicated at (1)–(3) in FIG. 69, the multivalued image data MVDO is successively stored in line memory 321 and then in line memory 322. The multivalued image data MVDO enters the input (2A) of the selector 323, and the output of the line memory 321 enters the input (2B) of the selector. Further, the output of the line memory 321 enters the input (1A), and the output of the line memory 322 enters the input (1B). The changeover input of the selector 323 is a signal ½ BD, obtained by frequency-dividing the horizontal synchronizing signal BD by two using the frequency divider 314 (FIG. 65), as illustrated in FIG. 68. The inputs (1A, 1B, 2A, 2B) are selectively outputted every line in alternating fashion, and synchronization of even-numbered and odd-numbered lines is carried out. If this is represented by units of one dot, the results are as indicated at (1), (2), (3) and (4) illustrated in FIGS. 66 and 67.

Four-bit multivalued data of the even-numbered and odd-numbered lines synchronized by the line synchronizing circuit 301 becomes five-bit multivalued data added by the adder 302, as illustrated at (8) in FIG. 69, as a result of which averaging is performed.

The five-bit multivalued data is synchronized every two columns in the main scanning direction by the column synchronizing circuit 303.

Figure 70:
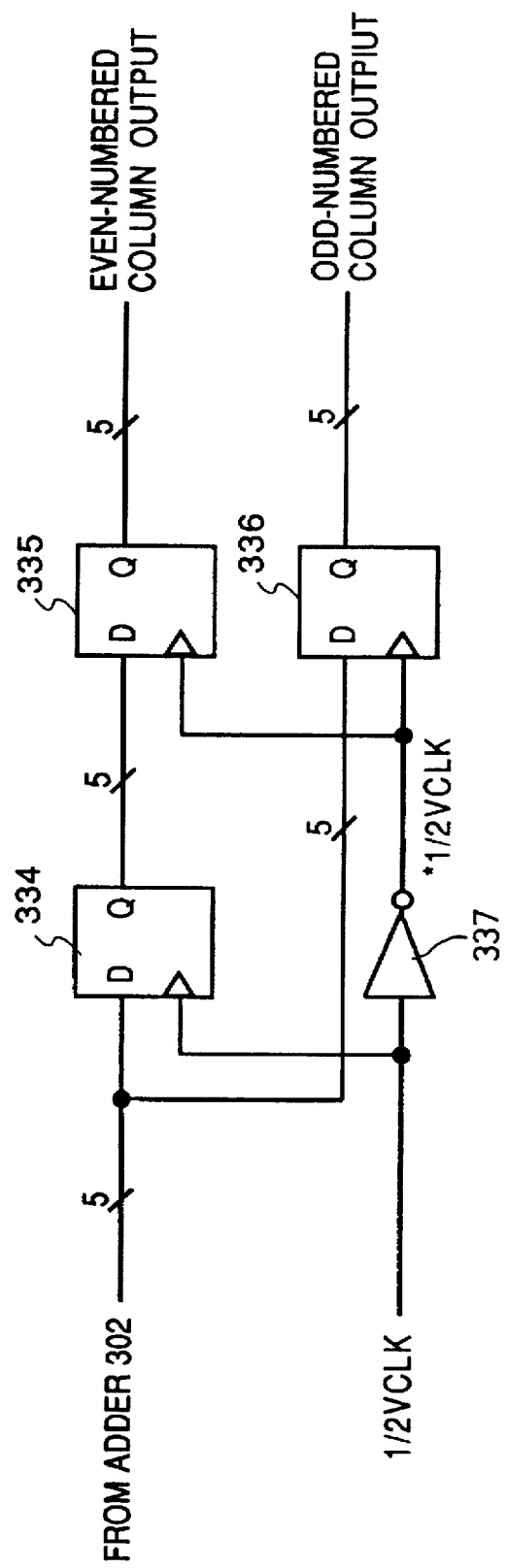
FIG. 70 is a block diagram showing the configuration of a column synchronizing circuit according to the eighth embodiment.

FIG. 70 is a block diagram showing the configuration of the column synchronizing circuit 303 according to the eighth embodiment. Numerals 334, 335, 336 denote five-bit latches, and numeral 337 denotes an inverter. The latch 334 operates in synchronism with the signal ½ VCLK, which is obtained by frequency-dividing the image clock VCLK by two using the frequency divider 312 (FIG. 65), and the latches 335, 336 operate in synchronism with a signal *½ VCLK obtained by inverting ½ VCLK by the inverter 337. Accordingly, as indicated at (4), (5), (6), (7), (8) and (9) in FIGS. 66 and 67, the output of the latch 335 is data of an even-numbered string, and the output of the latch 336 is data of an odd-numbered string. The synchronized odd-numbered and even-numbered strings of data are added by the adder 304 to obtain six-bit multivalued data. In other words, a 2×2 matrix is averaged and made a pixel of one block, and resolution becomes 300 dpi×300 dpi.

The output of the adder 304 is synchronized every two blocks by the block synchronizing circuit 305. The block synchronizing circuit 305 will now be described.

Figure 71:
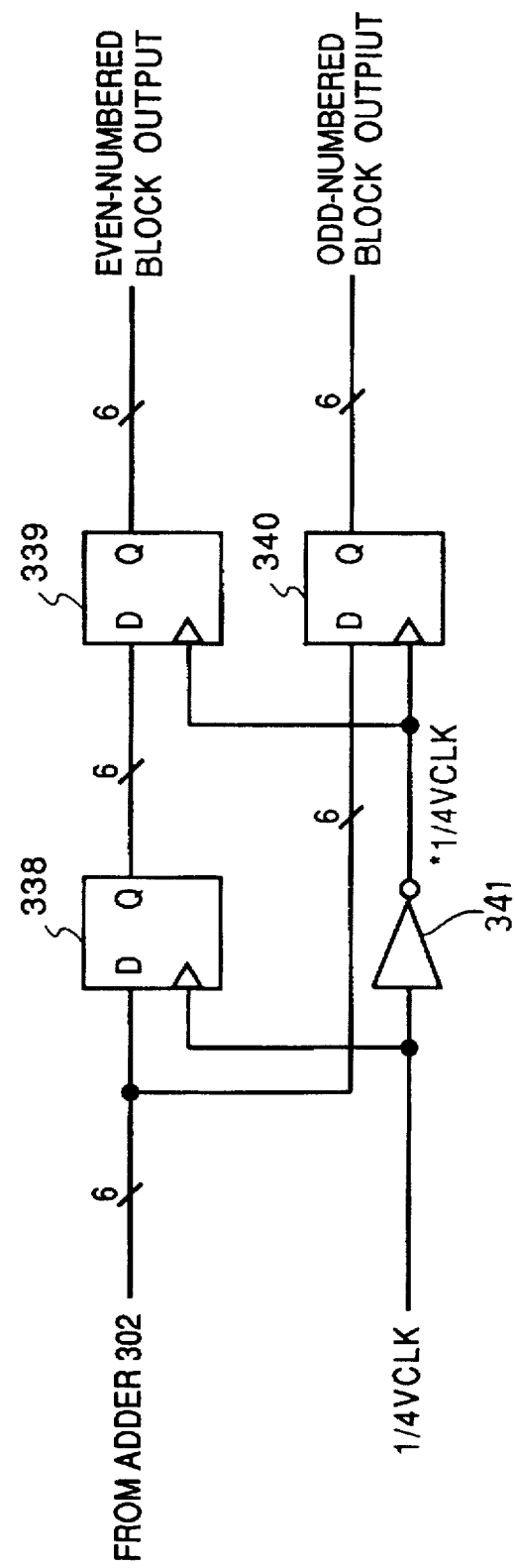
FIG. 71 is a block diagram showing the configuration of a block synchronizing circuit according to the eighth embodiment.

FIG. 71 is a block diagram showing the configuration of the block synchronizing circuit 305 according to the eighth embodiment. Numerals 338, 339, 340 denote six-bit latches, and numeral 341 denotes an inverter. The latch 338 operates in synchronism with the signal ¼ VCLK, which is obtained by further frequency-dividing the output of the frequency divider 312 by two using the frequency divider 313 (FIG. 65), and the latches 339, 340 operate in synchronism with a signal *½ VCLK obtained by inverting ¼ VCLK by the inverter 341. Accordingly, as indicated at (10), (11), (12), (13), (14) and (15) in FIGS. 66 and 67, the output of the latch 339 is data of an even-numbered block, and the output of the latch 340 is data an odd-numbered block. The items of data of the synchronized odd-numbered and even-numbered blocks are added by the adder 306 to obtain seven-bit multivalued data. In other words, a matrix of 2 lines×4 columns is averaged and made a pixel of one block, and resolution becomes (300 dpi in the sub-scanning direction) ×(150 dpi in the main scanning direction).

The threshold-value generating circuit 310 outputs a fixed six-bit image code. This image code indicates a density for changing over to (300 dpi)×(300 dpi) processing or (300 dpi)×(150 dpi) processing. Ordinarily, this code is set to a density value of approximately 50%. This output enters the negative input terminal of each of two comparators constructing the density discriminating circuit 311. The positive input to one comparator is the image data of the even-numbered block, which is the output of the block synchronizing circuit 305, and the positive input to the other comparator is the image data of the odd-numbered block, which is the output of the block synchronizing circuit 305. The OR (logical sum) that is the result of comparing these signals is the output of the density discriminating circuit 311, which performs the 300/150 changeover. More specifically, the density discriminating circuit 311 outputs "1" to the selector 307 and density-code generating table 308, thereby designating (300 dpi)×(300 dpi) processing, in a case where either the image data of the even-numbered block or the image data of the odd-numbered block has a value greater than that of the image code outputted by the threshold-value generating circuit (i.e., in a case where the density is high). In other cases, the density discriminating circuit 311 outputs "0", thereby designating (300 dpi)×(150 dpi) processing.

The inputs to the selector 309 are the even-numbered block output and odd-numbered block output synchronized by the block synchronizing circuit 305. As indicated at (11), (17) and (19) in FIGS. 66 and 67, the selector 309 selects each of these signals by the signal ¼ VCLK, which is obtained by frequency-dividing VCLK by four, thereby re-sequentializing the synchronizing block outputs and outputting block data at a timing conforming to the output of the adder 306.

As indicated at (17), (18) and (19) in FIGS. 66 and 67, the output of the adder 306, namely the added data for (300 dpi)×(150 dpi), enters the input terminal A of the selector 307, and the output of the selector 309 and GND, namely the added data for (300 dpi)×(300 dpi), enters the input terminals B of the selector 307, and these are selected by the output of the density discriminating circuit 311. The reason for inputting GND ("0") to the restart bit of the input terminal B is to simplify the circuitry by dispensing with the need for an address code of the density-code generating table 308, which is the next stage.

Figures 72, 73:
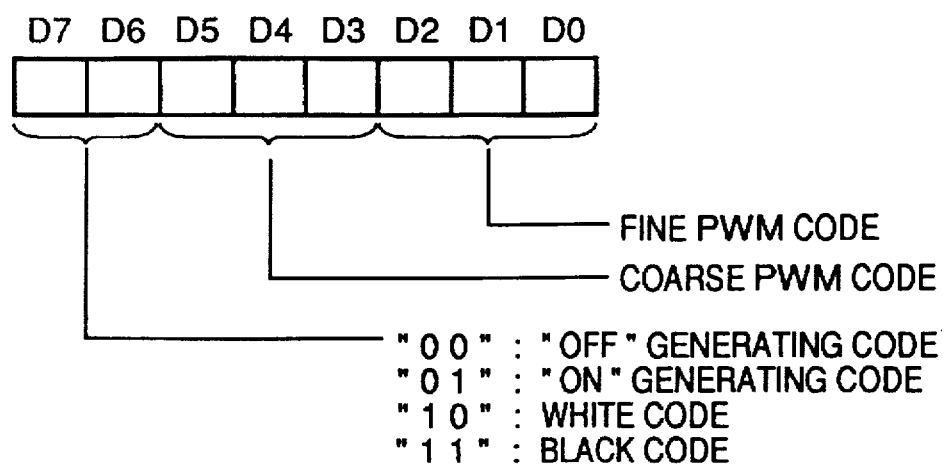
FIG. 72 is a diagram showing a table map of a density-code generating table according to the eighth embodiment.
FIG. 73 is a diagram showing the bit allocation of a density code CVDO, which is output data of a density-code generating table according to the eighth embodiment.
Figure 74A:
FIG. 74 is a diagram for describing FIG. 73.
Figure 74B:
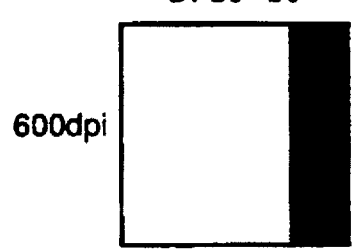
Figure 74C:
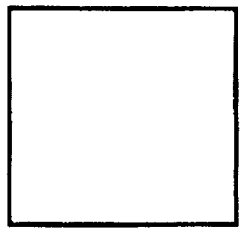
Figure 74D:

The density-code generating table 308 is a ROM. The relationship between addresses and line patterns, which is stored in the ROM, is illustrated in FIG. 72 in the form of a table map. The output of selector 307 enters addresses A0~A6, ½ VCLK enters A7, ¼ VCLK enters A8, ½ BD enters A9, and the output of the density discriminating circuit 311 enters A10.

FIG. 73 is a diagram showing the bit allocation of the density code CVDO, which is output data of the density-code generating table 308 according to the eighth embodiment, and FIG. 74 is a diagram for describing FIG. 73. As illustrated in FIGS. 73 and 74, D7, D6 are bits for selecting whether one dot at 600 dpi is white (all OFF), black (all ON), PWM-ON (ON from midway) or PWM-OFF (OFF from midway). D5-D0 indicates a point at which density changes in case of PWM-ON and PWM-OFF. In D5-D0, D5-D3 is a coarse PWM code, which is a signal for performing PWM in units of ⅛ of one dot, and D2-D0 is a fine PWM code, which is a signal for performing PWM in units of 1/64 of one dot. The details will be given in the description of the PWM processor 5 below.

Figure 75:
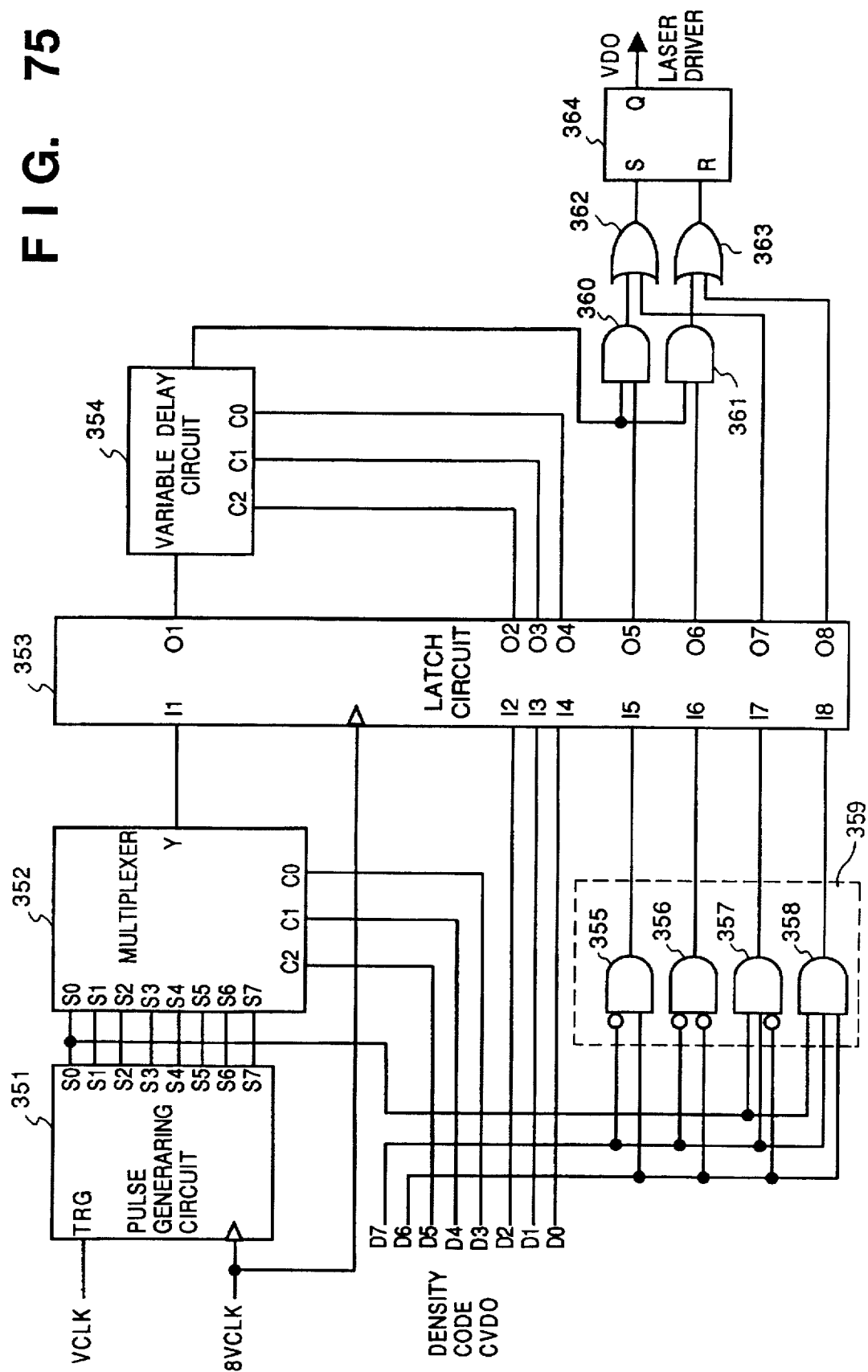
FIG. 75 is a block diagram showing the configuration of a PWM processor according the eighth embodiment.

FIG. 75 is a block diagram illustrating the configuration of the PWM processor 5 according to the eighth embodiment. The PWM processor 5 includes a pulse generating circuit 351, a multiplexer 352, a latch 353 for achieving timing, a variable delay line 354, decoders 355, 356, 357, 358 that construct a mode discriminating circuit 359, AND gates 360, 361, OR gates 362, 363, and an S-R latch 364.

The PWM processor 5 is a circuit for subjecting the density code CVDO to PWM processing. The operation of this circuit will be described below.

In the PWM processor 5, the pulse generating circuit 351 generates eight types of pulses (S0~S7) of the kind shown in FIG. 16 based upon the image clock VCLK and a signal 8VCLK, which is a clock whose frequency is eight times that of the image clock. These pulses enter the multiplexer 352. Based upon D5-D3, which is the coarse PWM code in D7-D0 of the density code signal CVDO outputted by the data generator 4, the multiplexer 352 selects one of the pulses (S0~S7) in the same manner as set forth in the above-described embodiment.

Figure 76:
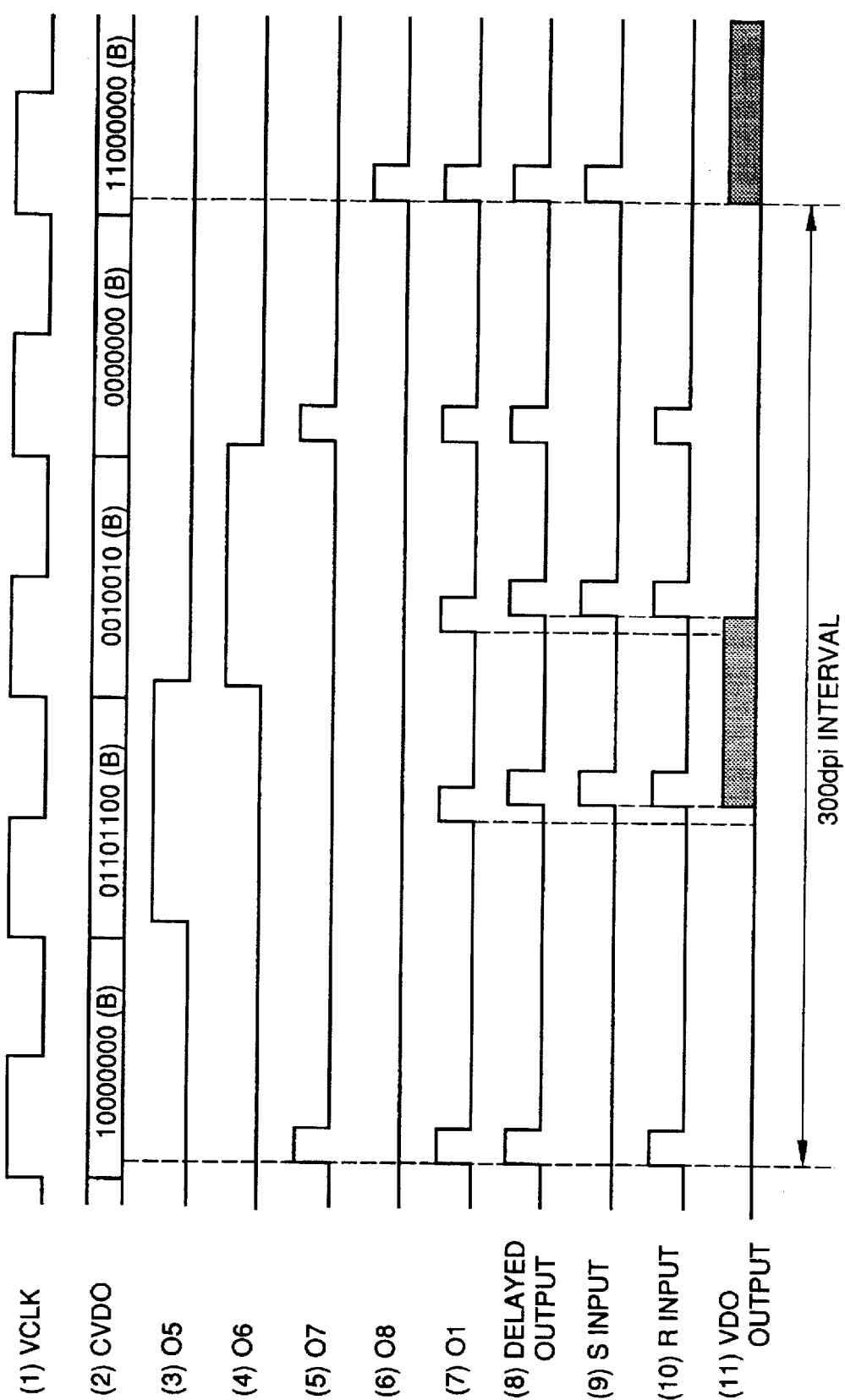
FIG. 76 is a timing chart at the time of (150×150) dpi processing according to the eighth embodiment.
Figure 77:
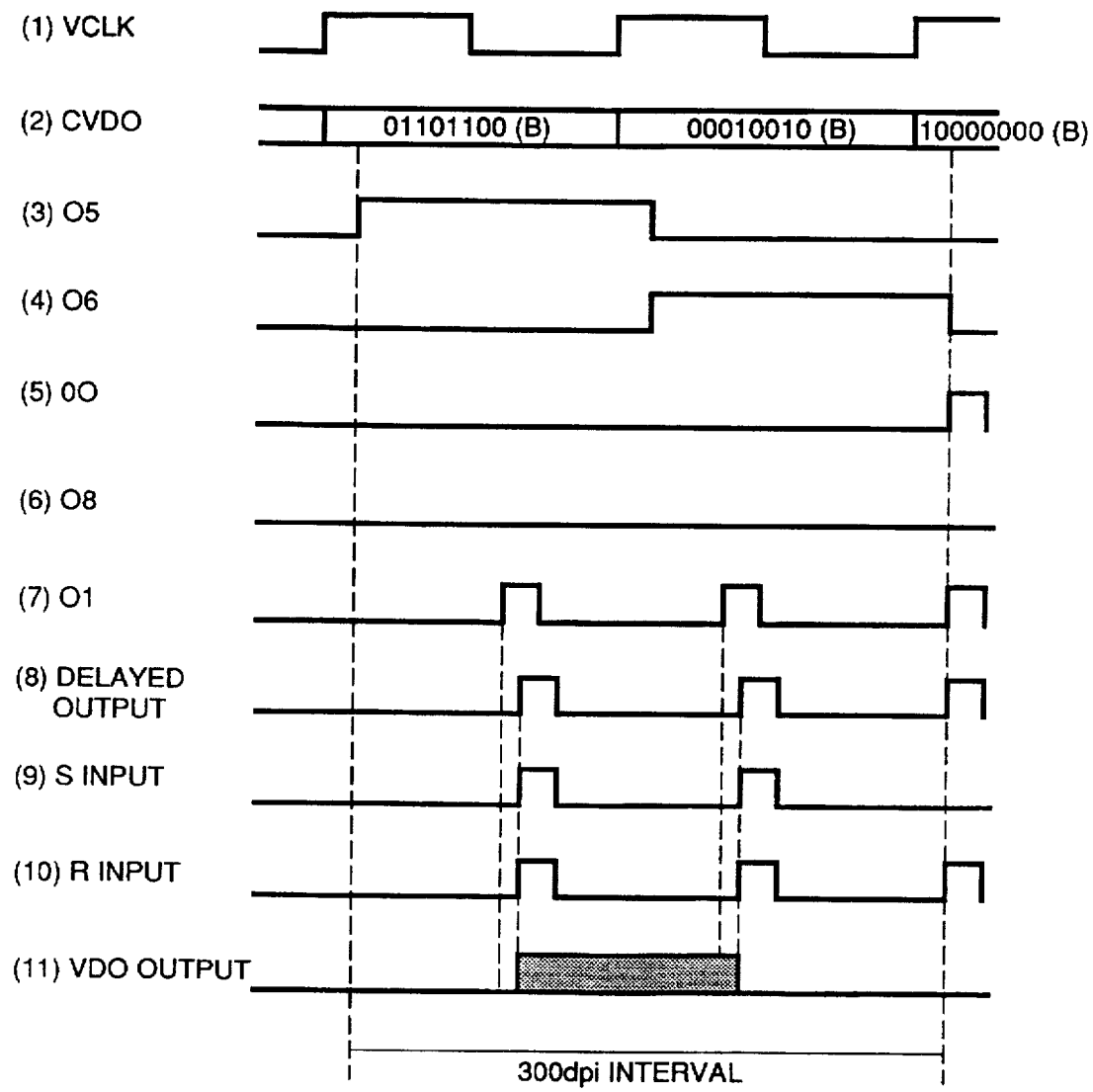
FIG. 77 is a timing chart at the time of (300×300) dpi processing according to the eighth embodiment.

The output of the multiplexer 352, after being latched by the latch circuit 353, is inputted to the variable delay circuit 354. D2~D0 in the density code signal CVDO enters C2~C0 of the variable delay circuit 354 through the latch circuit 353, and a signal delayed by the time determined by this control signal becomes the output of the variable delay circuit 354. The signal enters the AND gates 360 and 361. The foregoing timing is as indicated at (1), (2), (7), (8) in FIG. 76 or 77.

The output of the decoder 355, which detects the "ON mode", enters the other input terminal of the AND gate 360 through the latch circuit 353, and the output of the AND gate 360 is connected to the SET input terminal of the S-R latch 364 through the OR gate 362. The S-R latch 364 is turned ON, whereby the VDO signal is turned ON. The foregoing timing is as indicated at (9) in FIG. 76 or 77.

The output of the decoder 356, which detects the "OFF mode", enters the other input terminal of the AND gate 361 through the latch circuit 353, and the output of the AND gate 361 is connected to the RESET input terminal of the S-R latch 364 through the OR gate 363. The S-R latch 364 is turned OFF, whereby the VDO signal is turned OFF. The foregoing timing is as indicated at (10) in FIG. 76 or 77.

If the "white mode" is detected by the decoder 357, the SET input of the S-R latch 364 becomes "1" from the beginning of the dot unconditionally owing to the latch circuit 353 and OR gate 362, and the VDO signal turns ON from the start.

If the "black mode" is detected by the decoder 358, the RESET input of the S-R latch 364 becomes "1" from the beginning of the dot unconditionally owing to the latch circuit 353 and OR gate 363, and the VDO signal turns OFF from the start.

The construction of the variable delay circuit 354 is similar to that of the foregoing embodiment and a description thereof is deleted.

Figure 79:
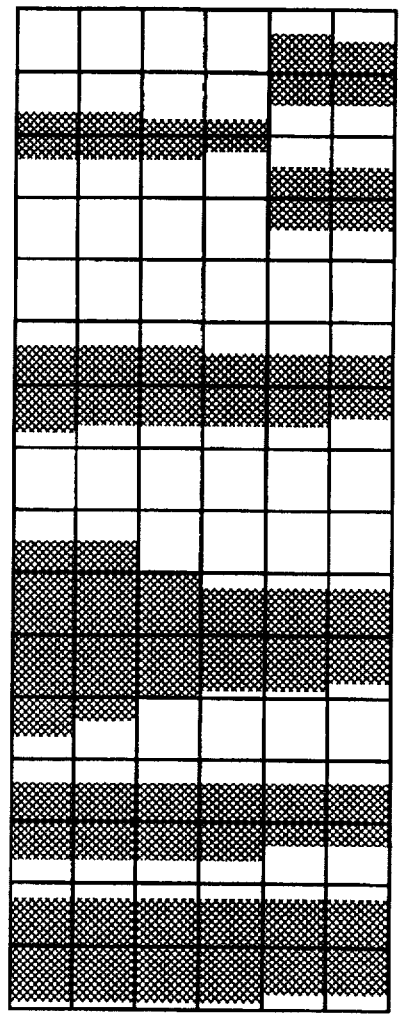
FIG. 79 is a diagram showing results of processing according to the eighth embodiment.

FIG. 78 is a diagram for describing block processing according to the eighth embodiment, and FIG. 79 is a diagram showing an example of printing according to the eighth embodiment.

In FIG. 78, (A), (B), (C) indicate input/output in a case where (300 dpi)×(300 dpi) processing is selected, and (D), (E), (F) indicate input/output in a case where (300 dpi)×(150 dpi) processing is selected.

FIG. 79 illustrates an example of printing in a case where a changeover is made between (300 dpi)×(150 dpi) processing and (300 dpi)×(300 dpi) processing.

In this embodiment, a half-tone processing method is described in which half-tone processing of (300×300) dpi and half-tone processing of (300×150) dpi are changed over depending upon density in a 600 dpi engine. However, combinations of half-tone processing having different resolutions, such as (600×600) dpi, (200×200) dpi or (150× 150) dpi, are permissible.

A circuit utilizing a semiconductor delay is used in the variable delay circuit constituting the PWM processor of this embodiment. However, it is permissible to perform PWM processing that utilizes circuitry using a high-frequency clock or circuitry that generates an analog-type ramp function. Modulation of luminous intensity also may be employed instead of pulse-width modulation.

In accordance with the eighth embodiment, as described above, an irregularity in density due to pitch irregularity or the like is reduced by performing half-tone processing of diminished resolution at the time of low density. When density is high, on the other hand, half-tone processing of high resolution is carried out. High-tone, high-quality half-tone images can be obtained in a state in which resolution is substantially high owing to the fact that human visual characteristics are acute at the time of low density while high resolution in the sub-scanning direction is maintained by making density only in the main scanning direction variable.

[Ninth Embodiment]

In the eighth embodiment, the densities of blocks (even- and odd-numbered) in (300×300) dpi units continuous in the main scanning direction are detected. If either density exceeds a certain threshold value, (300×300) dpi processing is executed; otherwise, two blocks are combined and (300× 150) dpi processing is executed.

In the ninth embodiment described below, an example will be set forth in which the processing of the eighth embodiment is supplemented by executing (300×150) dpi processing, irrespective of the density value, one block below (in the sub-scanning direction) a block in which (300×150) dpi processing has been carried out, and similarly executing (300×300) dpi processing, irrespective of the density value, one block below (in the sub-scanning direction) a block in which (300×300) dpi processing has been carried out.

In FIG. 79, a screen angle is generated without connecting black dots in the sub-scanning direction at a location at which a changeover is made between (300×150) dpi processing and (300×300) dpi processing. As a result, pitch irregularity becomes more conspicuous. Accordingly, the connectivity of black dots in the sub-scanning direction is raised, thereby enhancing the effect in which pitch irregularity is made less conspicuous.

Figure 80:
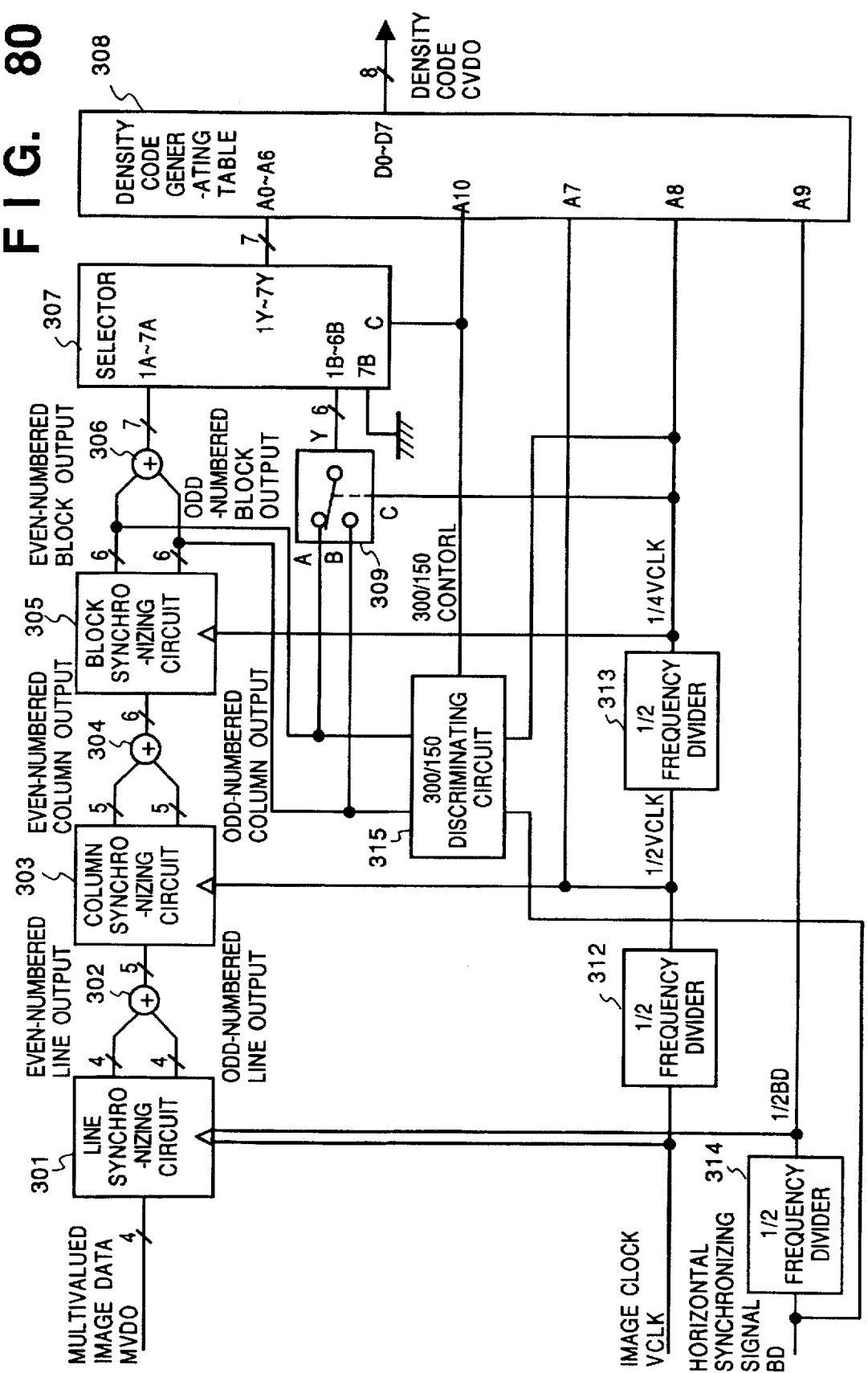
FIG. 80 is a block diagram illustrating the configuration of a data generator according to a ninth embodiment of the invention.

FIG. 80 is a block diagram illustrating the configuration of the data generator according to the ninth embodiment. It should be noted that circuits in FIG. 80 that are identical with those in FIG. 65 are designated by like reference characters and need not be described again.

In the eighth embodiment, the density discriminating circuit 311 is provided and a 300/150 discrimination is performed, as shown in FIG. 65. In the ninth embodiment, a 300/150 discriminating circuit 315 is provided to perform the 300/150 discrimination, as illustrated in FIG. 80.

Figure 81:
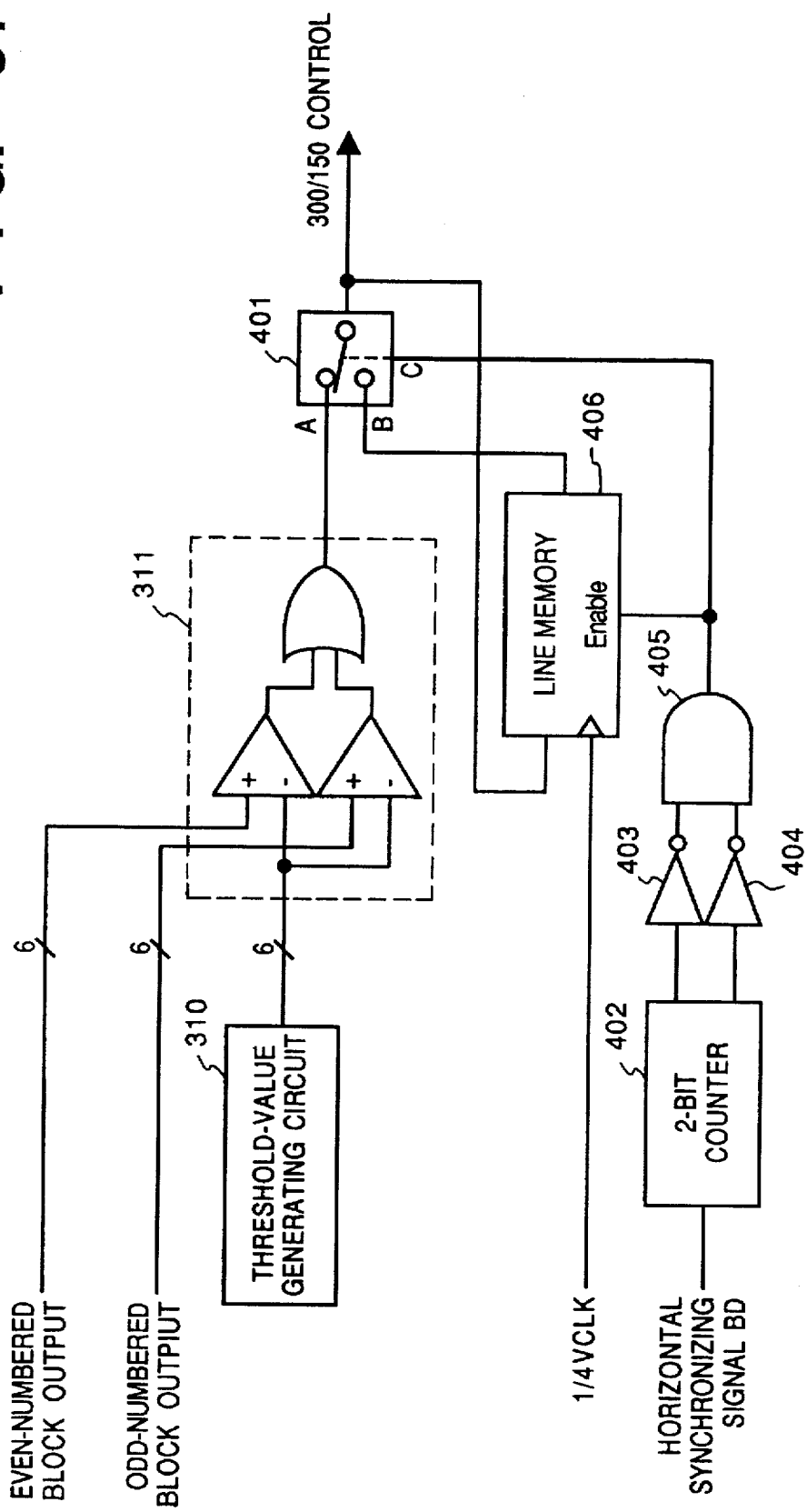
FIG. 81 is a block diagram showing the configuration of a 300/150 discriminating circuit according to the ninth embodiment.

FIG. 81 is a block diagram showing the configuration of the 300/150 discriminating circuit according to the ninth embodiment. This arrangement includes the threshold-value circuit 310, the density discriminating circuit 311, a selector 401, a two-bit counter 402, NOT gates 403, 404, an AND gate 405 and a line memory 406.

The operation of the main components of this embodiment will now be described.

The even-numbered block output and odd-numbered block output synchronized by the block synchronizing circuit 305 have the magnitudes of their density levels detected by the threshold-value generating circuit 310 and density discriminating circuit 311 (this is as described in the eighth embodiment), and the result of detection is applied to the A input terminal of the selector 401. The output of the line memory 406 enters the B input terminal of the selector 401. The horizontal synchronizing signal BD is counted by a two-bit counter 402. When the outputs of the counter are "0, 0", this is decoded by the NOT gates 403, 404 and AND gate 405. The output of the AND gate 405 enters the control-input terminal C of the selector 401. When the control-input terminal is logical "1", the A input terminal is selected; when the former is "0", the B input terminal is selected. The line memory 406 latches and then outputs the 300/150 control signal in response to the ½ VCLK signal. The output of the AND gate 405 is connected to a latch-enable terminal of the line memory 406. The input is latched when the enable signal is "1" but is not latched when the enable signal is "0". An output is delivered, however, irrespective of whether the enable input is "0" or "1".

By virtue of the foregoing operation, (300×150) dpi processing is executed, irrespective of the density value, one block below (in the sub-scanning direction) a block in which (300×150) dpi processing has been carried out, and (300× 300) dpi processing is similarly executed, irrespective of the density value, one block below (in the sub-scanning direction) a block in which (300×300) dpi processing has been carried out. This raises connectivity of black dots in the sub-scanning direction, thereby enhancing the effect in which pitch irregularity is made less conspicuous.

[Tenth Embodiment]

A tenth embodiment of the present invention will now be described.

Figure 82:
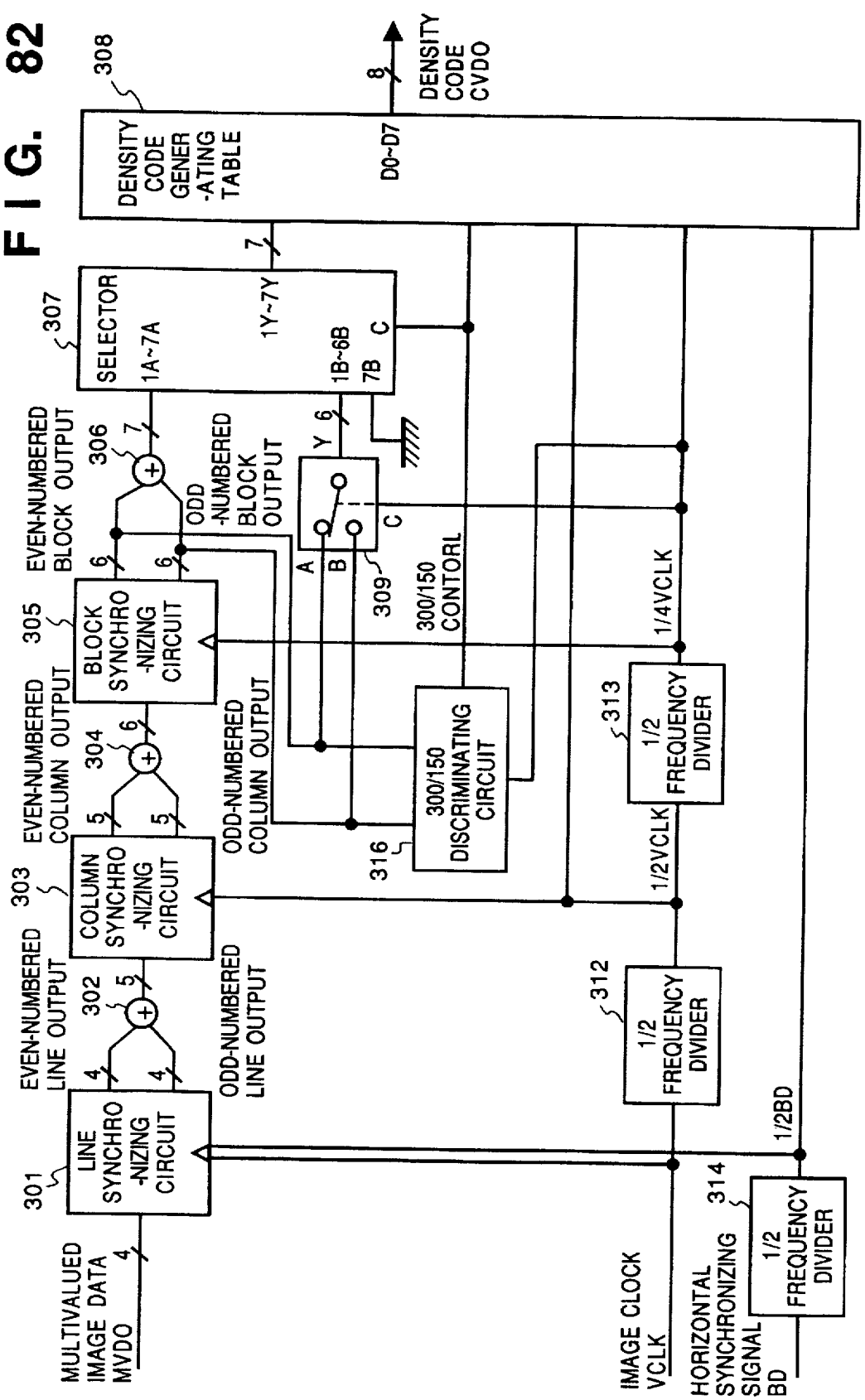
FIG. 82 is a block diagram illustrating the configuration of a data generator according to a tenth embodiment of the invention.

FIG. 82 is a block diagram illustrating the configuration of a data generator according to a tenth embodiment of the invention. The characterizing feature of this embodiment in FIG. 82 in comparison with the ninth embodiment of FIG. 80 is that the 300/150 discriminating circuit 316 in FIG. 82 does not require the horizontal synchronizing signal BD. Components in FIG. 82 identical with those shown in FIG. 80 are designated by like reference characters and need not be described again.

The 300/150 discriminating circuit 316 will now be described.

Figure 83:
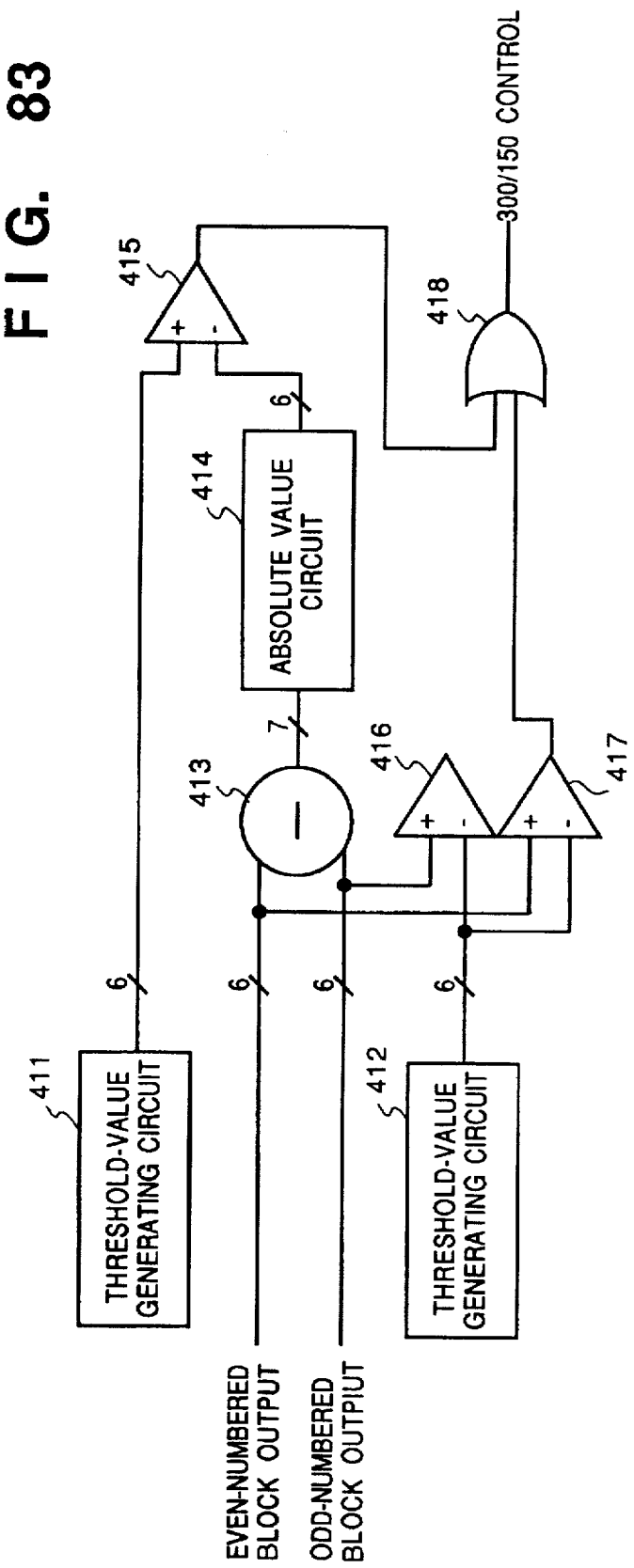
FIG. 83 is a block diagram showing the configuration of a 300/150 discriminating circuit according to the tenth embodiment.

FIG. 83 is a block diagram showing the configuration of the 300/150 discriminating circuit 316 according to the tenth embodiment. This arrangement includes threshold-value generating circuits 411, 412 for generating threshold values, a subtractor 413, an absolute-value circuit 414, comparators 415, 416, 417 and an OR gate 418.

The threshold-value generating circuit 412 outputs a fixed six-bit image code. This image code indicates a density for changing over to (300 dpi)×(300 dpi) processing or (300 dpi)×(150 dpi) processing. Ordinarily, this code is set to a density value of approximately 50%. This output enters the negative input terminal of each of the two comparators 416, 417. The positive input to one comparator 416 is the image data of the even-numbered block, which is the output of the block synchronizing circuit 305, and the positive input to the other comparator 417 is the image data of the odd-numbered block, which is the output of the block synchronizing circuit 305. The results of the comparisons are OR-ed by the OR gate 418, the output of which is the output of the 300/150 discriminating circuit 316. More specifically, the density discriminating circuit 316 outputs "1" to the selector 307 and density-code generating table 308, thereby designating (300 dpi)×(300 dpi) processing, in a case where either the image data of the even-numbered block or the image data of the odd-numbered block has a value greater than that of the image code outputted by the threshold-value generating circuit 412 (i.e., in a case where the density is high). In other cases, the density discriminating circuit outputs "0", thereby designating (300 dpi)×(150 dpi) processing.

Furthermore, the items of image data of the even-numbered block and odd-numbered block undergo subtraction in the subtractor 413, the MSB, which is a code bit, is eliminated by the absolute-value circuit 414, and the absolute value of the difference is applied to the negative input terminal of the comparator 415. The output of the threshold-value generating circuit 411 enters the positive input terminal of the comparator 415. The output of the threshold-value generating circuit 411 is fixed six-bit data. This is reference data that decides whether the density difference between blocks, namely the difference between image data, is large or small. The output of the comparator 415 is inputted to the OR gate 418. In other words, if the density difference between the even-numbered and odd-numbered blocks is large, the output of the comparator 415 becomes "1". Even if the density of each block is smaller than the output of the threshold-value generating circuit 412 and the outputs of the comparators 417, 417 are "0", an output of "1" is obtained owing to the OR gate 418 and (300 dpi)×(300 dpi) processing is executed.

Thus, in the tenth embodiment, the densities of blocks (even- and odd-numbered) in (300×300) dpi units continuous in the main scanning direction, as well as the density difference between blocks, are detected. If the density difference between blocks is large (300×300) dpi processing is executed. If this density difference is not large and, moreover, either density exceeds a certain threshold value, then (300×300) dpi processing is executed. If the density difference is not large and, moreover, neither density exceeds the threshold value, two blocks are combined and (300×150) dpi processing is executed. Accordingly, high-tone, high-quality half-tone images can be obtained in a state in which resolution is substantially high.

[Modification]

A modification of the tenth embodiment will be described.

In the modification set forth below, an example will be set forth in which the processing of the tenth embodiment is supplemented by executing (300×150) dpi processing, irrespective of the density value, one block below (in the sub-scanning direction) a block in which (300×150) dpi processing has been carried out, and similarly executing (300×300) dpi processing, irrespective of the density value, one block below (in the sub-scanning direction) a block in which (300×300) dpi processing has been carried out.

In FIG. 79, a screen angle is generated without connecting black dots in the sub-scanning direction at a location at which a changeover is made between (300×150) dpi processing and (300×300) dpi processing. As a result, pitch irregularity becomes more conspicuous. Accordingly, the connectivity of black dots in the sub-scanning direction is raised, thereby enhancing the effect in which pitch irregularity is made less conspicuous.

Since the construction of the data generator is similar to that of FIG. 80 described in connection with the ninth embodiment, this need not be described again here. In this modification, the description will be directed to the 300/150 discriminating circuit, which differs from that of the above-mentioned embodiment.

Figure 84:
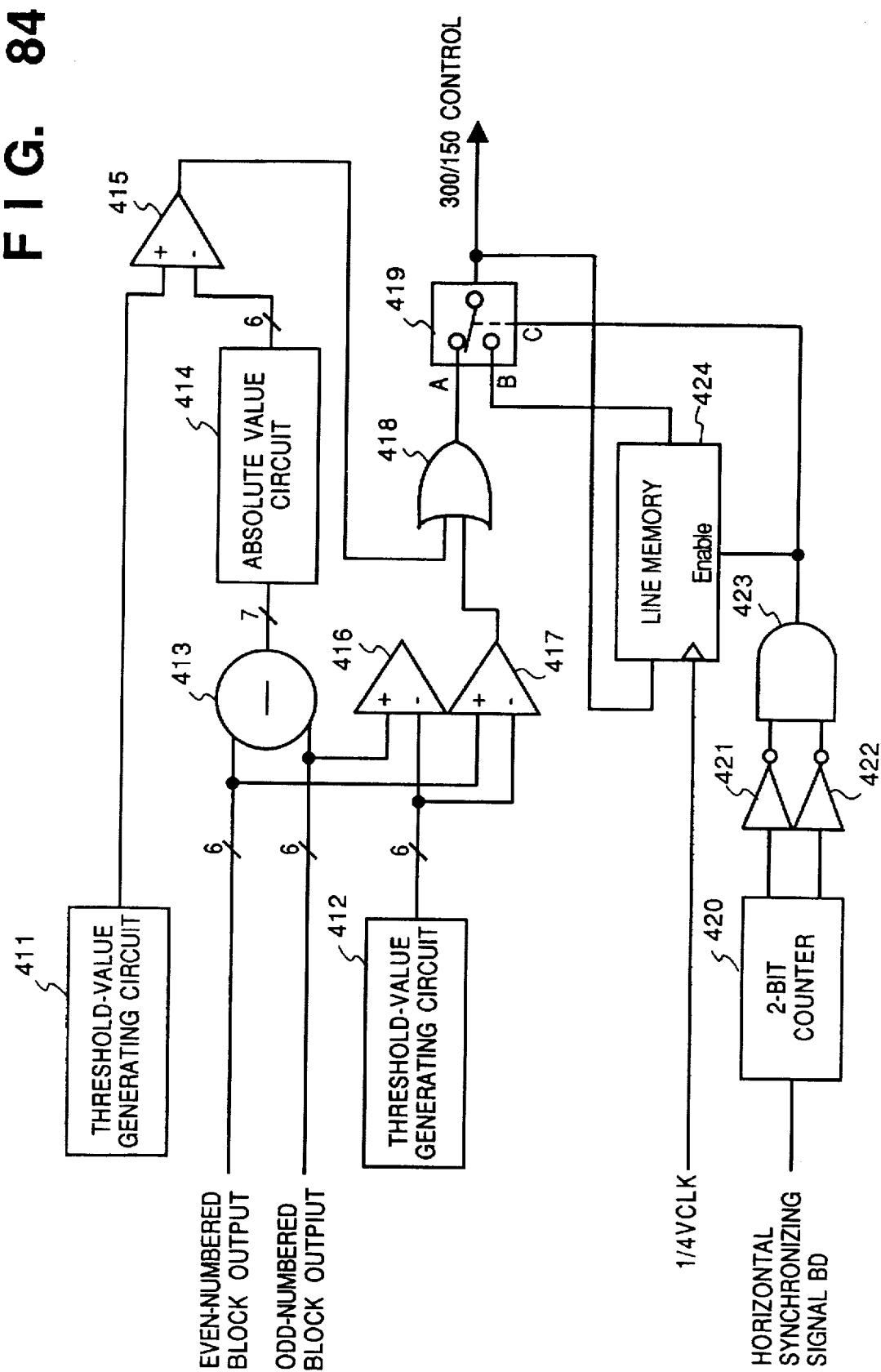
FIG. 84 is a block diagram showing the configuration of a 300/150 discriminating circuit according to a modification.

FIG. 84 is a block diagram showing the configuration of a 300/150 discriminating circuit according to this modification. As shown in FIG. 84, the threshold-value generating circuits 411, 412, subtractor 413, absolute-value circuit 414, comparators 415–417 and OR gate 418 are the same as those of the tenth embodiment in FIG. 83. Further provided in this arrangement are a two-bit counter 420, NOT gates 421, 422, an AND gate 423, a line memory 424 and a selector 419. These additional components accept and process the horizontal synchronizing signal BD and ¼ VCLK signal.

The operation of the main components of this embodiment will now be described.

The even-numbered block output and odd-numbered block output synchronized by the block synchronizing circuit 305 (see FIG. 80) have the magnitudes of their density levels detected by the threshold-value generating circuit 412 and comparator circuits 416, 417. Further, the density difference between the even-numbered and odd-numbered blocks is detected by the subtractor 413, absolute-value circuit 414, absolute-value generating circuit 411 and comparator 415. The results of these detection operations are OR-ed by the OR gate 418 (in the same manner as in the tenth embodiment). The output of the OR gate 418 enters the A input terminal of the selector 419. The output of the line memory 414 enters the B input terminal of the selector. The horizontal synchronizing signal BD is counted by a two-bit counter 420. When the outputs of the counter are "0, 0", this is decoded by the NOT gates 421, 422 and AND gate 423. The output of the AND gate 423 enters the control-input terminal C of the selector 419. When the control-input terminal is logical "1", the A input terminal is selected; when the former is "0", the B input terminal is selected. The line memory 424 latches and then outputs the 300/150 control signal in response to the ½ VCLK signal. The output of the AND gate 423 is connected to a latch-enable terminal of the line memory 424. The input is latched when the enable signal is "1" but is not latched when the enable signal is "0". An output is delivered, however, irrespective of whether the enable input is "0" or "1".

By virtue of the foregoing operation, (300×150) dpi processing is executed, irrespective of the density value, one block below (in the sub-scanning direction) a block in which (300×150) dpi processing has been carried out, and (300×300) dpi processing is similarly executed, irrespective of the density value, one block below (in the sub-scanning direction) a block in which (300×300) dpi processing has been carried out. This raises connectivity of black dots in the sub-scanning direction, thereby enhancing the effect in which pitch irregularity is made less conspicuous.

The present invention can be applied to a system constituted by a plurality of devices or to an apparatus comprising a single device. Furthermore, it goes without saying that the invention is applicable also to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:

input means for inputting image data of a pixel of interest, the image data for the pixel of interest having plural bits;

density pattern generating means for generating a predetermined density pattern corresponding to a density level of the image data inputted by said input means; and random number generating means for generating a random number which differs from a random number generated for a previous pixel of interest;

wherein said density pattern generating means includes means for changing a growth direction of the density pattern so that the growth direction of the density pattern changes in accordance with the random number generated by said random number generating means.

2. The image processing apparatus according to claim 1, wherein said input means inputs image data of the pixel of interest and also inputs image data of its neighboring pixels, the image data for each pixel having plural bits, and wherein, in a case where the growth direction of the density pattern of the neighboring pixels in accordance with the random number is predetermined, said density pattern generating means generates the growth direction of the density pattern of the pixel of interest also to be the predetermined growth direction, regardless of the direction determined in accordance with the random number.

3. An image processing apparatus comprising:

input means for inputting image data of a pixel of interest and of its neighboring pixels, the image data for each pixel having plural bits;

discriminating means for discriminating density level of the image data inputted by said input means; and density pattern generating means for generating a predetermined density pattern corresponding to the density level of the image data inputted by said input means;

wherein, in a case where the density level of the image data is discriminated as high by said discriminating means, said density pattern generating means generates the density pattern in a first resolution by using image data of n neighboring pixels inputted by said input means, whereas in a case where the density level of the image data is discriminated as low, said density pattern generating means generates the density pattern in a second resolution which is inferior to the first resolution by using image data of m (n<m) neighboring pixels inputted by said input means.

4. The image processing apparatus according to claim 3, wherein the second resolution has lower resolution in a main scanning direction than the first resolution.

5. The image processing apparatus according to claim 3, wherein said density pattern generating means generates the density pattern of a pixel in the first resolution in a case where the pixel is one line below a pixel having a density pattern generated in the first resolution, regardless of the density level discriminated by said discriminating means.

6. The image processing apparatus according to claim 3, wherein said density pattern generating means generates the density pattern of a pixel in the second resolution in a case where the pixel is one line below a pixel having a density pattern generated in the second resolution, regardless of the density level discriminated by said discriminating means.

7. An image processing apparatus comprising:
input means for inputting image data of a pixel of interest and of its neighboring pixels, the image data for each pixel having plural bits;
detecting means for detecting a difference of a density level between the image data of the pixel of interest and the neighboring pixels; and
density pattern generating means for generating a predetermined density pattern corresponding to the density level of the image data inputted by said input means,
wherein, in a case where the detected difference is larger than a predetermined value, said density pattern generating means generates the density pattern in a first resolution by using image data of n neighboring pixels inputted by said input means, whereas in a case where the detected difference is smaller than a predetermined value, said density pattern generating means generates the density pattern in the second resolution which is inferior to the first resolution by using image data of m (n<m) neighboring pixels inputted by said input means.

8. The image processing apparatus according to claim 7, wherein, if the detected difference is smaller than the predetermined value, and also if the level of the image data of the neighboring pixels surpasses a reference value, said density pattern generating means generates a density patterns of the first and second pixels in the first resolution.

9. An image processing method comprising the steps of:
inputting image data of a pixel of interest, the image data for the pixel of interest having plural bits;
generating a predetermined density pattern corresponding to a density level of the image data inputted in said inputting step; and
generating a random number which differs from a random number generated for a previous pixel of interest;
wherein said density pattern generating step includes a changing step for changing a growth direction of the density pattern so that the growth direction of the density pattern changes in accordance with the random number generated in said random number generating step.

10. The image processing method according to claim 9, wherein said inputting step inputs image data of the pixel of interest and also inputs image data of its neighboring pixels, the image data for each pixel having plural bits, and wherein, in a case where the growth direction of the density pattern of the neighboring pixels in accordance with the random number is predetermined, said density pattern generating step generates the growth direction of the density pattern of the pixel of interest also to be the predetermined growth direction, regardless of the direction determined in accordance with the random number.

11. An image processing method comprising the steps of:
inputting image data of a pixel of interest and of its neighboring pixels, the image data for each pixel having plural bits;
discriminating density level of the image data inputted in said inputting step; and
generating a predetermined density pattern corresponding to the density level of the image data inputted in said inputting step;
wherein, in a case where the density level of the image data is discriminated as high in said discriminating step, said density pattern generating step generates the density pattern in a first resolution by using image data of n neighboring pixels inputted in said inputting step, whereas in a case where the density level of the image data is discriminated as low, said density pattern generating step generates the density pattern in a second resolution which is inferior to the first resolution by using image data of m (n<m) neighboring pixels inputted in said inputting step.

12. The image processing method according to claim 11, wherein the second resolution has lower resolution in a main scanning direction than the first resolution.

13. The image processing method according to claim 11, wherein said density pattern generating step generates the density pattern of a pixel in the first resolution in a case where the pixel is one line below a pixel having a density pattern generated in the first resolution, regardless of the density level discriminated in said discriminating step.

14. The image processing method according to claim 11, wherein said density pattern generating step generates the density pattern of a pixel in the second resolution in a case where the pixel is one line below a pixel having a density pattern generated in the second resolution, regardless of the density level discriminated in said discriminating step.

15. An image processing method comprising the steps of:
inputting image data of a pixel of interest and of its neighboring pixels, the image data for each pixel having plural bits;
detecting a difference of a density level between the image data of the pixel of interest and the neighboring pixels; and
generating a predetermined density pattern corresponding to the density level of the image data inputted in said inputting step,
wherein, in a case where the detected difference is larger than a predetermined value, said density pattern generating step generates the density pattern in a first resolution by using image data of n neighboring pixels inputted in said inputting step, whereas in a case where the detected difference is smaller than a predetermined value, said density pattern generating step generates the density pattern in the second resolution which is inferior to the first resolution by using image data of m (n<m) neighboring pixels inputted in said inputting step.

16. The image processing method according to claim 15, wherein, if the detected difference is smaller than the predetermined value, and also if the level of the image data of the neighboring pixels surpasses a reference value, said density pattern generating step generates a density patterns of the first and second pixels in the first resolution.

* * * * *